US009080381B2

(12) United States Patent
Haarer et al.

(10) Patent No.: US 9,080,381 B2
(45) Date of Patent: Jul. 14, 2015

(54) POWER ASSIST MODULE FOR ROLLER SHADES

(75) Inventors: Steven R. Haarer, Whitesville, KY (US); Richard N. Anderson, Whitesville, KY (US)

(73) Assignee: Hunter Douglas Inc., Pearl River, NY (US)

( * ) Notice: Subject to any disclaimer, the term of this patent is extended or adjusted under 35 U.S.C. 154(b) by 267 days.

(21) Appl. No.: 13/531,078

(22) Filed: Jun. 22, 2012

(65) Prior Publication Data

US 2013/0153161 A1 Jun. 20, 2013

Related U.S. Application Data

(63) Continuation-in-part of application No. PCT/US2011/021639, filed on Jan. 19, 2011.

(60) Provisional application No. 61/297,333, filed on Jan. 22, 2010.

(51) Int. Cl.

| | |
|---|---|
| ***E06B 9/56*** | (2006.01) |
| ***E06B 9/60*** | (2006.01) |
| ***E06B 9/42*** | (2006.01) |
| ***B23P 11/00*** | (2006.01) |

(52) U.S. Cl.

CPC . *E06B 9/60* (2013.01); *B23P 11/00* (2013.01); *E06B 9/42* (2013.01); *Y10T 29/49826* (2015.01)

(58) Field of Classification Search

CPC ...... E06B 9/42; E06B 9/88; E06B 2009/6881

USPC ...................... 160/295, 294, 293.1, 292, 305

See application file for complete search history.

(56) References Cited

U.S. PATENT DOCUMENTS

| | | | | |
|---|---|---|---|---|
| 700,951 A * | 5/1902 | Leach | 160/292 |
| 873,438 A * | 12/1907 | John | 160/292 |
| 1,080,844 A * | 12/1913 | Nielsen | 160/295 |
| 1,725,285 A * | 8/1929 | Lalonde | 160/295 |
| 1,786,512 A * | 12/1930 | Whitworth | 160/295 |
| 1,942,320 A * | 1/1934 | Young | 16/198 |
| 2,969,689 A | 1/1961 | Martens | |
| 4,482,137 A * | 11/1984 | Gavagan et al. | 267/157 |
| 4,880,045 A | 11/1989 | Stahler | |
| 5,215,296 A | 6/1993 | Adams et al. | |
| 5,464,052 A | 11/1995 | Wieczorek et al. | |
| 6,047,759 A | 4/2000 | Lysyj | |
| 6,330,903 B1 * | 12/2001 | Weinreich | 160/295 |
| 6,467,714 B1 * | 10/2002 | Rasmussen | 242/381 |
| 6,470,951 B1 * | 10/2002 | Tao | 160/176.1 R |
| 6,615,897 B2 * | 9/2003 | Dorma | 160/191 |
| 7,617,859 B2 * | 11/2009 | Auger | 160/121.1 |
| 2006/0118248 A1 | 6/2006 | Anderson et al. | |
| 2010/0212843 A1 | 8/2010 | Bohlen et al. | |
| 2012/0061035 A1 * | 3/2012 | Hsieh | 160/293.1 |

FOREIGN PATENT DOCUMENTS

| | | |
|---|---|---|
| WO | WO 2008141389 | 11/2008 |

* cited by examiner

*Primary Examiner* — Katherine Mitchell
*Assistant Examiner* — Abe Massad
(74) *Attorney, Agent, or Firm* — Camoriano and Associates

(57) ABSTRACT

A power assist module for use in roller tube driven products, such as roller shades. The module may be pre-wound prior to installation in a roller tube and retains its pre-wound condition, even after use, when removed from the roller tube.

24 Claims, 45 Drawing Sheets

POWER ASSIST MODULE FOR ROLLER SHADES

This application claims priority from U.S. Provisional Application Ser. No. 61/297,333 filed Jan. 22, 2010 and is a continuation-in-part of International Application PCT/US2011/021639 filed Jan. 19, 2011.

BACKGROUND

The present invention relates to power assist modules for use in roller shades. A spring is typically used to assist in raising (retracting) a roller shade. Typically, depending on the width and weight of the roller shade, the spring used to assist in raising the shade is custom supplied for each application.

In a top down roller shade, the entire light blocking material typically wraps around a rotator rail (also referred to as a rotator tube or roller tube) as the shade is raised (retracted). Therefore, the weight of the shade is transferred to the rotator rail as the shade is raised, and the force required to raise the shade is thus progressively lower as the shade (the light blocking element) approaches the fully raised (fully open or retracted) position. Of course, there are also bottom up shades and composite shades which are able to do both, to go top down and/or bottom up. In the case of a bottom/up shade, the weight of the shade is transferred to the rotator rail as the shade is lowered, mimicking the weight operating pattern of a top/down blind.

A wide variety of drive mechanisms is known for extending and retracting coverings—moving the coverings vertically or horizontally or tilting slats. A number of these drive mechanisms may use a spring motor to provide the catalyst force (and/or to supplement the operator supplied catalyst force) to move the coverings. Typically, in order to finely counterbalance the weight of a roller shade to make it easier to raise the shade when using some of these control mechanisms, a different spring is supplied for each incremental change in shade width and/or in shade material. Not only does the length of the spring change, but also the K value (the spring constant) changes. This means that the supplier ends up carrying a large inventory of springs in order to cover all the combinations of roller shades which may be sold.

It is also desirable to be able to provide a "pre-wind" on the spring to ensure that the spring provides assistance in retracting the shade all the way to the fully retracted position of the shade.

Prior art roller shades, such as the shade described in WO 2008/141389 "Di Stefano" published Nov. 27, 2008, which is hereby incorporated herein by reference, provide booster assemblies 100, 102 (See FIG. 1), either mounted on a common shaft or on different portions 104, 106 of a common shaft, which are interconnected by connecting pieces 122 (See FIG. 2) or 208 (See FIG. 5). As a result, it would be extremely awkward and difficult to provide a "pre-wind" to each booster assembly, particularly if it is desired to provide a different degree of "pre-wind" to each booster assembly. In fact, Di Stefano does not disclose any mechanism or procedure to allow any "pre-wind" to be added to the booster assemblies.

In any event, to the extent that some degree of "pre-wind" could be added to prior art booster assemblies, the degree of "pre-wind" would be maintained by the interaction between the roller tube and the fixed shaft. As soon as the shaft is removed from inside the roller tube (or alternatively, as soon as the roller tube is removed from outside the shaft), any degree of "pre-wind" of the booster assemblies would be lost.

SUMMARY

An embodiment of the present invention provides a modular spring unit. A plurality of modular spring units may be incorporated into a single roller shade assembly, as required, to finely counterbalance the weight of the roller shade. Each modular spring unit may be fully pre-assembled outside of the roller shade and any desired degree of "pre-wind" may be added to each modular spring unit independent of any other modular spring unit in the roller shade assembly. This desired degree of "pre-wind" may be added to each modular spring unit prior to its assembly to the roller shade, and this desired degree of "pre-wind" is independently maintained for each modular spring unit before assembly of the modular spring unit into the roller shade and even after use and subsequent disassembly of the modular spring unit from the roller shade assembly.

DESCRIPTION

Figure 1:
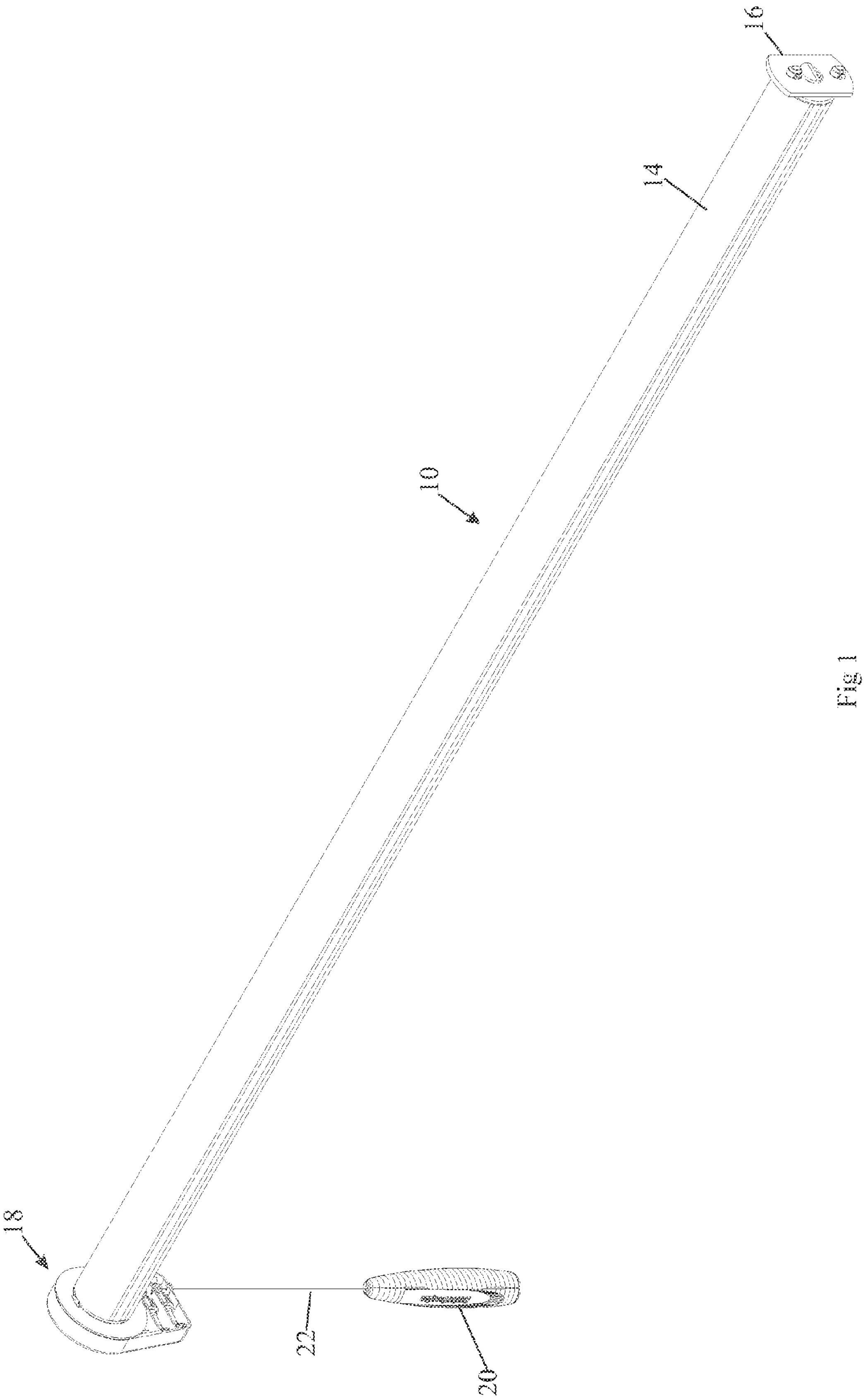
FIG. 1 is a perspective view of a window roller shade including a control mechanism for extending and retracting the shade.
Figure 2:
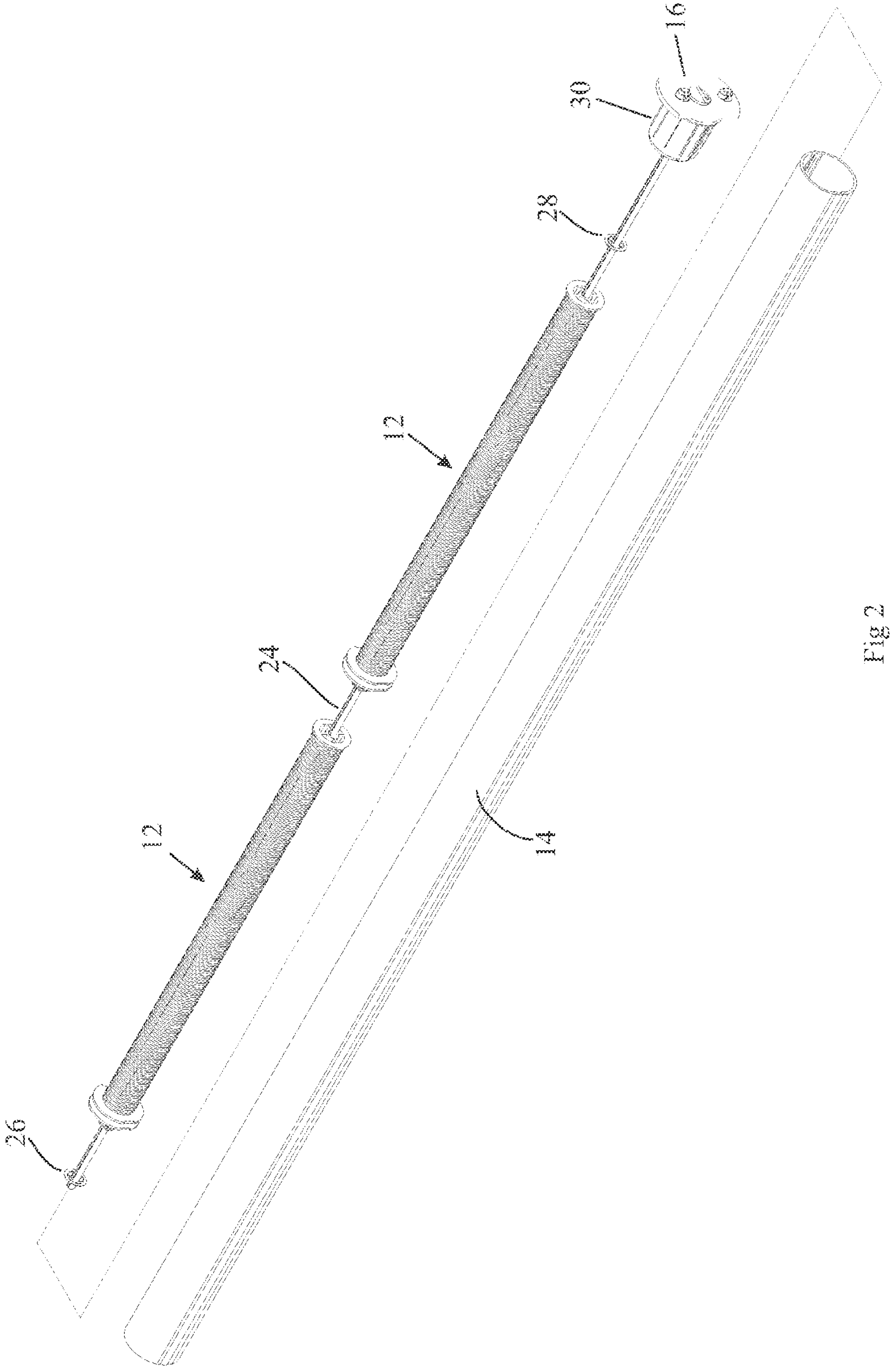
FIG. 2 is a partially exploded perspective view of the roller shade of FIG. 1, with the control mechanism omitted for clarity.

FIGS. 1 through 15 illustrate an embodiment of a roller shade 10 with power assist modules 12 made in accordance with the present invention. Note that the terms "roller shade" and "shade" are used interchangeably to mean either the entire roller shade assembly 10 or just the light blocking element of the roller shade assembly 10. The intended meaning should be clear from the context in which it is used. Referring to FIG. 1, the roller shade 10 includes a rotator rail 14 mounted between a bracket clip 16 and a drive mechanism 18, which provide good rotational support for the rotator rail 14 at both ends. The rotator rail 14, in turn, provides support for one or more power assist modules 12 located inside the rotator rail 14, as shown in FIG. 2. The right end of the rotator rail 14 is supported on a tube bearing 30, which mounts onto the bracket clip 16 as described in more detail later. The left end of the rotator rail 14 is supported on the drive mechanism 18. The details of the drive mechanism support are shown better in FIG. 17, in which the drive mechanism 18' is identical to the drive mechanism 18 of this embodiment and includes a rotating drive spool with an external profile similar to the external profile of the tube bearing 30. Both the bracket clip 16 and the drive mechanism 18 are releasably secured to mounting brackets (not shown) which are fixedly secured to a wall or to a window frame.

The drive mechanism 18 is described in U.S. Patent Publication No. 2006/0118248 "Drive for coverings for architectural openings", filed Jan. 13, 2006, which is hereby incorporated herein by reference. FIGS. 116-121 of the '248 application depict an embodiment of a roller shade 760 with a roller lock mechanism 762, and the specification gives a complete detailed description of its operation. A brief summary of the operation of this drive mechanism 18 is stated below with respect to FIG. 1 of this specification.

When the tassel weight 20 of the drive mechanism 18 is pulled down by the user, the drive cord 22 (which wraps around a capstan and onto a drive spool, not shown) is also pulled down. This causes the capstan and the drive spool to rotate about their respective axes of rotation. The rotator rail 14 is secured to the drive spool for rotation about the same axis of rotation as the drive spool. As the rotator rail 14 rotates, the shade is retracted with the assistance of the power assist modules 12, as described in more detail below.

When the user releases the tassel weight 20, the force of gravity acting to extend the shade urges the rotation of the rotator rail 14 and of the drive spool in the opposite direction from before. This pulls up on the drive cord 22, which shifts the capstan to a position where the capstan is not allowed to rotate. This locks up the roller lock mechanism so as to prevent the shade from falling (extending).

To extend the shade, the user lifts up on the tassel weight 20 which removes tension on the drive cord 22, allowing the cord 22 to surge the capstan, unlocking the roller lock mechanism. The drive spool and the rotator rail 14 are then allowed to rotate due to the force of gravity acting to extend the shade. As the shade extends, the power assist modules 12 are wound up in preparation for when they are called to assist in retracting the shade.

There is also an "overpowered" version of this drive in which pulling down on the tassel weight 20 by the user extends the shade. As the shade extends, the power assist modules 12 are wound up in preparation for when they are called to assist in retracting the shade. When the user releases the tassel weight 20, the "overpowered" power assist modules 12 urge the shade to rotate in the opposite direction to raise the shade, which shifts the capstan to a position where the capstan is not allowed to rotate. This locks up the roller lock mechanism so as to prevent the shade from rising (retracting).

To retract the shade, the user lifts up on the tassel weight 20, which removes tension on the drive cord 22, allowing the cord 22 to surge the capstan, unlocking the roller lock mechanism. The drive spool and the rotator rail 14 are then allowed to rotate due to the force of the "overpowered" power assist modules 12 acting to retract the shade.

It should be noted that the cord drive 18 is just one example of a drive which may be used for the roller shade 10. Many other types of drives are known and may alternatively be used.

Figure 3:
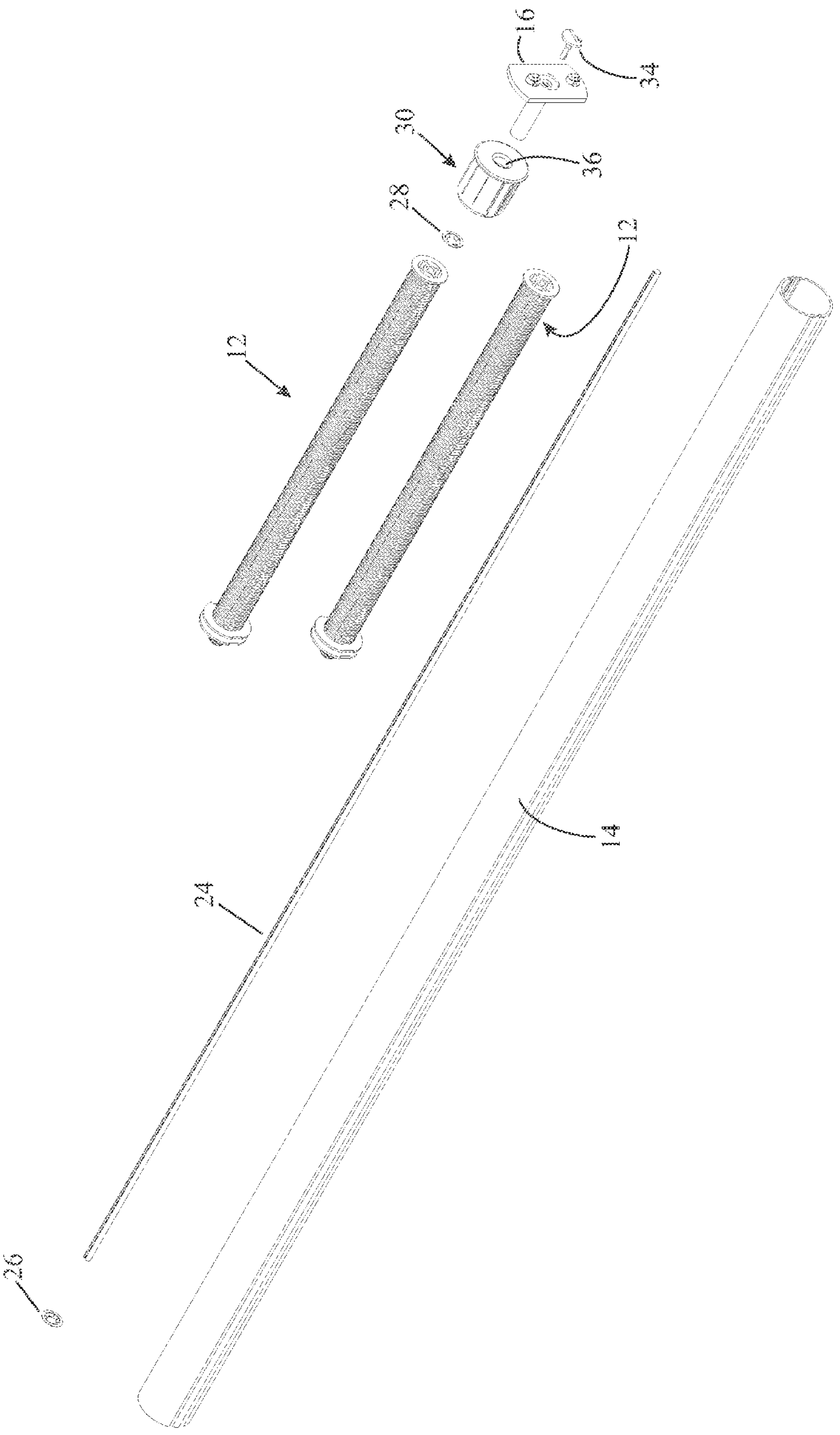
FIG. 3 is a partially exploded perspective view of the roller shade of FIG. 2.

FIGS. 2 and 3 show the roller shade 10 with the drive mechanism omitted for clarity. In this embodiment, two power assist modules 12 are mounted over a rod 24. It is understood that any number of power assist modules 12 may be incorporated into a roller shade 10. It should also be understood that the power assist modules 12 in a shade 10 may each have springs 50 (See FIG. 5) with different spring constants K, and, as explained later, each of the power assist modules 12 may be pre-wound to a desired degree independent of the other power assist modules 12 in the shade 10. The rod 24 has a non-circular cross-sectional profile (as best appreciated in FIG. 7B) in order to non-rotationally engage various other components as described below. One speed nut 26 is installed onto the rod 24 to prevent the power assist modules 12 from sliding off of the rod 24 (keeping the power assist modules 12 inside the rotator rail 14). Another speed nut 28 is installed onto the rod 24 near its other end (See also FIGS. 8, 7A, and 7C) to prevent the tube bearing 30 from sliding off of the shaft 32 of the bracket clip 16, as described in more detail below. Finally, a plunger 34 is used to secure the bracket clip 16 to a wall-mounted or window-frame-mounted bracket (not shown). The rod 24 is not threaded. The speed nuts 26, 28 have deformable tangs which deform temporarily in one direction, allowing the speed nut to be pushed axially along the rod 24 in a first direction and then to grab onto the rod 24 to resist movement in the opposite direction.

FIGS. 2 and 3 clearly show that, in this embodiment, the rod 24 is shorter than the rotator rail 14 such that the rod 24 does not extend the full length of the rotator rail 14. In this embodiment, the right end of the rod 24 extends to the bracket clip 16, where it is secured against rotation, but the left end does not extend all the way to the drive mechanism 18. If desired, the rod 24 alternatively could be secured against rotation by the drive mechanism 18 and not extend all the way to the bracket clip 16. As another alternative, the rod 24 could extend the full length of the rotator rail 14 and be secured against rotation both at the drive mechanism 18 and at the bracket clip 16. As long as one end of the rod 24 is secured against rotation, it is not necessary for the rod 24 to be supported at both ends, because it is supported by the rotator rail 14 at various points along its length, as will be explained in more detail later.

The tube bearing 30 (See FIGS. 3 and 8) is a substantially cylindrical element having a shaft portion 35 (See FIG. 8) having an internal surface which defines an inner circular cross-section through-opening 36 and provides rotational support of the tube bearing 30 on the shaft 32 of the bracket clip 16. The tube bearing 30 has a cylindrical outer surface 38, which engages and supports the inner surface 54 (See FIG. 15) of the rotator rail 14. A shoulder 40 limits how far the tube bearing 30 slides into the rotator rail 14.

Figure 8:
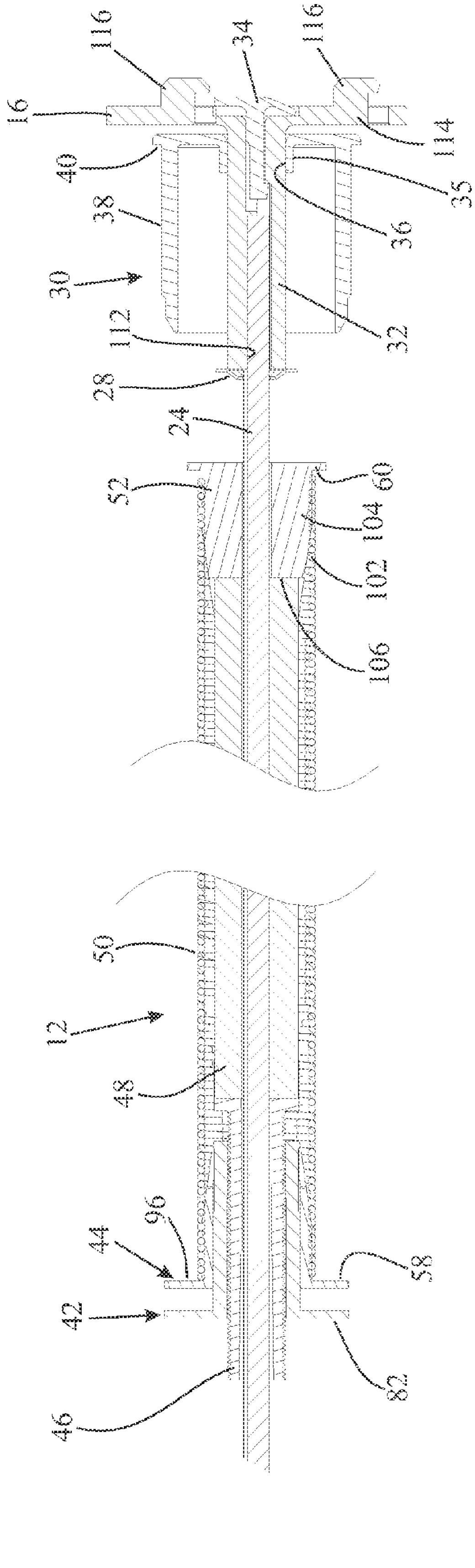
FIG. 8 is an enlarged view of the right end portion of FIG. 7A.

Referring to FIG. 8, the substantially cylindrical shaft member 32 of the bracket clip 16 defines a non-circular cross-sectional profiled inner bore 112 which receives and engages the rod 24 to support the right end of the rod 24 and prevent it from rotating. A radially-extending flange 114 on the bracket clip 16 defines hooked projections 116 to mount the bracket clip 16 to a wall-mounted or a window-frame-mounted bracket (not shown). Since the bracket clip 16 is stationary relative to the wall or window frame, and since it receives and engages the rod 24 with a non-circular profile, it prevents the rotation of the rod 24 relative to the wall or window frame. As mentioned above, the shaft 32 on the bracket clip 16 provides rotational support for the tube bearing 30.

Figures 4, 5:
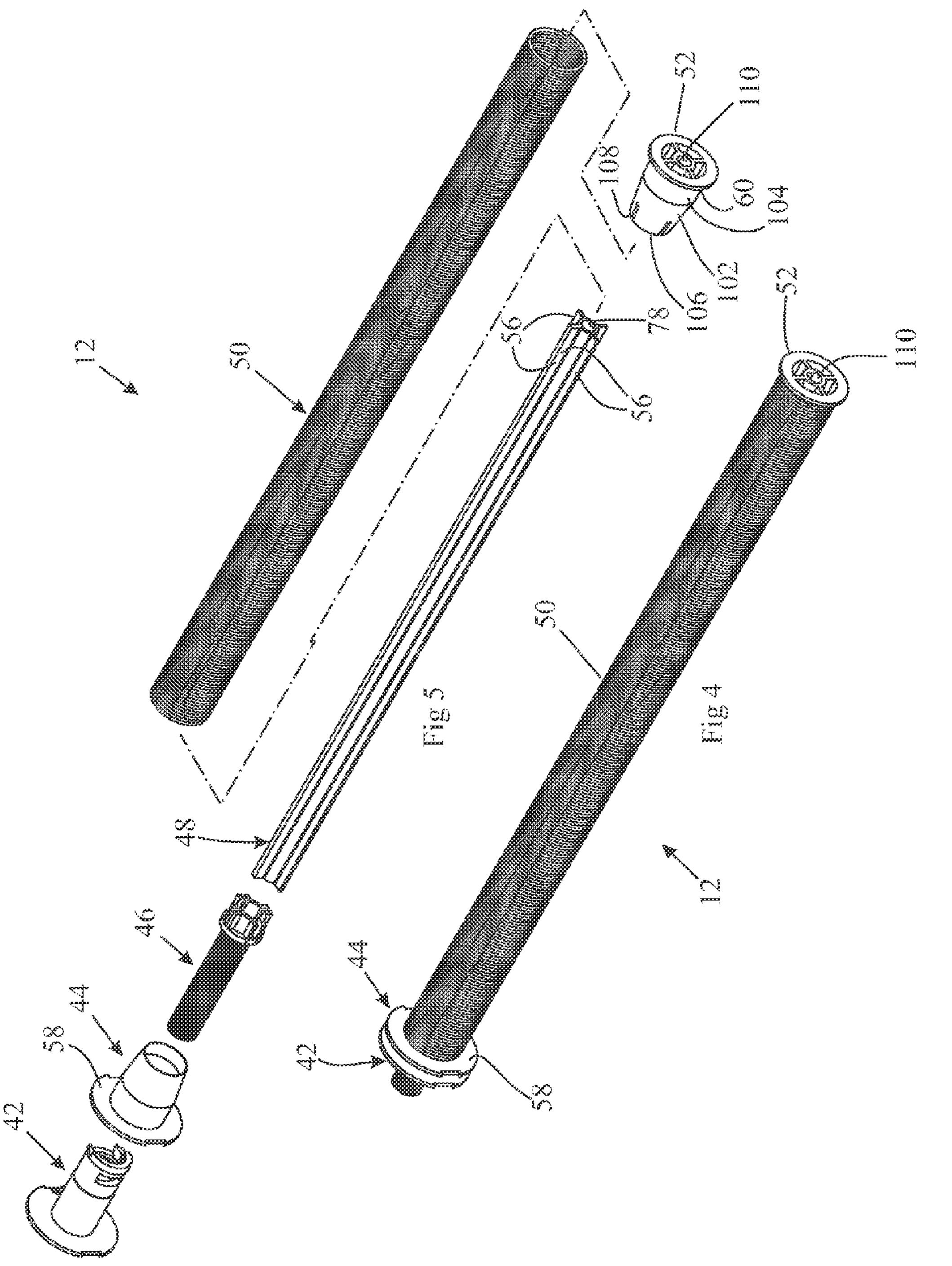
FIG. 4 is a perspective view of one of the power assist modules of FIG. 3.
FIG. 5 is an exploded perspective view of the power assist module of FIG. 4.
Figure 6:
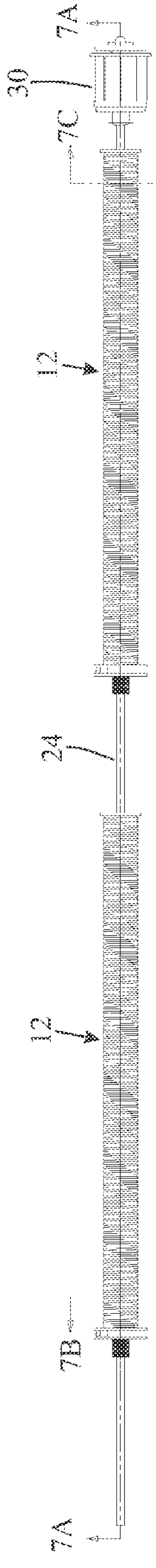
FIG. 6 is a side view of the roller shade of FIG. 1, with the rotator rail and the control mechanism omitted for clarity.

Referring now to FIGS. 4, 5, and 8, the power assist module 12 includes a drive plug shaft 42 (which may also be referred to as a threaded follower member 42), a drive plug 44, a limiter 46 (which may also be referred to as a threaded shaft member 46), a spring shaft 48, a spring 50, and a spring plug 52. These components are described in detail below.

Figure 10:
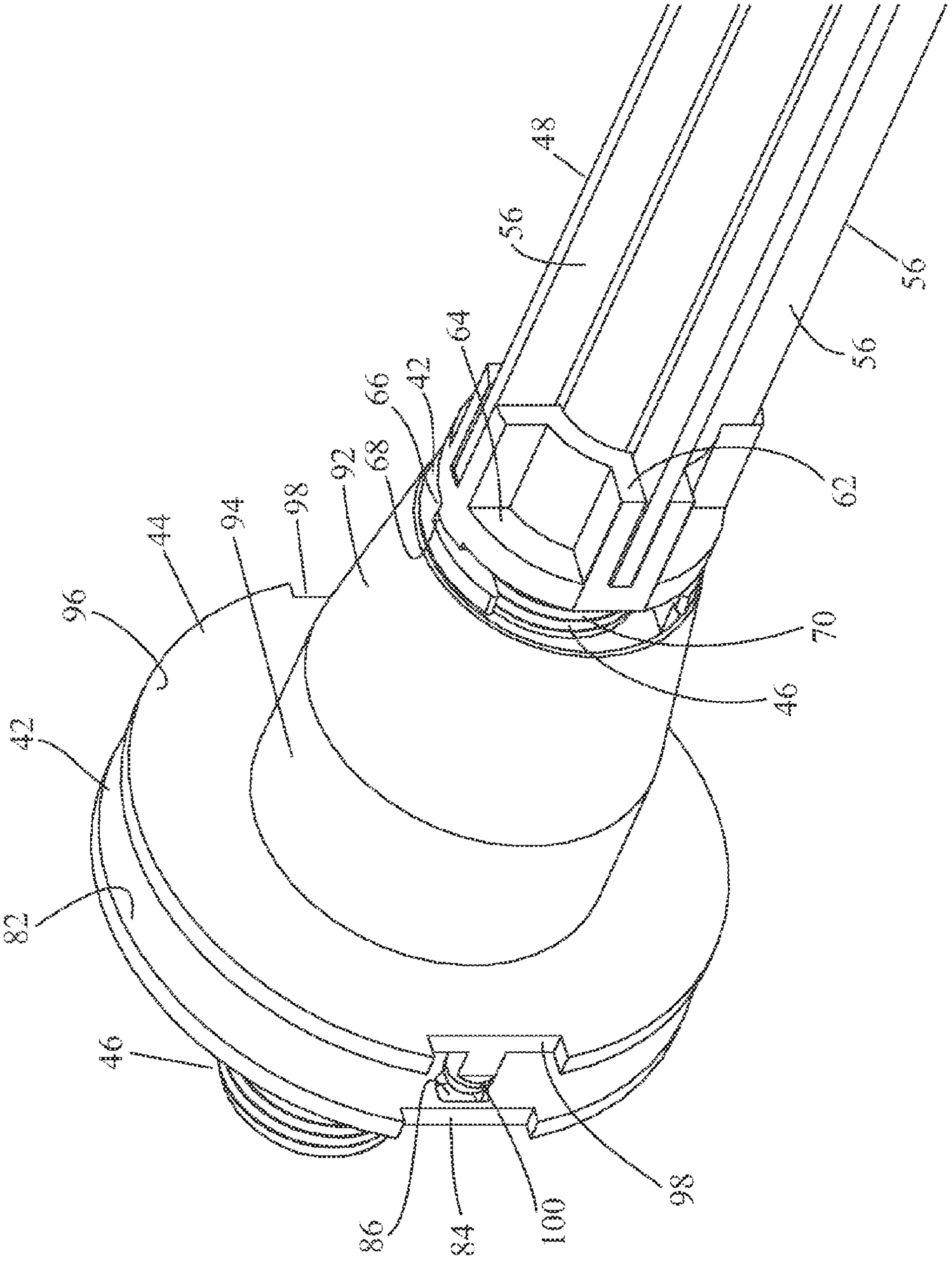
FIG. 10 is a partially broken away, perspective view of a preliminary assembly step of the drive plug shaft, the drive plug, and the limiter of FIG. 9, also including the spring shaft.

Referring to FIGS. 5 and 10, the spring shaft 48 is a substantially cylindrical, hollow member defining first and second ends and having a plurality of ribs 56 (in this embodiment of the shaft 48 there are four ribs 56 projecting radially outwardly at the 12 o'clock, 3 o'clock, 6 o'clock, and 9 o'clock positions, spaced apart at ninety degree intervals) and extending axially from the first end to the second end. The length of the spring shaft 48 is such that, when assembled onto a power assist module 12 (See FIG. 8), the distance between the radial flange 58 on the drive plug 44 and the radial flange 60 on the spring plug 52 is slightly longer than the axial length of the spring 50 when the spring 50 is in its relaxed (unwound) state to allow for spring growth as it is prewound.

The ribs 56 not only serve to engage similarly cross-shaped grooves on the limiter 46 and on the spring plug 52, as described in more detail below; they also provide contact points for the inside surface of the spring 50 to contact the shaft 48. As the spring 50 is wound up tighter, its inner diameter is reduced and its axial length increases. This may cause some portion(s) of the inner surface of the spring 50 to collapse onto the shaft 48. The ribs 56 provide an outside perimeter which is sufficient to maintain the spring coaxial with the shaft 48. This prevents the spring 50 from becoming skewed and interfering with the inner surface of the rotator rail 14. The ribs 56 also provide a limited number of contact points between the shaft 48 and the inner surface of the spring 50 in order to minimize the frictional resistance between the spring 50 and the shaft 48.

As described below, the ribs 56 on the spring shaft 48 form a cross-shaped pattern designed to fit into and engage similarly cross-shaped grooves on the limiter 46 and on the spring plug 52. As best appreciated in FIG. 5, the spring shaft 48 defines a circular cross-sectional profiled inner bore 78 which both slidably and rotatably receives the rod 24. It should be noted that the spring shaft 48 need not be supported for rotation relative to the rod 24. The spring shaft 48 could have an internal cross-sectional profile similar to that of the limiter 46 described below to prevent any rotation between the spring shaft 48 and the rod 24, but this constraint is not necessary. The spring plug 52 has a non-circular cross-section internal opening 110, which receives the rod 24 and matches the non-circular cross-section of the rod 24 in order to key the spring plug 52 to the rod 24 so the spring plug 52 does not rotate.

Figure 9:
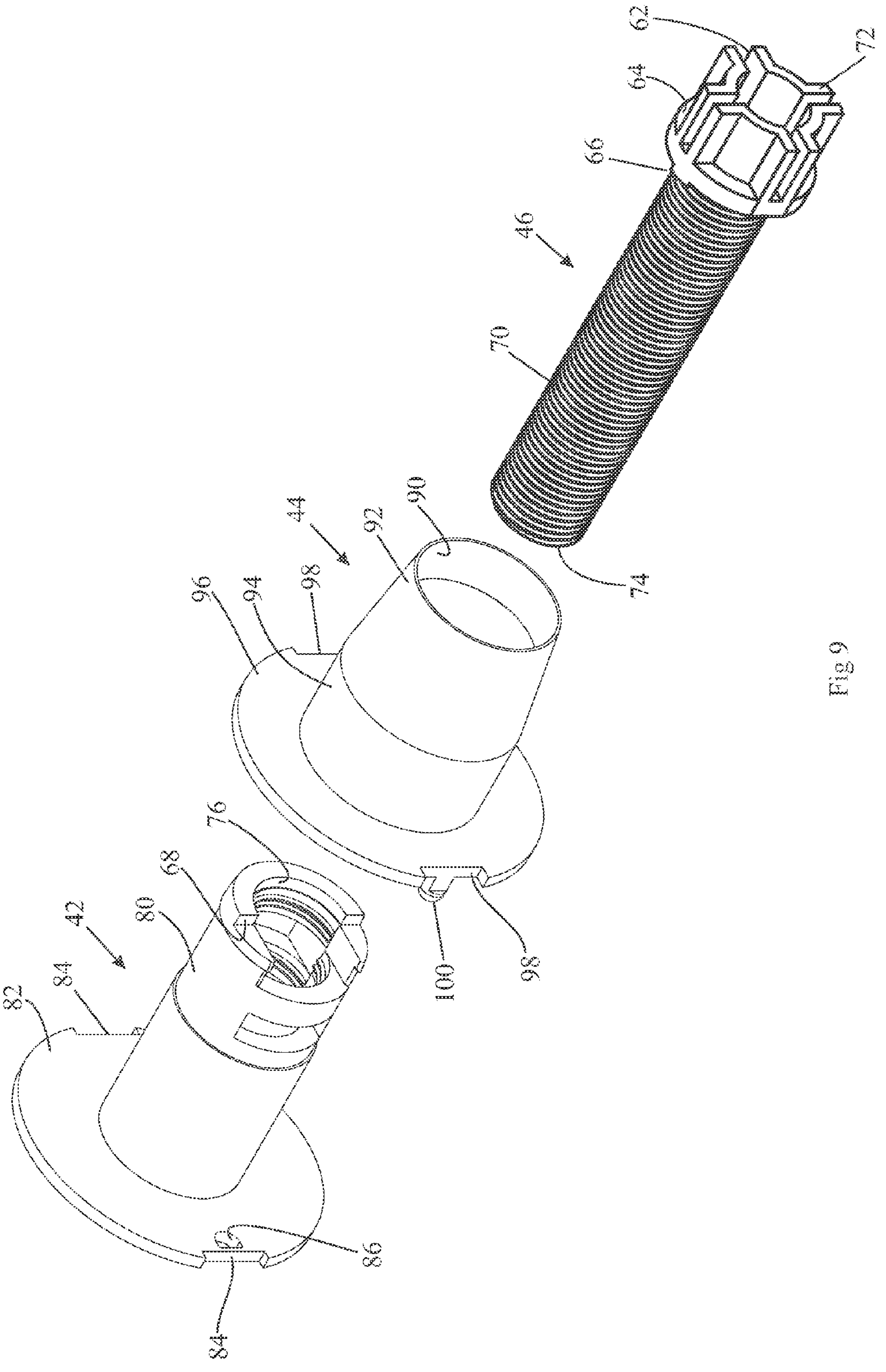
FIG. 9 is an exploded perspective view of the drive plug shaft, the drive plug, and the limiter of the power assist module of FIG. 5.

Referring now to FIG. 9, the limiter 46 (also referred to as the threaded shaft member 46) is a substantially cylindrical, hollow member defining a cross-shaped groove 62 at a first end 72. This groove 62 receives the ribs 56 of the spring shaft 48 (See FIG. 10) such that these two components are locked together from rotation relative to each other, at least long enough to allow a pre-wind to be added to the spring 50 without having to mount the power assist module 12 to a rod 24, as explained in more detail later.

A radially-extending shoulder 64 on the limiter 46 limits how far the spring shaft 48 can be inserted into the limiter 46. The other side of the shoulder 64 defines a stop projection 66 extending axially from the shoulder 64. As described in more detail later, and depicted in FIG. 10, the stop 66 impacts against a similar axially-extending stop projection 68 on the drive plug shaft 42 to limit the extent to which the drive plug shaft 42 can be threaded into the limiter 46 (and thus how far the drive plug shaft 42 can be rotated relative to the rod 24 to which the limiter 46 is keyed, as explained below).

Figure 7A:
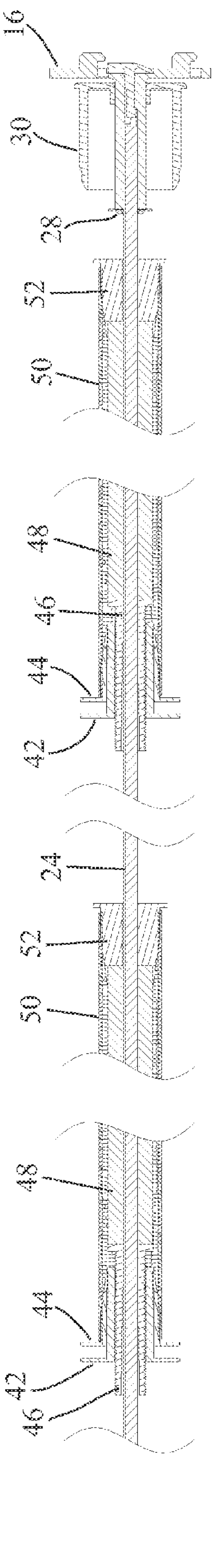
FIG. 7A is a view along line 7A-7A of FIG. 6.
Figure 7C:
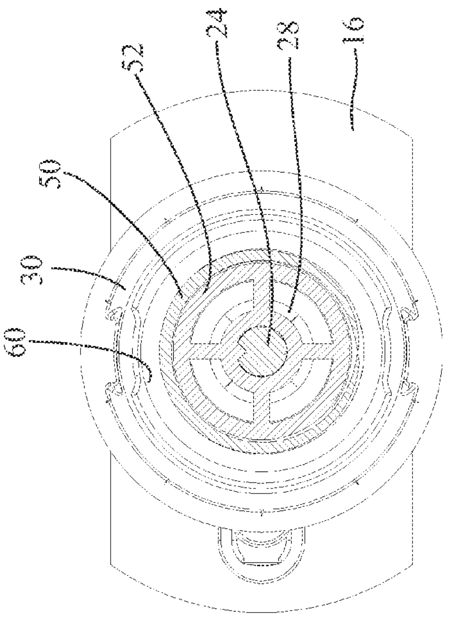
FIG. 7C is a view along line 7C-7C of FIG. 6.
Figure 7B:
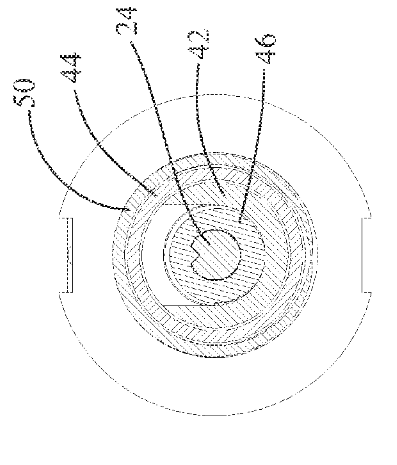
FIG. 7B is a view along line 7B-7B of FIG. 6.

Referring to FIG. 7B, the limiter 46 has a non-circular internal cross-sectional profile which matches the non-circular cross-sectional profile of the rod 24. This allows the limiter 46 to slide axially along the rod 24 while preventing the limiter 46 from rotating relative to the rod 24. As explained earner, the rod 24 is secured against rotation relative to the bracket clip 16 by a similar mechanism, and the bracket clip 16 is, in turn, secured to the brackets (not shown) mounted to the wall or to the window frame. Therefore, the rod 24 cannot rotate relative to the wall or to the window frame, and those components which are also secured against rotation relative to the rod 24, such as the spring plug 52 and the limiter 46, also cannot rotate relative to the wall or to the window frame.

Finally, the limiter 46 defines an externally threaded portion 70 (See FIG. 9) extending from the shoulder 64 to the second end 74 of the limiter 46. This threaded portion 70 is threaded into the internally threaded portion 76 of the drive plug shaft 42 until the stop projection 66 on the limiter 46 impacts against the stop projection 68 on the drive plug shaft 42, as shown in FIG. 10, corresponding to the position where the shade is in the fully retracted position, as discussed in more detail later.

It should be noted that, as the shade 10 is extended, the spring 50 becomes coiled tighter, resulting in a gradual collapse of the diameter of its coils and consequent increase in the overall length of the spring 50. In a preferred embodiment, the threaded portion 70 of the limiter 46 has a thread pitch such that the drive plug shaft 42 unthreads from the limiter 46 at a rate (controlled by the thread pitch) which is equal to the rate at which the spring 50 "grows" in length as it is coiled tighter as the shade 10 is extended.

Referring back FIG. 9, the drive plug shaft 42 is a substantially cylindrical, hollow member defining an internally threaded portion 76 and a smooth, cylindrical external portion 80 which is used for rotational support of the drive plug 44 as explained later. One end of the drive plug shaft 42 has a radially extending flange 82 which defines two diametrically opposed flat recesses 84 and a through opening 86 adjacent to one of the flats, the purpose of which is explained later.

The flange 82 is sized to be received inside the rotator rail 14 (See FIG. 15), and the flat recesses 84 receive, and are engaged by, the inwardly-projecting and axially extending ribs 88 on the inner surface 54 of the rotator rail 14. Therefore, as the rotator rail 14 rotates, it causes the drive plug shaft 42 to rotate. When the rotator rail 14 rotates so as to extend the roller shade 10, the drive plug shaft 42 rotates relative to the limiter 46, partially unscrewing itself relative to the non-rotating limiter 46 and causing the drive plug shaft 42 to move axially away from (but not to be fully unthreaded from) the limiter 46. The limiter 46 does not rotate because it is keyed to the rod 24 (which is secured to the wall or window frame via the bracket clip 16).

Likewise, as the roller shade is retracted, the drive plug shaft 42 threads onto the limiter 46. This continues until the stop 68 on the drive plug shaft 42 impacts against the stop 66 on the limiter 46, at which point the drive plug shaft 42, and therefore also the rotator rail 14 (which is keyed to the drive plug shaft 42 via the flat recesses 84) are stopped against further rotation. As explained later, the spring 50 will still have some unwinding left in it when the rotator rail is stopped, and this is the degree of "pre wind" which may be added to the power assist module 12 to ensure that the shade is fully retracted.

Referring now to FIGS. 9 and 7B, the drive plug 44 is a substantially cylindrical, hollow member defining a circular cross-sectional profiled inner bore 90 which is supported for rotation on the circular cross-section portion 80 of the drive plug shaft 42. The external surface of the drive plug 44 defines a first, frustoconical portion 92 and a second, cylindrical portion 94, as well as a radially extending flange 96 which is very similar to the flange 82 on the drive plug shaft 42, including having diametrically opposed flat recesses 98. The flange 96 also defines an axially-directed projection 100 adjacent to one of the flat recesses 98. The projection 100 is received in the through opening 86 on the flange 82 of the drive plug shaft 42, such that, when the drive plug shaft 42 rotates, the drive plug 44 rotates with it. Since the flat recesses 98 on the drive plug 44 are aligned with the flat recesses 84 on the drive plug shaft 42 when the projection 100 is received in the opening 86, the ribs 88 on the rotator rail 14 are received in and engage both sets of flat recesses 84, 98. Thus, the drive plug shaft 42 and the drive plug 44 both rotate with the rotator rail 14 as the roller shade 10 is extended and retracted. The force required to transfer the rotational torque from the drive plug 44 to the drive plug shaft 42, especially when the spring 50 is fully wound, is not borne exclusively by the projection 100 on the drive plug 44, but rather it is shared with, and in fact is borne substantially by, the aligned flat recesses 98, 84 of the drive plug 44 and drive plug shaft 42, respectively.

Referring now to FIGS. 4 and 8, the spring plug 52 is similar to the drive plug 44, having a first, frustoconical portion 102 and a second, cylindrical portion 104, and a shoulder 60 which limits how far the spring plug 52 fits into the spring 50. The first end 106 of the spring plug 52 defines a cross-shaped groove 108, similar to the cross-shaped groove 62 on the limiter 46. The cross-shaped groove 108 of the spring plug 52 receives the cross-shaped ribs 56 of the spring shaft 48. The spring plug 52 defines an inner bore 110 (See FIGS. 4 and 5) with a non-circular cross-sectional profile that matches the non-circular cross-sectional profile of the rod 24 and keys the spring plug 52 to the rod 24. Since the rod 24 is secured to the bracket clip 16 against rotation relative to a wall or window frame, and since the spring plug 52 is keyed to the rod 24, the spring plug 52 is also secured against rotation relative to the wall or window frame, but it may slide axially along the rod 24 if required.

Figure 11:
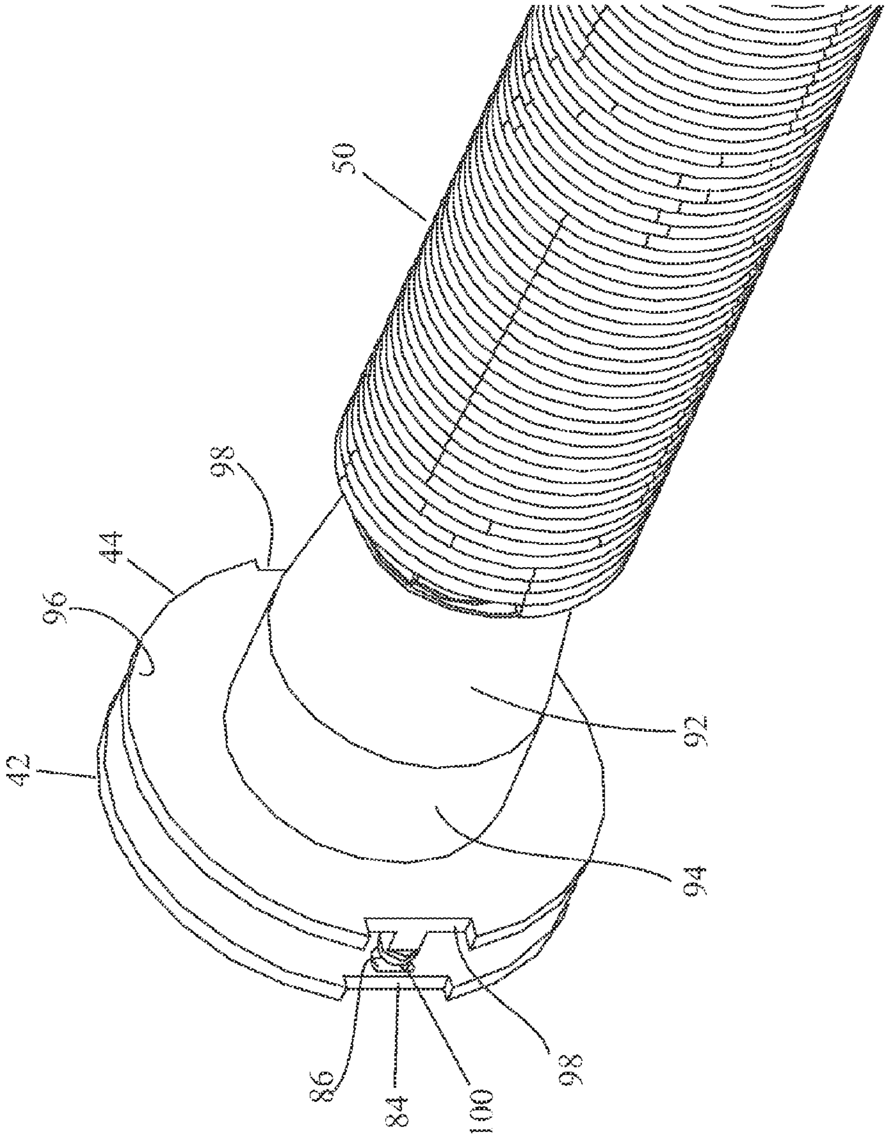
FIGS. 11, 12, and 13 are partially broken away, perspective views of progressive assembly steps of the spring to the drive plug of FIG. 10.
Figure 12:
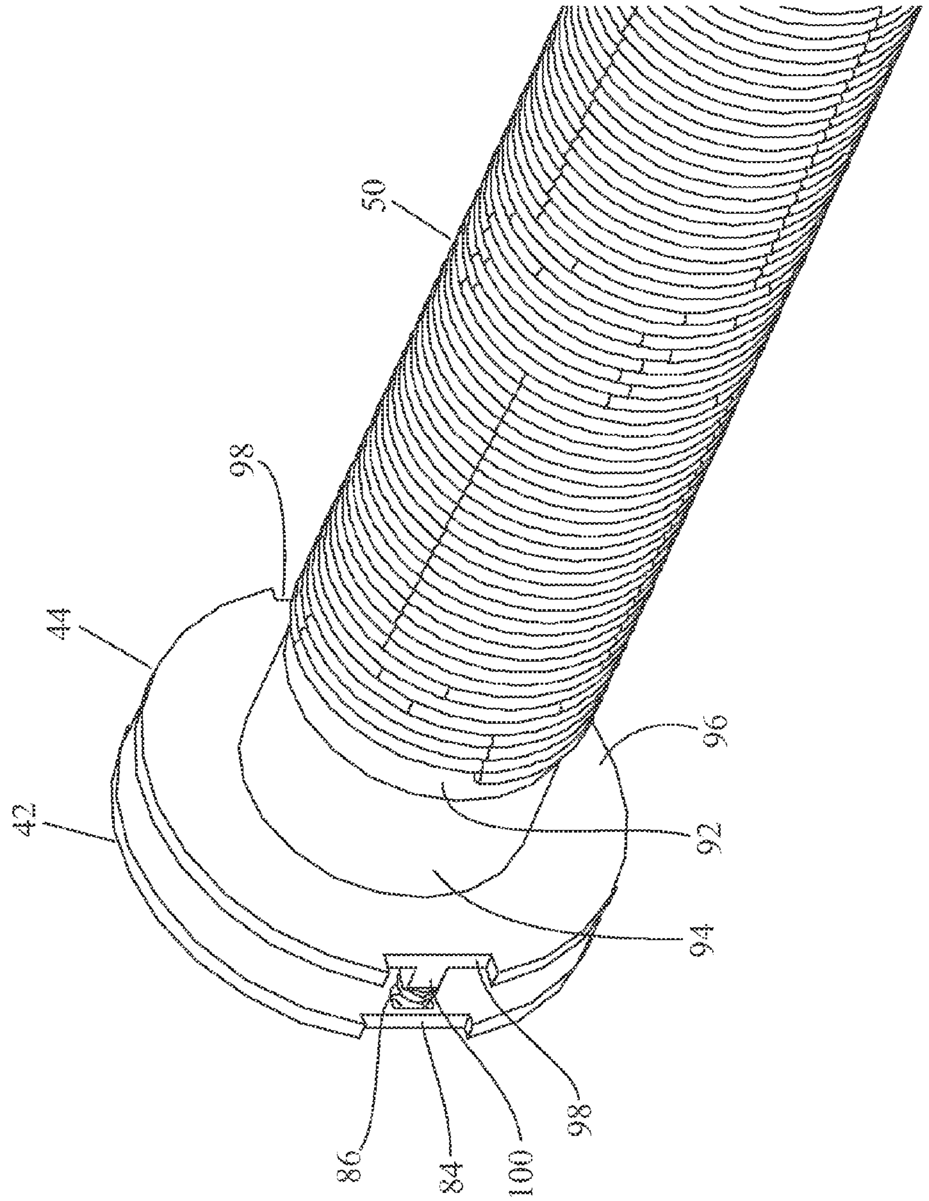
Figure 13:
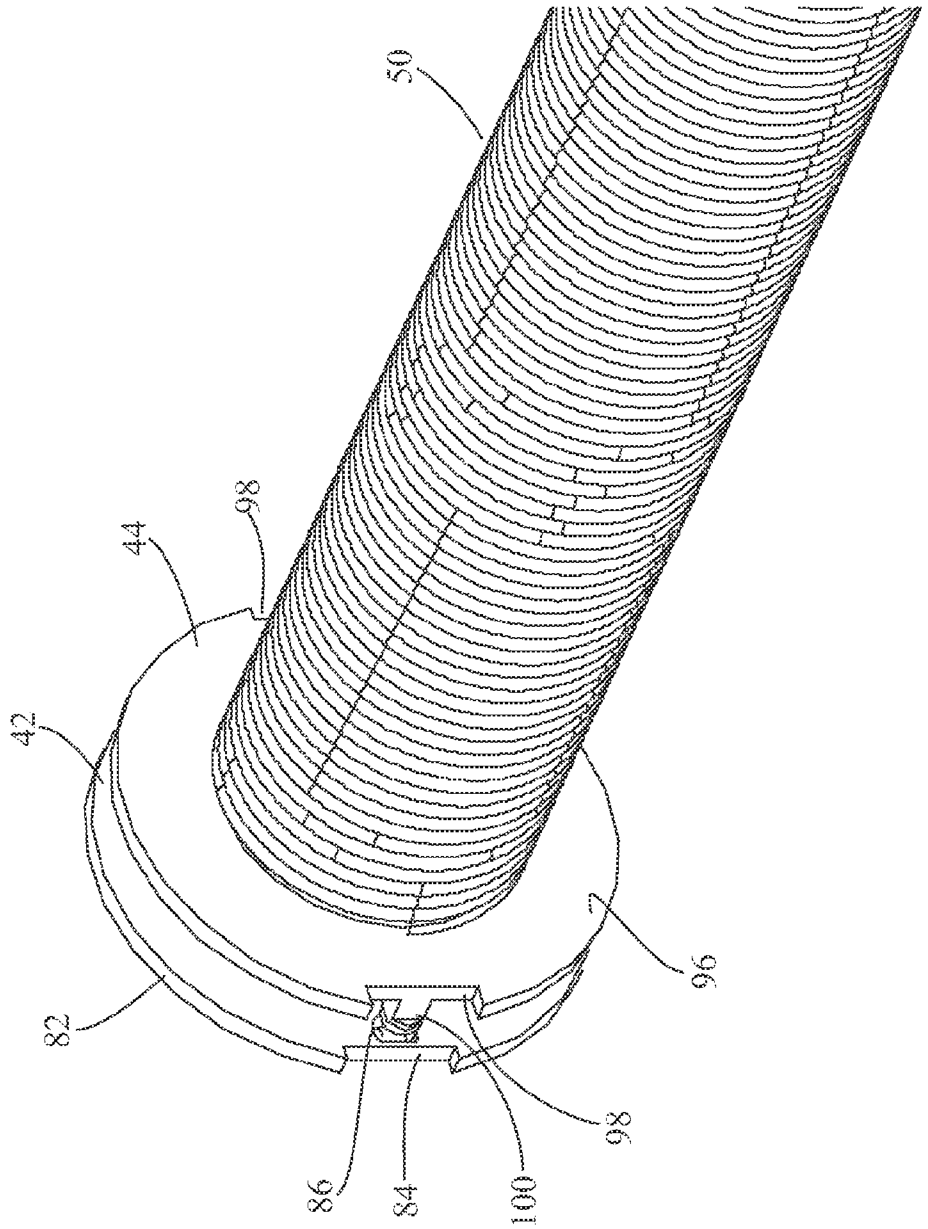

The spring 50 is a coil spring having first and second ends. Referring to FIGS. 11, 12, and 13, the spring 50 is assembled onto the drive plug 44 by lining up the first end of the spring 50 with the frustoconical portion 92 of the drive plug 44. The spring 50 is then "threaded" onto the drive plug 44 by rotating the spring 50 in a clockwise direction (as seen from the vantage point of FIG. 11). This "opens up" the spring 50, increasing its inside diameter and allowing it to be pushed onto and "threaded" up the tapered surface of the frustoconical portion 92 of the drive plug 44, as shown in FIG. 12. A final effort to push the spring 50 onto the drive plug 44 places the spring 50 fully onto the cylindrical portion 94 of the drive plug 44, until the first end of the spring 50 is abutting the flange 96 of the drive plug 44. When the spring 50 is released (that is, when it is no longer being "opened" by the clockwise rotation against the drive plug 44), it will collapse, reducing its inside diameter, so it clamps onto the cylindrical portion 92 of the drive plug 44. The second end of the spring 50 is similarly mounted onto and secured to the cylindrical portion 104 of the spring plug 52 (see FIG. 5). Note that the frustoconical portions of the drive plug 44 and of the spring plug 52 may be threaded (not shown in the figures) to assist in the assembly of the spring 50 to these plugs 44, 52.

Assembly:

To assemble the roller shade 10, the power assist modules 12 are first assembled as follows. As shown in FIGS. 9 and 10, the drive plug 44 is mounted for rotation onto the outer surface 80 of the drive plug shaft 42, with the flange 96 of the drive plug 44 adjacent to the flange 82 of the drive plug shaft 42 and with the projection 100 of the drive plug 44 not yet inserted into the through opening 86 of the drive plug shaft 42. The limiter 46 is threaded into the drive plug shaft 42 until the stop projection 66 on the limiter 46 impacts against the stop projection 68 on the drive plug shaft 42, as shown in FIG. 10. The spring 50 is then threaded onto the frustoconical portion 92 of the drive plug shaft 42, as described earlier and as shown in FIGS. 11, 12, and finally onto the cylindrical portion 94 of the drive plug shaft 42 as shown in FIG. 13. One end of the spring shaft 48 is inserted into the spring 50 until its ribs 56 are received in the cross-shaped groove 62 of the limiter 46. The spring plug 52 is then installed on the other end of the spring 50, with the groove 108 of the spring plug 52 receiving the ribs 56 of the spring shaft 48 and with the second end of the spring 50 threaded onto the cylindrical portion 104 of the spring plug 52. Note that so far the rod 24 has not yet been installed. The power assist modules 12 are now assembled as pictured in FIG. 4.

Prewinding the Power Assist Module:

Referring to FIG. 13, to "pre-wind" the power assist module 12, the assembler holds onto the drive plug shaft 42 while rotating the drive plug 44 in a clockwise direction (as seen from the vantage point of FIG. 13). This causes the spring 50 to start winding up relative to its other end, which is stationary (non-rotating). The other end of the spring 50 is non-rotating because it is secured to the spring plug 52, which is connected to the spring shaft 48 via the cross-shaped groove 108 on the spring plug 52, which is engaged with the cross-shaped ribs 56 on the spring shaft 48. The spring shaft 48 is in turn connected to the limiter 46 (as shown in FIG. 10) via the groove 62 on the limiter 46 which also receives the cross-shaped ribs 56 on the spring shaft 48. The limiter 46 is prevented from rotation because the stop projection 68 on the drive plug shaft 42 is impacting against the stop projection 66 on the limiter 46, and the assembler is holding onto the drive plug shaft 42 to prevent its rotation.

Figure 14:
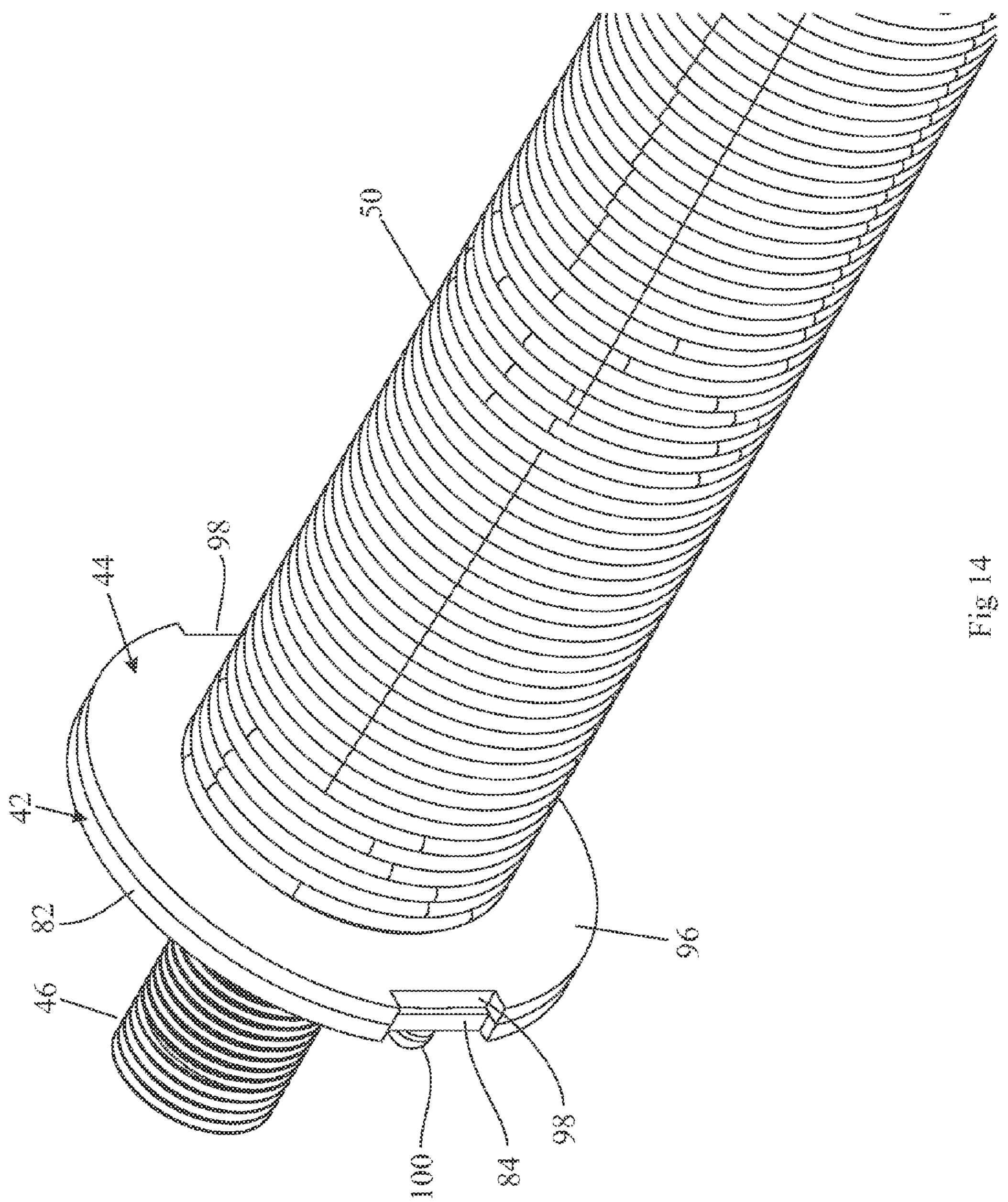
FIG. 14 is a partially broken away, perspective view of the step for locking the drive plug to the drive plug shaft once the desired degree of "pre-wind" has been added to the power assist module.
Figure 15:
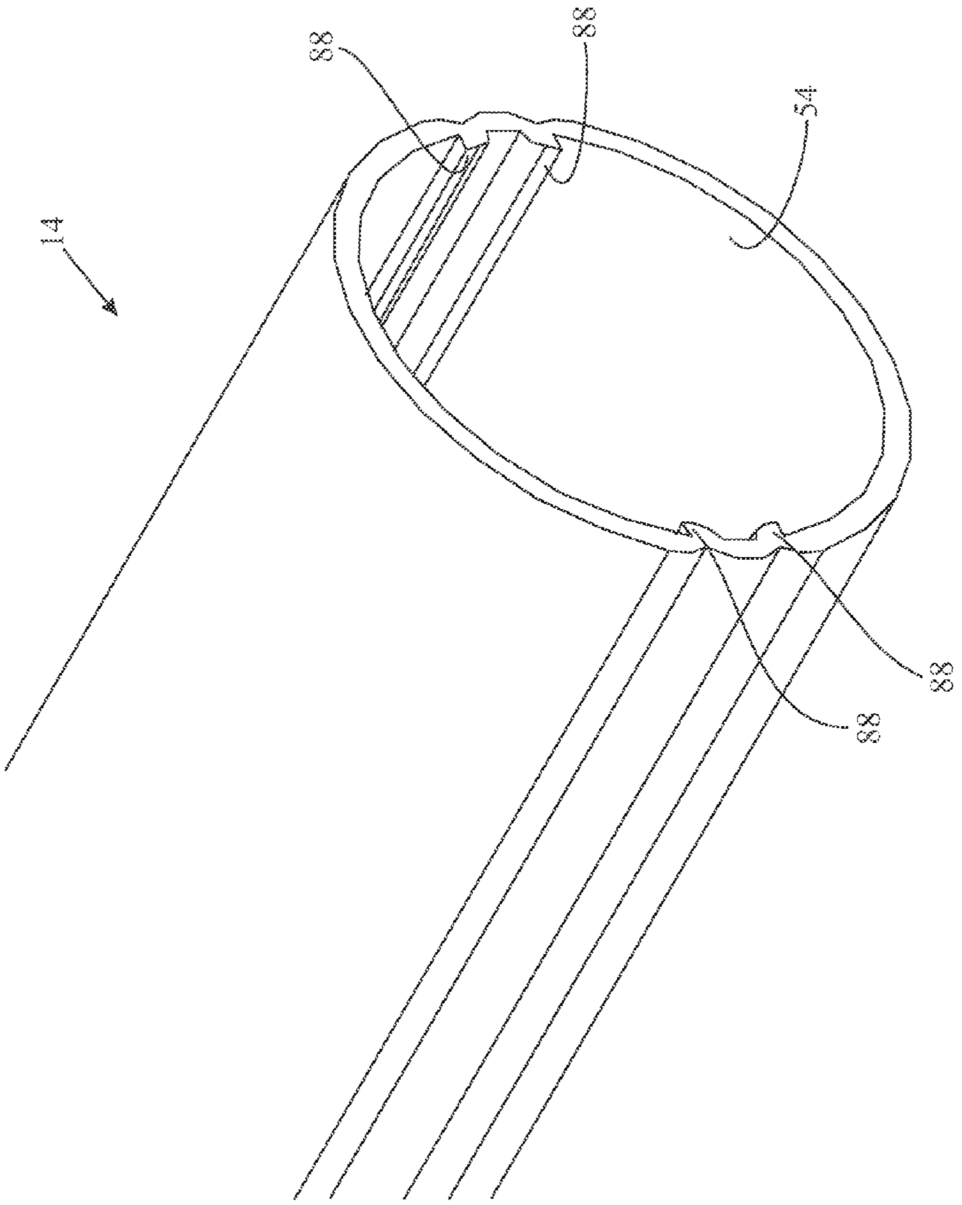
FIG. 15 is a partially broken away, perspective end view of the rotator ail of FIGS. 1 and 2.

It can therefore be seen that, as the assembler rotates the drive plug 44 while holding onto the drive plug shaft 42, he is winding up the spring 50. Every time the projection 100 on the drive plug 44 rotates past the through opening 86 on the drive plug shaft 42, the spring 50 will have one complete turn of "pre-wind" added to it. Once the desired degree of "pre-wind" is reached, the assembler lines up the projection 100 on the drive plug 44 with the opening 86 in the drive plug shaft 42 and snaps the drive plug 44 and the drive plug shaft 42 together as shown in FIG. 14, with the flange 96 of the drive plug 44 in direct contact with the flange 82 of the drive plug shaft 42 and with the projection 100 of the drive plug 44 extending through the opening 86 in the flange 82 of the drive plug shaft 42. This "locks" the "pre-wind" onto the power assist module 12. The power assist module 12 is now assembled and "pre-wound" and is ready for installation in the roller shade 10. Note that more than one projection 100 on the drive plug 44 and/or more than one opening 86 in the drive plug shaft 42 may be present. In any event, the flats 84 on the drive plug shaft 42 line up with the flats 98 on the drive plug 44 so they may all catch the ribs 88 (See FIG. 15) of the rotator rail 14, as explained in more detail below.

From the foregoing discussion, it should be clear that the pre-winding method involves holding one end of the spring 50 to prevent its rotation, while the other end of the spring 50 is rotated. Referring to FIG. 4, in the pre-wind method described above, the right end of the spring 50 is held against rotation by the spring plug 52 (which is connected to the limiter 46 via the spring tube 48, all of which are prevented from rotation relative to the drive plug shaft 42, which is being held stationary by the person who is doing the prewinding. Using this pre-winding method, the spring 50 can only be pre-wound in discrete quantities, such as in one revolution increments for the embodiment depicted in FIG. 9.

Each power assist module 12 may be "pre-wound" to the desired degree of "pre-wind" independently of the other power assist modules 12 in the roller shade 10. For instance, some of the power assist modules 12 may be installed with no "pre-wind", while others may have one or more turns of "pre-wind" added to them prior to installation onto the roller shade 10. It should once again be noted that so far the rod 24 has not yet been installed. However, each power assist module 12 is an independent unit which may be stocked or shipped to an installer already with a desired degree of "pre-wind". This degree of "pre-wind" may be changed by simply separating the drive plug 44 from the drive plug shaft 42 far enough to free the projection 100 on the drive plug 44 from the through opening 86 of the drive plug shaft 42, which "unlocks" the power assist module 12 so that the degree of "pre-wind" may be adjusted by rotating the drive plug 44 clockwise relative to the drive plug shaft 42 to add more "pre-wind" or by rotating the drive plug 44 counterclockwise relative to the drive plug shaft 42 to reduce the degree of "pre-wind" and then re-inserting the projection 100 on the drive plug 44 through the through opening 86 of the drive plug shaft 42 to again lock the drive plug 44 and drive plug shaft 42 together.

Alternate Method for Pre-Winding the Power Assist Module 12:

Instead of pre-winding as described above, at the drive plug end of the spring 50, another alternative is to prewind at the spring plug end of the spring 50. Referring again to FIGS. 4 and 5, the user holds onto the spring 50 at its rightmost end, near the spring plug 52, to prevent the rotation of the spring 50. He then grasps the flange 60 on the spring plug 52 and rotates it clockwise. This action "opens up" the end of the spring 50, allowing the spring plug 52 to be rotated while the rightmost end of the spring 50 is held against rotation. Rotation of the spring plug 52 also causes rotation of the spring tube 48, the limiter 46, the drive plug shaft 42, drive plug 44 (which is snapped together for rotation with the drive plug shaft 42) and the leftmost end of the spring 50 (adjacent the drive plug 44). Since the user is holding the rightmost end of the spring 50 against rotation, rotation of the left end of the spring 50 by means of rotating the spring plug 52 prewinds the spring 50. Using this procedure, the spring 50 may be pre-wound any desired amount, including any fractional number of revolutions for an infinitely adjustable degree of pre-wind of the spring 50. As soon as the user stops rotating the spring plug 52, the rightmost end of the spring 50 will "collapse" back onto the cylindrical portion 104 of the spring plug 52, locking onto the spring plug 52 to keep the desired pre-wind on the spring 50.

It should be noted that, if this alternative pre-wind procedure is used, the two-piece, snap together design of the drive plug shaft 42 and drive plug 44 is not needed and may be replaced by a single piece unit. However, the two-piece design described herein still has another advantage in that it provides an easy way to release any degree of pre-wind on the spring 50 simply by separating the drive plug shaft 42 from the drive plug 44. As soon as these two parts 42, 44 are unsnapped and released, the spring 50 will uncoil and lose all its pre-wind.

Referring now to FIGS. 2 and 8, to assemble the roller shade 10, the tube bearing 30 is mounted onto the shaft 32 of the bracket clip 16. The rod 24 is inserted, with a forced interference fit, into the inner bore 112 of the bracket clip 16, and the speed nut 28 is slid onto the rod 24 (from the left end as shown in FIG. 8) until it reaches the end of the inner bore 112 of the bracket clip 16. This prevents the tube bearing 30 from falling off of the bracket clip 16 because the tube bearing shaft 35 cannot pass over the flange of the speed nut 28 at the end of the bracket clip 16. One or more power assist modules 12 are then installed onto the rod 24 by sliding them onto the left end of the rod 24. The rod 24 engages the spring plug 52 and the limiter 46 of each power assist module 12 such that they are able to slide axially along the length of the rod 24, but they are unable to rotate relative to the rod 24. Since the rod 24 is axially secured to the bracket clip 16 and is prevented from rotating relative to the bracket clip 16, and since the bracket clip 16 is secured to a bracket which is mounted to a wall or to a window frame, then the rod 24 and the spring plugs 52 and limiters 46 of the power assist modules 12 are all mounted so they do not rotate relative to the wall or window frame.

The spring shaft 48 of each module 12 is both slidably and rotatably supported on the rod 24. The drive plug shaft 42 is threaded onto the non-rotating limiter 46, and the drive plug 44 is rotatably supported on the drive plug shaft 42 and is locked for rotation with the drive plug shaft 42 via the projection 100 inserted through the opening 86 on the drive plug shaft 42.

Once the desired number of modules 12 is slid onto the rod 24, the speed nut 26 is then slid onto the end of the rod 24 to the desired position, as shown in FIG. 2, to serve as a stop for the drive plug shaft 42 of the last module 12 by the flange of the speed nut 26 abutting the flange 82 of the drive plug shaft 42. This keeps the power assist modules 12 from sliding out beyond the rotator rail 14. The rotator rail 14 is then slid from left to right over the entire subassembly, making sure that the ribs 88 (See FIG. 15) on the inner surface 54 of the rotator rail 14 are received in the flat recesses 84, 98 on each drive plug shaft 42 and drive plug 44, respectively (and in the similar flat recesses on the tube bearing 30, as shown in FIG. 7C). The rotator rail 14 slides all the way over all the power assist modules 12 and fits snugly over the generally cylindrical outer surface 38 of the tube bearing 30 until it is stopped by the shoulder 40 of the tube bearing 30.

Finally, the cord drive mechanism 18 is installed, which includes a drive spool (not shown) which engages the left end of the rotator rail 14 and causes it to rotate.

Operation:

As was already described earlier, when the tassel weight 20 of the drive mechanism 18 is pulled down by the user, the drive cord 22 (which wraps around a capstan and onto a drive spool, not shown) is also pulled down. This causes the capstan and the drive spool to rotate about their respective axes of rotation in a first direction in order to retract the shade. The rotator rail 14 is secured to the drive spool for rotation with the drive spool about the same axis of rotation as the drive spool. (Like the tube bearing 30, the drive spool also has flat recesses that receive the internal ribs 88 of the rotator rail 14.) As the rotator rail 14 rotates in the first direction, with the user pulling down on the drive cord 22, the shade is retracted with the help of the springs 50. The right end of each spring 50 (from the perspective of FIG. 8) does not rotate, since the spring plug 52 on which it is mounted does not rotate. The left end of each spring 50 drives the drive plug 44 on which it is mounted and the respective drive plug shaft 42 that is connected to the drive plug 44 by means of the projection 100 and by means of the rotator rail 14, which has internal ribs 88 that key the rotator rail 14 to all the drive plugs 44 and drive plug shafts 42. Thus, as the springs 50 drive their respective drive plugs 44, they drive the rotator rail 14 in the first direction, with the assistance of the user pulling down on the drive cord, which drives the drive mechanism 18 and the rotator rail 14 in the first direction, to retract the shade.

The "pre-wind" in the power assist modules 12 provides force to retract the roller shade 10 all the way until the shade is completely retracted. Once the shade is completely retracted, the stop projection 66 on the limiter 46 impacts against the stop projection 68 on the drive plug shaft 42 to prevent any further rotation of the rotator rail 14.

When the user releases the tassel weight 20, the force of gravity acting to extend the shade urges the rotation of the drive spool in the opposite direction. This pulls up on the drive cord 22 which shifts the capstan to a position where the capstan is not allowed to rotate. This locks up the roller lock mechanism so as to prevent the shade from falling (extending).

To extend the shade, the user lifts up on the tassel weight 20, which relieves tension on the drive cord 22, allowing the cord 22 to surge the capstan (as described in US2006/0118248). The drive spool and the rotator rail 14 are then allowed to rotate in a second direction due to the force of gravity acting to extend the shade, overcoming the force of the power assist modules 12. This causes the power assist modules 12 to wind up in preparation for when they are called to assist in retracting the shade again. When the user releases the tassel weight 20 again, the gravitational force acting on the tassel weight 20 puts enough tension on the drive cord 22 to prevent any further surging of the capstan, which locks the roller lock mechanism and locks the roller shade in place (as indicated earner, other alternative cord operated locking mechanisms could be used).

It should be noted that in this first embodiment of the roller shade 10, described above, the rod 24 is supported and secured against rotation by the non-drive end bracket clip 16 (See FIG. 8). The spring plug 52 is keyed to the rod 24, so it also is secured for non-rotation to the non-drive end bracket clip 16. The limiter 46 is also keyed to the rod 24, so it also is secured for non-rotation to the non-drive end bracket clip. As the rotator rail 14 (See FIG. 1) is extended, its inside surface 54 (See FIG. 15) engages the drive plug 44 and the drive plug shaft 42 (via the projections 88 which engage the flats 84, 98 (See FIG. 14) of the drive plug shaft 42 and of the drive plug 44, respectively. The drive plug shaft 42 threads itself partially off of the limiter 46 as the spring 50 winds up.

When retracting the roller shade 10, the rotator rail 14 is urged to rotate by the spring 50 so as to unwind the spring 50, and this action re-threads the drive plug shaft 42 onto the limiter 46 until the stop 66 on the limiter 46 impacts against the stop 68 on the drive plug shaft 42, preventing any further rotation of the drive plug shaft 42 and therefore also of the rotator rail 14, and this corresponds to the fully retracted position of the rotator rail 14.

Additional Embodiments

Additional embodiments described below operate in substantially the same manner as the first embodiment 10 described above, with the following main differences in implementation of the design:

The rod 24 may be secured against rotation to either the drive end or the non-drive end of the roller shade, whereas the first embodiment could only be secured against rotation to the non-drive end. This is accomplished by using a coupler.

Instead of keying the limiter to the rod 24, it is secured via swaging to the spring shaft.

The spring shaft has a "C" cross-section, and it is preferably made from a material, such as extruded aluminum, that is torsionally strong enough to handle the torque applied by the spring 50.

The rod 24 is keyed only to a single element (the spring plug) in each power assist module, which facilitates the installation of the rod 24 through the power assist modules.

The designs of the drive plug shaft and of the drive plug are slightly different from the first embodiment.

Rotator rail adaptors may be added at the spring plug end of each power assist module to provide additional support for the rod 24. These rotator rail adaptors mount onto, but rotate independently from, their corresponding spring plugs and may accommodate a range of rotator rail sizes (diameters).

The above changes are described in more detail below.

FIGS. 16-38 show a second embodiment of a roller shade 10' made in accordance with the present invention. The same item numbers are used for this second embodiment 10' as were used for the first embodiment 10, with the addition of a "prime" designation (as in 10') to differentiate the second embodiment from the first embodiment.

Figure 16:
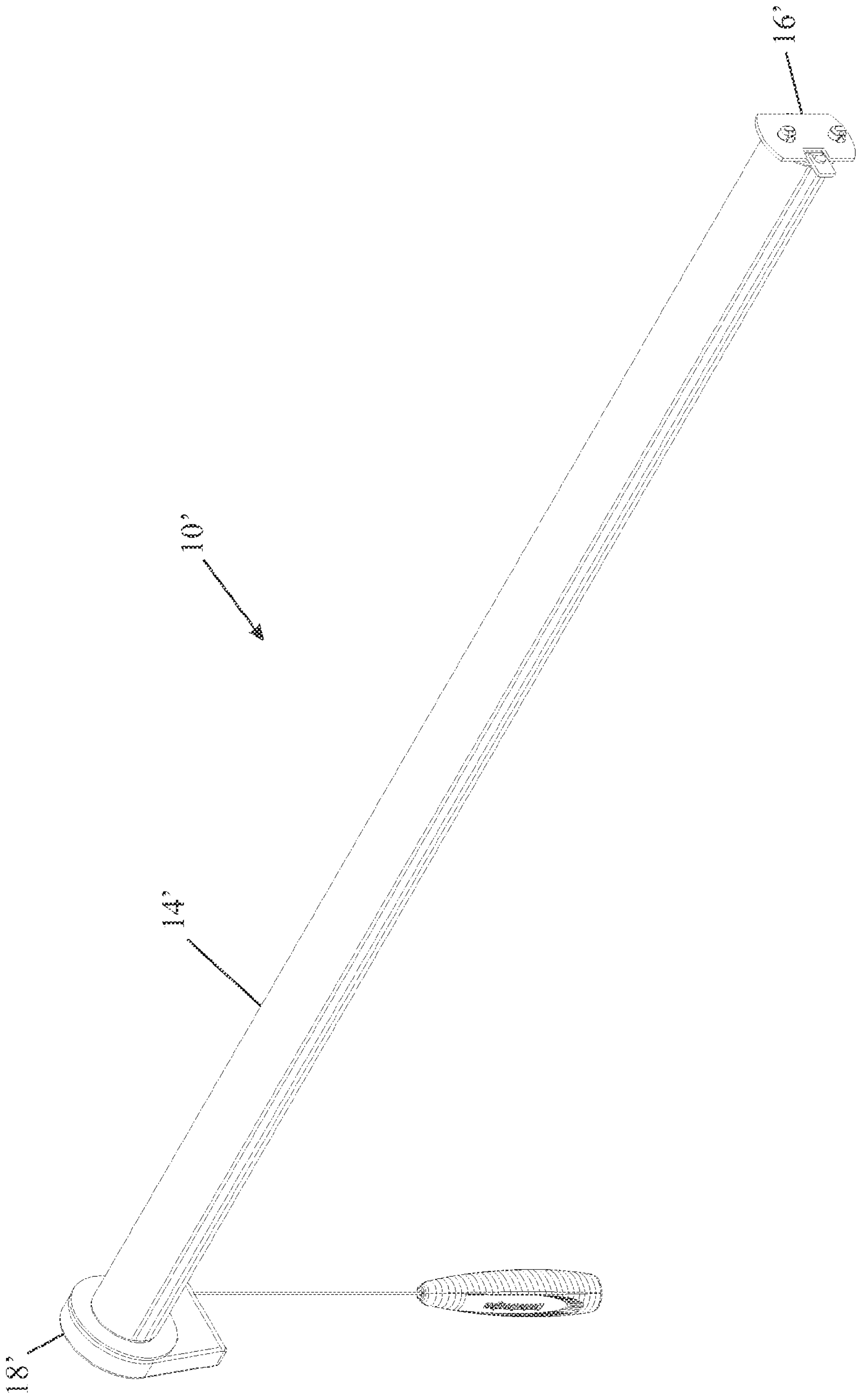
FIG. 16 is a perspective view of a second embodiment of a window roller shade including a control mechanism for extending and retracting the shade.
Figure 17:
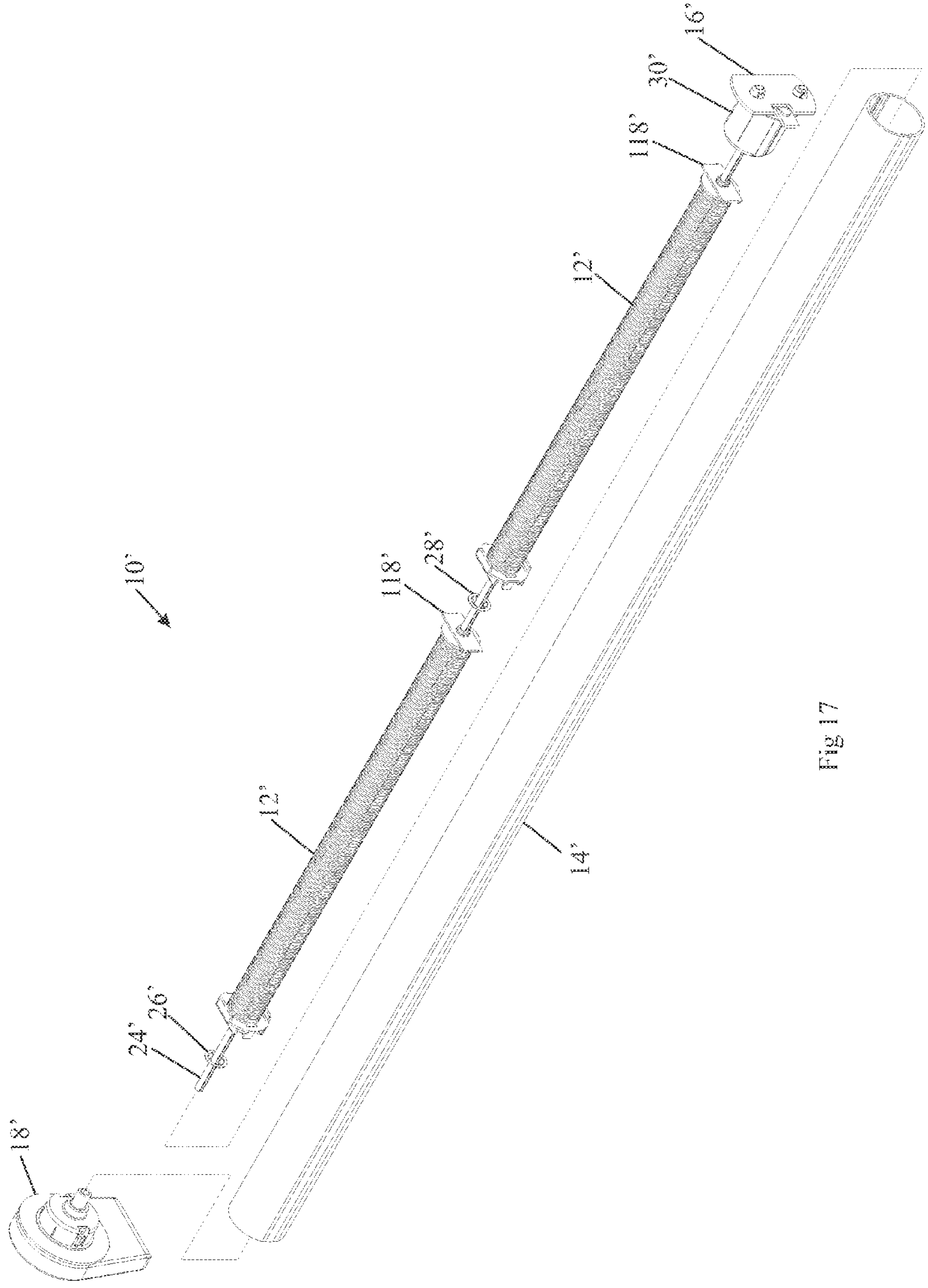
FIG. 17 is a partially exploded perspective view of the roller shade of FIG. 16.
Figure 18:
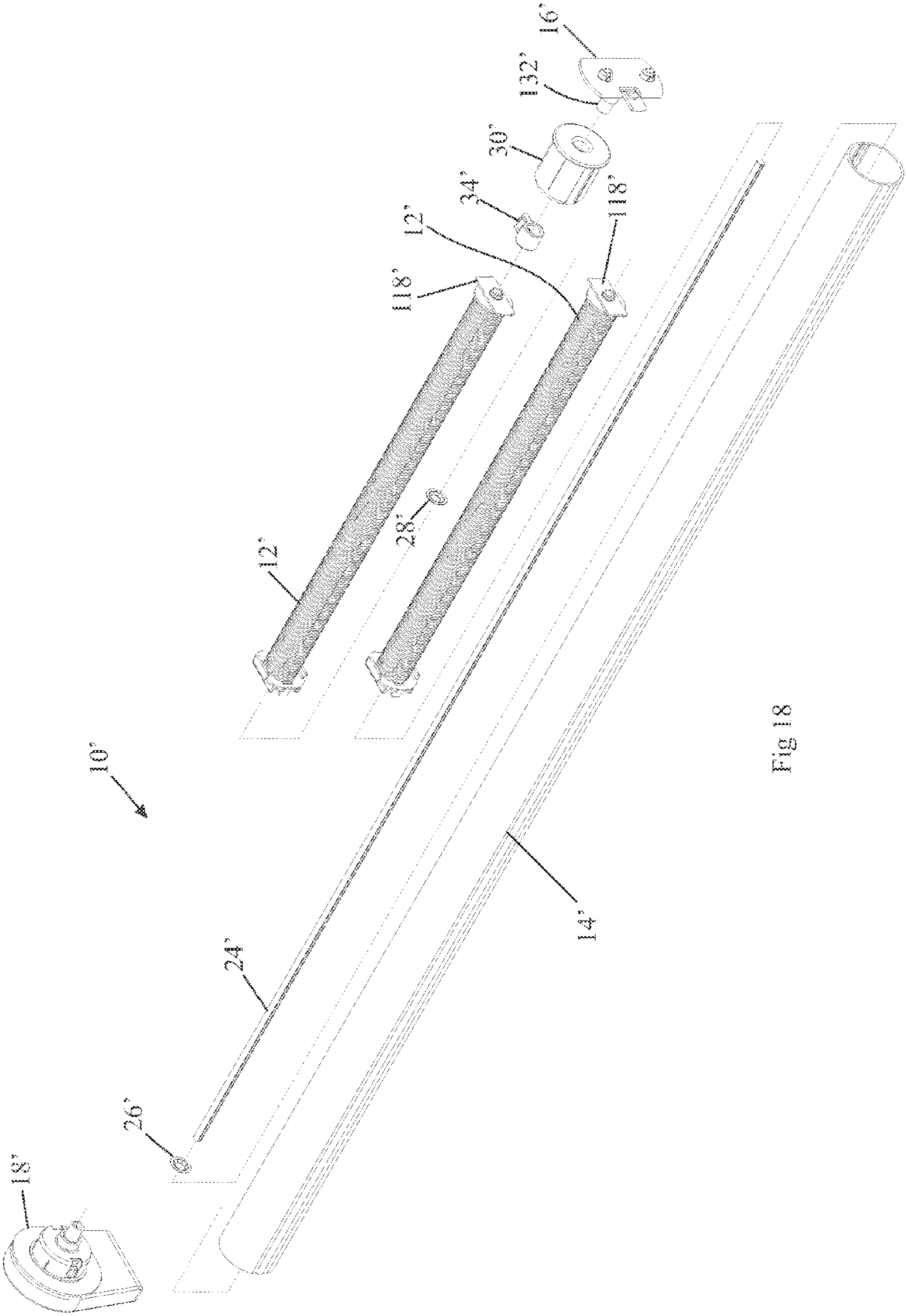
FIG. 18 is a partially exploded perspective view of the roller shade of FIG. 17.

Referring to FIGS. 16-18, the roller shade 10' includes a drive mechanism 18', which is identical to the drive mechanism 18 in the first embodiment. Other alternative drive mechanisms may be used, as known in the art. The roller shade 10' also includes a rotator rail 14', a non-drive end bracket clip 16', a rod 24', first and second speed nuts 26', 28', a tube bearing 30', a coupler 34' (See FIG. 18), and one or more power assist modules 12'. As explained later, the power assist modules 12' may include rotator rail adaptors 118'. It should be noted that the rod 24' in this second embodiment of a roller shade 10' is secured for non-rotation to the non-drive end bracket clip 16' via the coupler 34'. A third embodiment 10" shown in FIGS. 39-41 has the rod 24' secured for non-rotation to the drive mechanism 18' via the coupler 34', as explained in more detail later. The aforementioned components are substantially identical to their counterparts in the first embodiment 10 with the exception of the coupler and the rotator rail adaptors (which were absent in the first embodiment 10) and the power assist modules 12' which have structural differences but function in substantially the same manner, as explained in more detail below.

Referring to FIGS. 19-26, each power assist module 12' includes a drive plug shaft 42', a drive plug 44', a limiter 46', a spring shaft 48', a spring 50', a spring plug 52', and may include a rotator rail adaptor 118'.

Figures 19, 20:
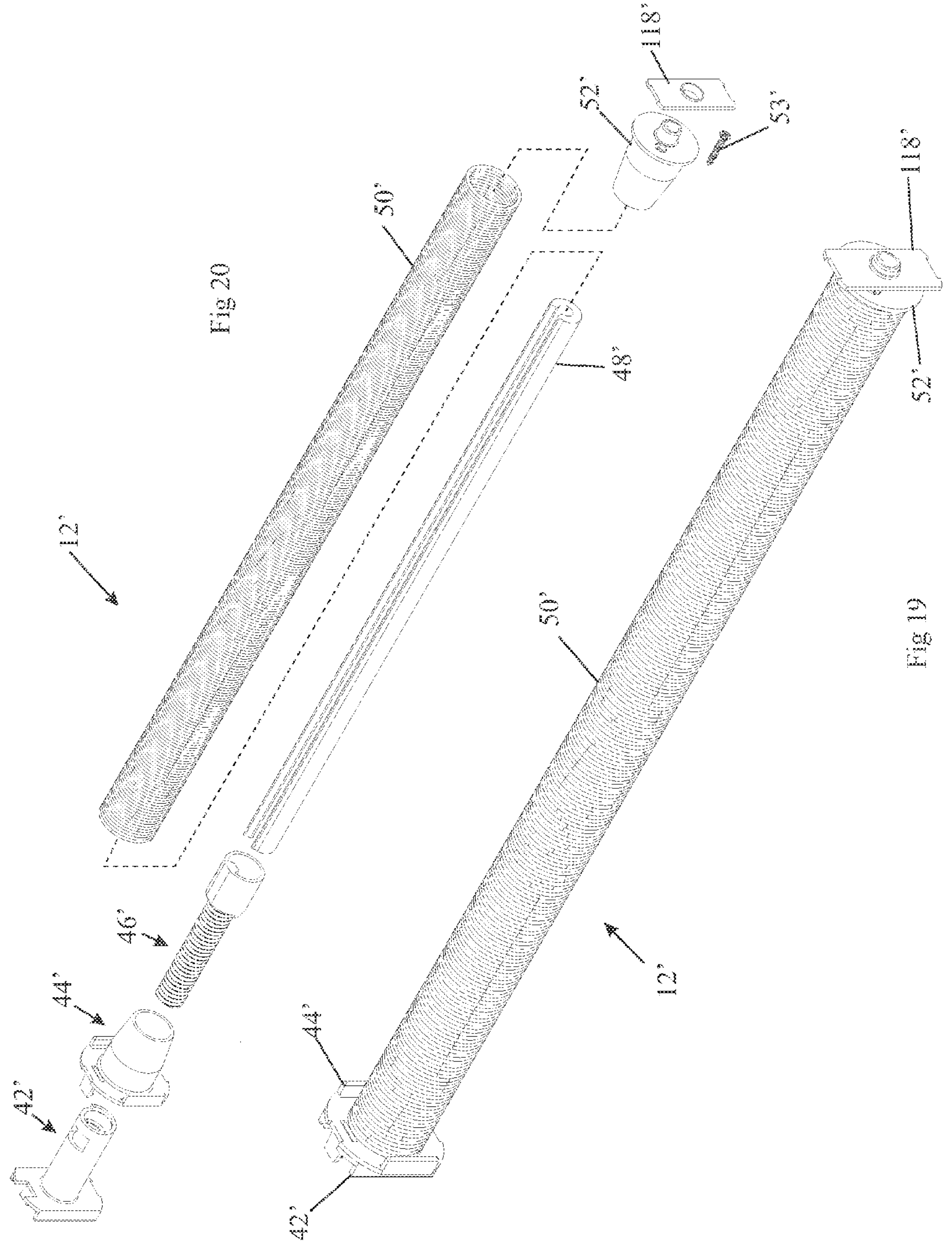
FIG. 19 is a perspective view of one of the power assist modules of FIG. 18.
FIG. 20 is an exploded perspective view of the power assist module of FIG. 19.
Figure 21:
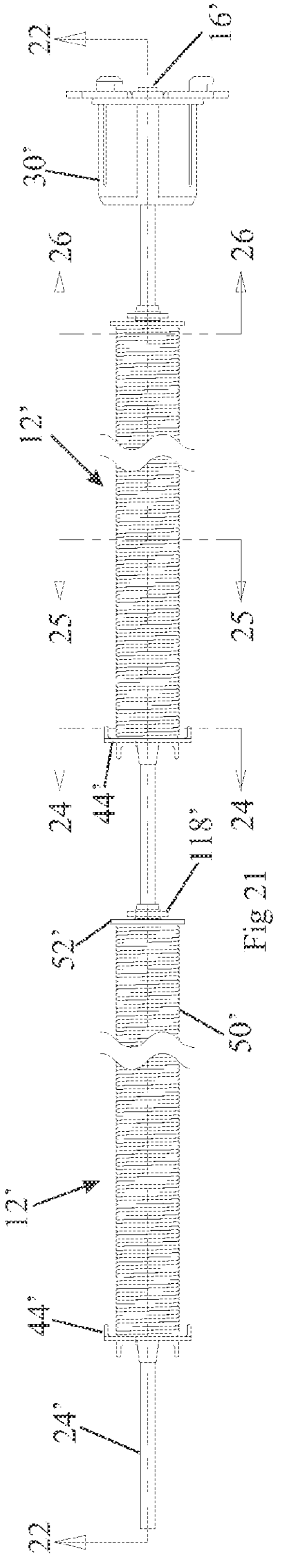
FIG. 21 is a side view of the roller shade of FIG. 16, with the rotator rail and the control mechanism omitted for clarity.
Figure 26:
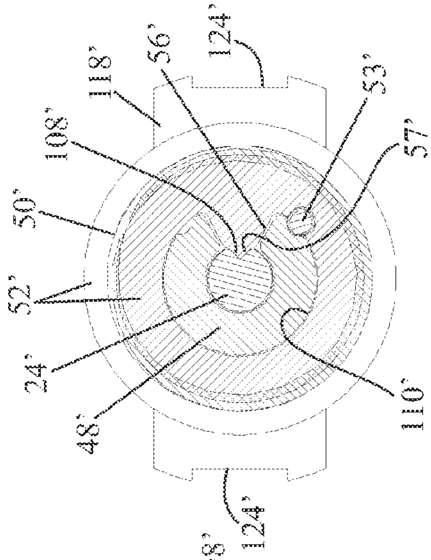
FIG. 26 is a view along line 26-26 of FIG. 21.
Figure 25:
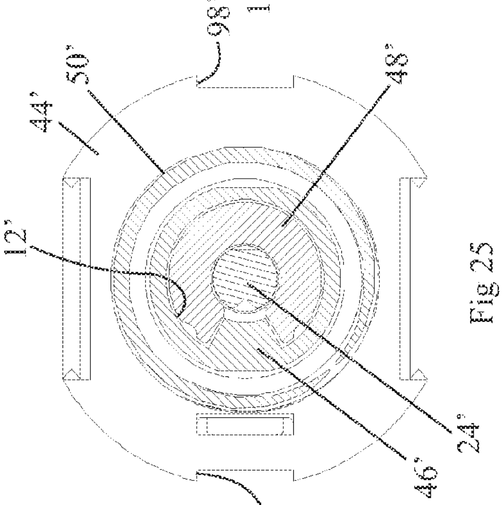
FIG. 25 is a view along line 25-25 of FIG. 21.
Figure 24:
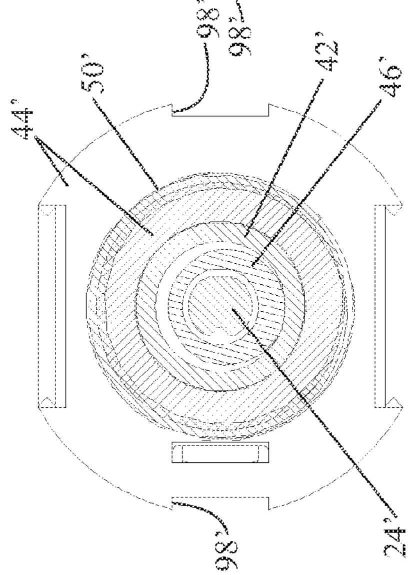
FIG. 24 is a view along line 24-24 of FIG. 21.
Figure 28:
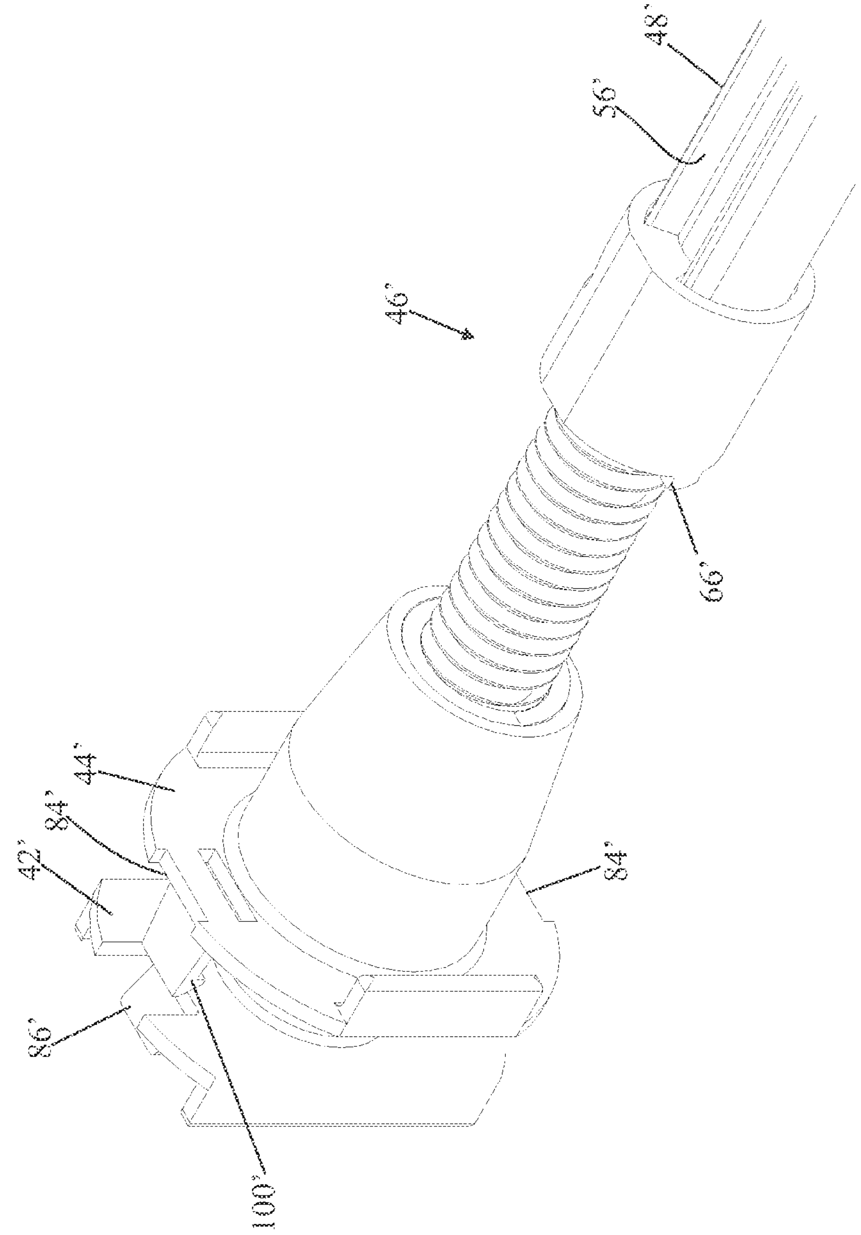
FIG. 28 is a partially broken away, perspective view of a preliminary assembly step of the drive plug shaft, the drive plug, and the limiter of FIG. 9, also including the spring shaft.
Figure 30B:
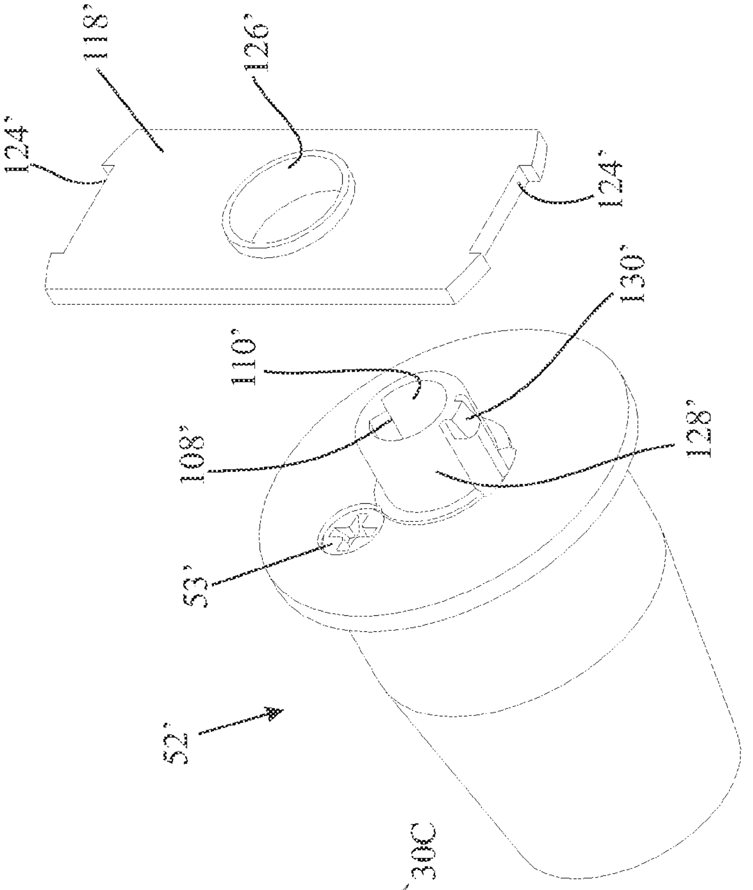
FIG. 30B is an exploded, perspective view of the spring plug and rotator rail adaptor of FIG. 30A.

Referring to FIGS. 20 and 28, the spring shaft 48' is an elongated element, preferably made from a material such as extruded aluminum (or other material of sufficient torsional strength), with a "C" channel cross-section (as may also be appreciated in FIGS. 25 and 26). As shown in FIGS. 26 and 30B, the spring plug 52' defines an inner bore 110' with a substantially "V" shaped projection 108' which, as best appreciated in FIG. 26, is received in the substantially "V" shaped notch 56' in the "C" channel cross-section of the spring shaft 48', and in the substantially "V" shaped notch 57' of the rod 24' such that the spring plug 52', spring shaft 48' and rod 24' are locked together for non-rotation. To summarize, the "V" shaped projection 108' of the spring plug 52' extends through both the "V" shaped notch 56' in the "C" channel cross-section of the spring shaft 48' and the "V" shaped notch 57' of the rod 24', locking all three of the items for non-rotation relative to each other.

The spring shaft 48' is further secured to the spring plug 52' via a screw 53' (See also FIGS. 20, 26 and 30B) which is threaded between the inner bore 110' of the spring plug 52' and the outer surface of the spring shaft 48' to lock these two parts 52', 48' together against separation in the axial direction.

Figure 27:
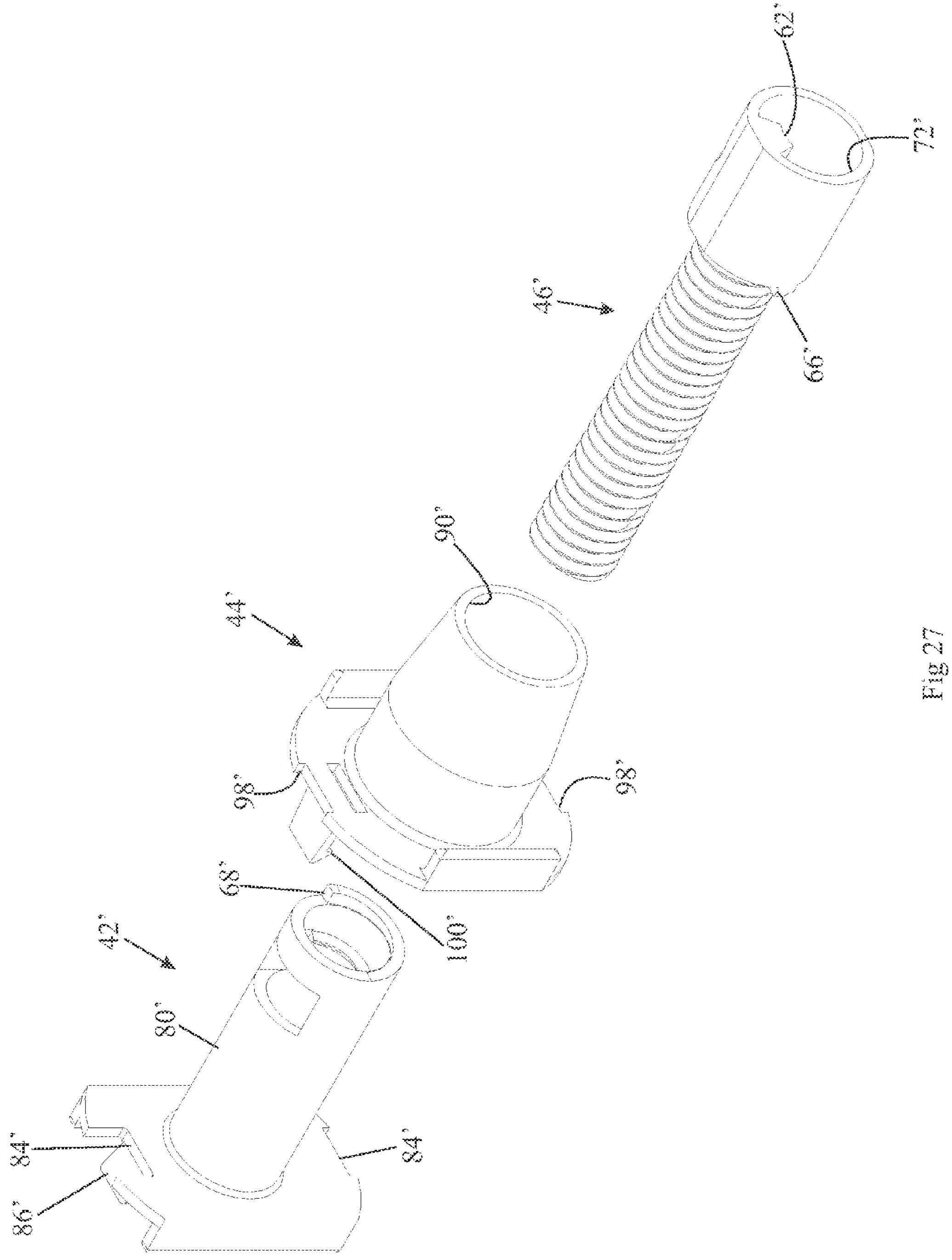
FIG. 27 is an exploded perspective view of the drive plug shaft, the drive plug, and the limiter of the power assist module of FIG. 20.

As shown in FIGS. 25, 27 and 28, the other end of the spring shaft 48' fits into the inner bore 72' of the limiter 46', with the substantially "V" shaped projection 62' of the limiter 46' fitting into the substantially "V" shaped notch 56' in the "C" channel cross-section of the spring shaft 48', such that both of these parts 46', 48' are locked together for non-rotation relative to each other, as shown in FIG. 25.

Figure 36:
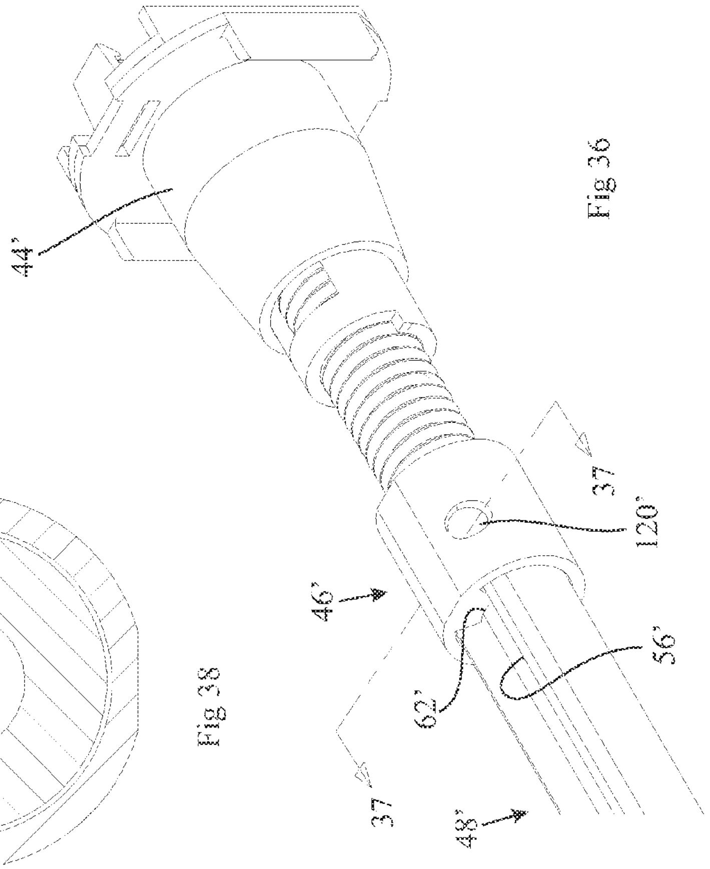
FIG. 36 is a perspective view of the drive plug, the limiter, and the spring shaft, similar to FIG. 28, but shown from the opposite side, detailing the location for impacting the limiter to swage the spring shaft to the limiter.
Figure 38:
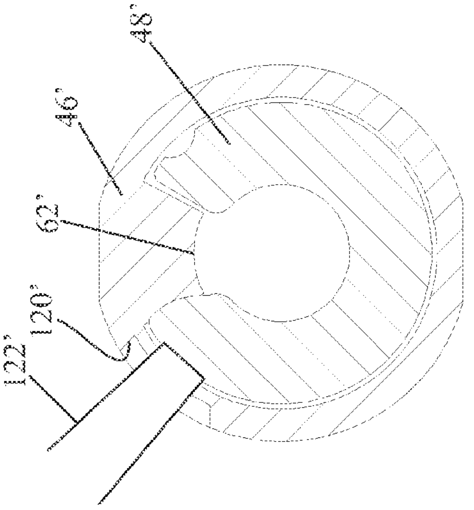
FIG. 38 is a section view identical to that of FIG. 37, but immediately after impacting a punch to the spring shaft so as to swage the spring shaft to the limiter.
Figure 37:
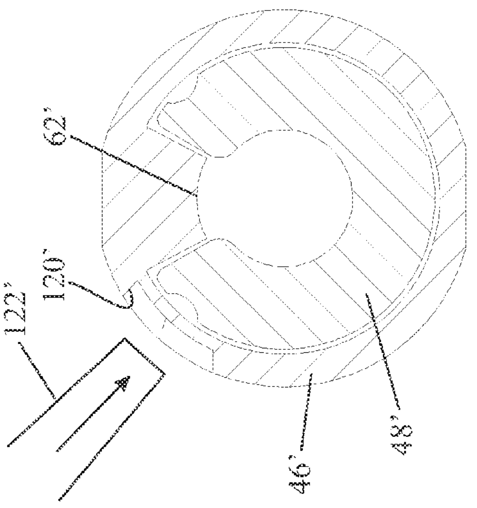
FIG. 37 is a section view along line 37-37 of FIG. 36, prior to swaging the spring shaft to the limiter.

Referring now to FIGS. 36-38, the limiter 46' includes a thinned-out spot 120' to indicate the location where the spring shaft 48' may be hit in the radial direction with a center punch 122', punching through the limiter 46' to swage the spring shaft 48' against the substantially "V" shaped projection 62' of the limiter 46' to lock these two parts 46', 48' together so they will not slide relative to each other in the axial direction.

Thus, the assembly of the spring plug 52', the spring shaft 48', and the limiter 46' is secured together for non-rotation relative to each other as well as for non-separation in the axial direction. In this assembly, only the spring plug 52' engages the rod 24' during final assembly (as shown in FIG. 26) to prevent rotation of the assembly relative to the rod 24', but the assembly permits sliding motion of the spring plug 52', spring shaft 48' and limiter 46' in the axial direction relative to the rod 24'. As explained in more detail later, the rod 24' is secured for non-rotation either to the non-drive end bracket clip 16' or to the drive mechanism 18' via a coupler 34'.

Figure 29:
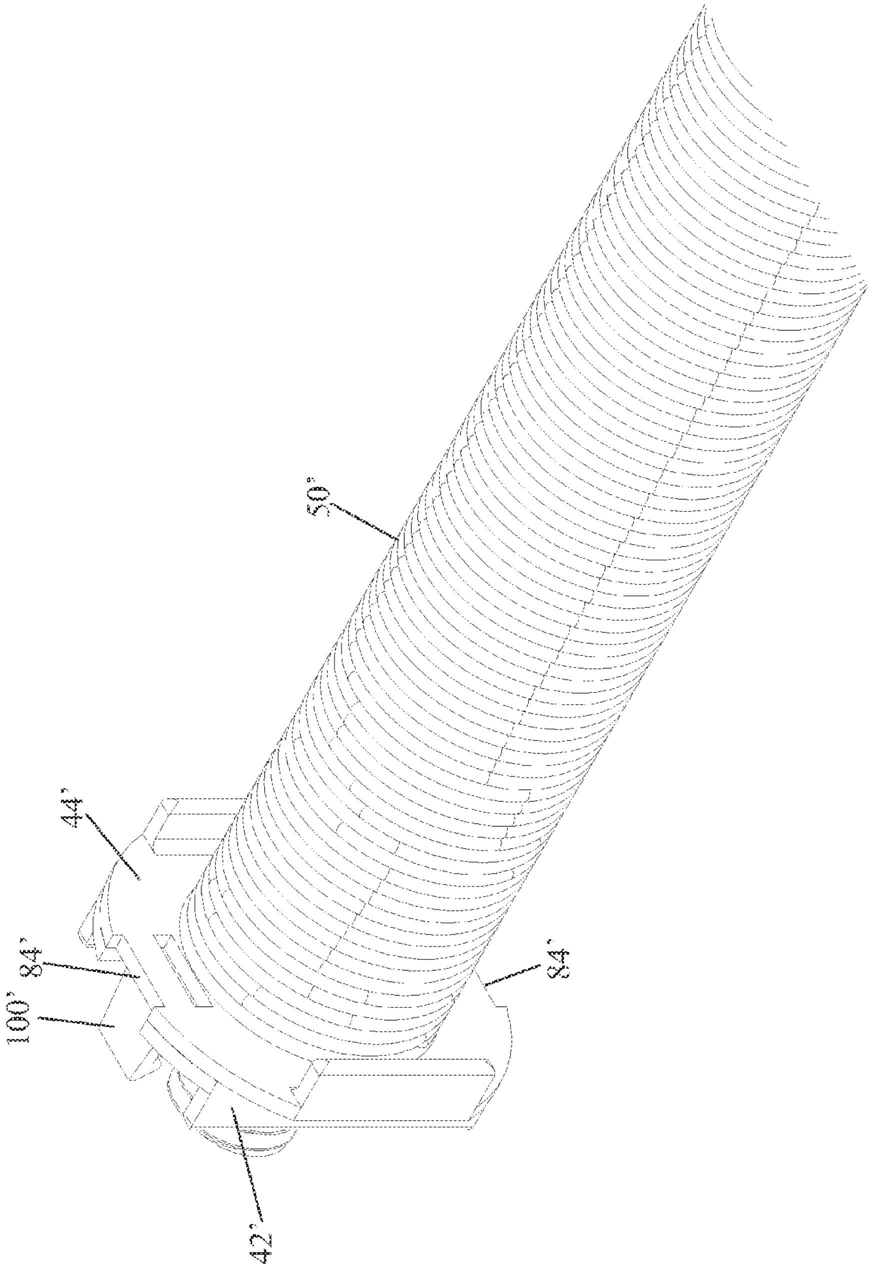
FIG. 29 is a partially broken away, perspective view of the step for locking the drive plug to the drive plug shaft once the desired degree of "pre-wind" has been added to the power assist module.

Referring now to FIGS. 27-29, the drive plug 44' is very similar to the drive plug 44 of the first embodiment, with flats 98' which receive and engage the ribs 88 (See FIG. 15) of the rotator rail 14 for positive rotational engagement of these two parts 44', 14. The inner bore 90' of the drive plug 44' is supported for rotation by the smooth external surface 80' of the drive plug shaft 42'. The drive plug 44' defines a hook 100' which snaps over a projection 86' on the drive plug shaft 42' to lock these two parts together (in the assembled position of FIG. 29) after the desired degree of "pre wind" has been added to the power assist module 12', so as to "lock" the degree of pre-wind in a similar manner to how this was handled in the first embodiment 10. The drive plug shaft 42' has corresponding flats 84' which align with the flats 98' of the drive plug 44' and receive the ribs 88 of the rotator rail 14 such that both the drive plug shaft 42' and the drive plug 44' together engage the rotator rail 14.

As was the case for the first embodiment 10, the limiter 46' includes a stop 66' (See FIG. 27) which impacts against a stop 68' on the drive plug shaft 42' when the shade is in the fully retracted position to stop the shade from further rotation, despite the fact that the power assist modules 12' may continue to urge the rotator rail 14' to rotate in the retracting direction.

Figure 30A:
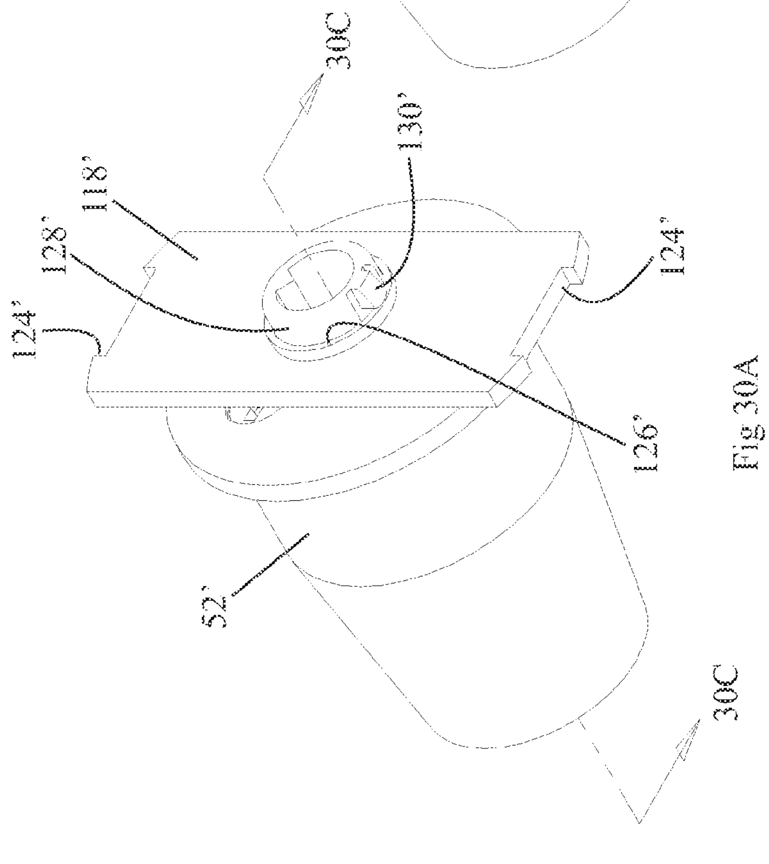
FIG. 30A is an assembled, perspective view of the spring plug and rotator rail adaptor.
Figure 30C:
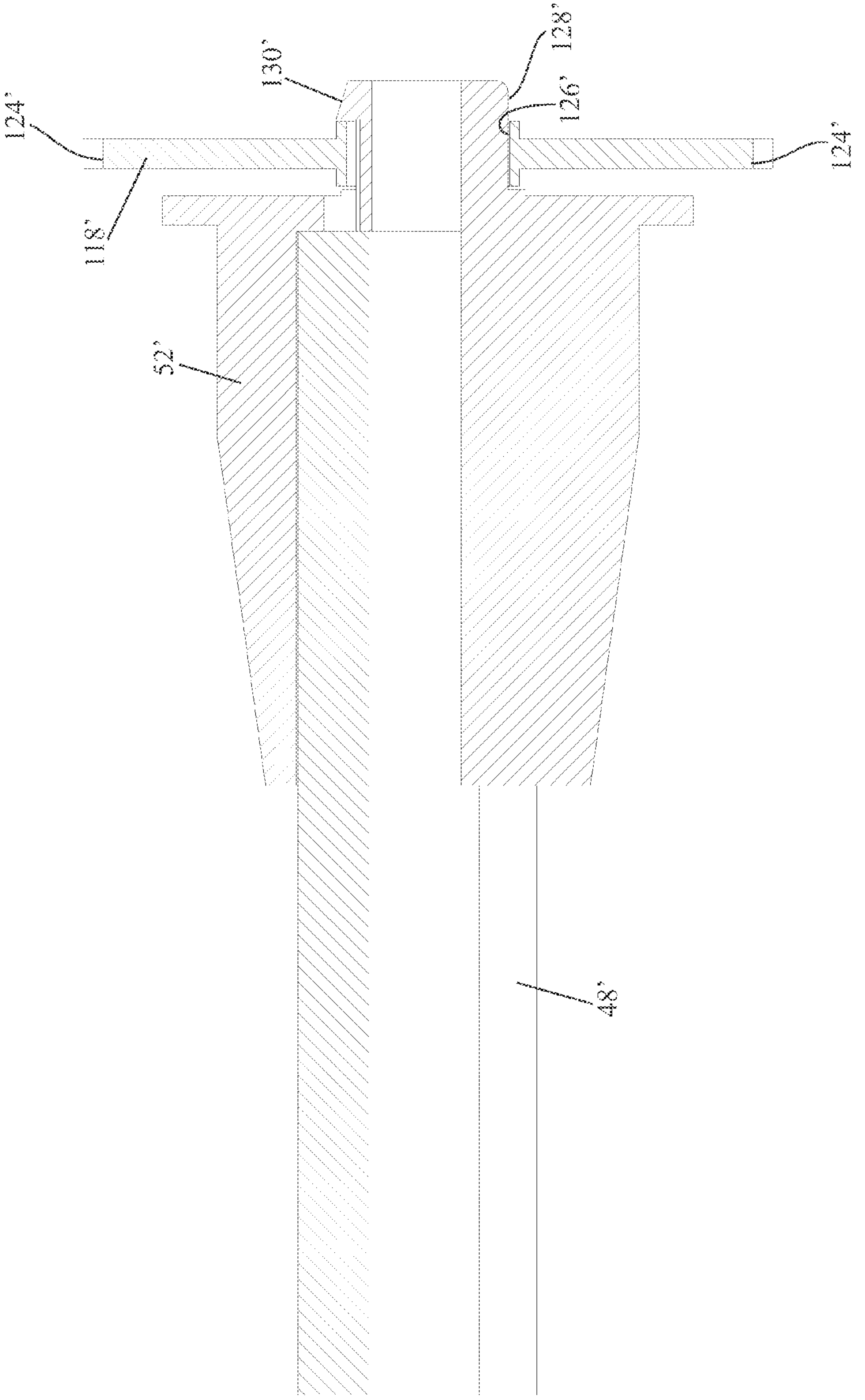
FIG. 30C is a partially broken away, section view along line 30C-30C of FIG. 30A, showing the spring plug and rotator rail adaptor assembled onto a spring shaft.

Referring to FIGS. 30A-30C, the rotator rail adaptor 118' is a planar, generally rectangular element defining opposed flats 124'. It also defines a central through opening 126' which rides over the stub shaft 128' of the spring plug 52' and permits relative rotation between the rotator rail adaptor 118' and the stub shaft 128'. The stub shaft 128' defines an axial shoulder 130' which serves to lock the rotator rail adaptor 118' in the axial direction, to prevent it from slipping axially off of the spring plug 52'. The axial shoulder 130' tapers from a smaller diameter at the end of the stub shaft 128' to a larger diameter at its inner end. During assembly, the shoulder 130' flexes just enough to allow the rotator rail adaptor 118' to slide over the axial shoulder 130' during assembly, and then the shoulder 130' snaps back to its original position to rotationally lock the rotator rail adaptor 118' in place as shown in FIG. 30C.

Figure 35:
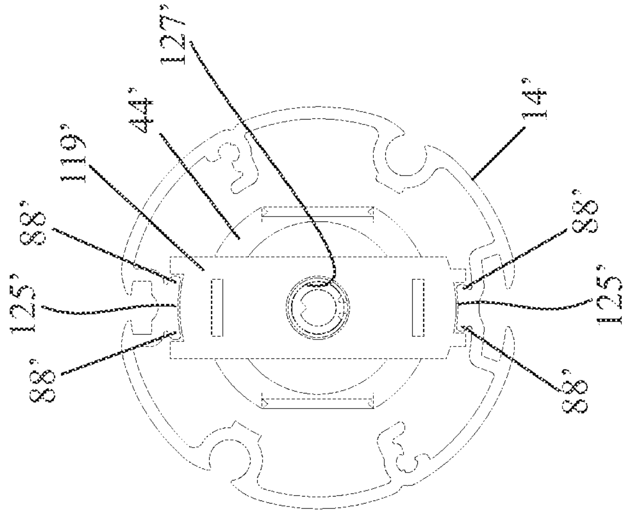
FIG. 35 is an end view of the rotator rail adaptors of FIG. 32 showing how the additional rotator rail adaptor engages a 2" diameter rotator rail.
Figure 34:
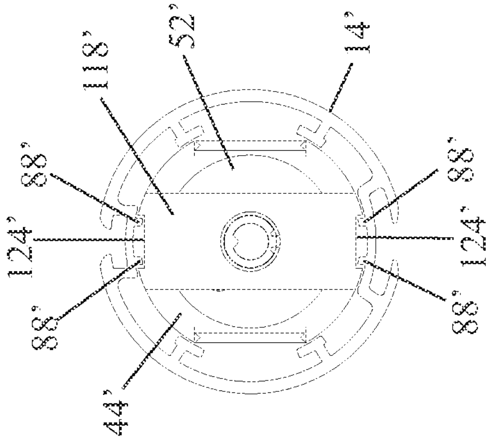
FIG. 34 is an end view of the rotator rail adaptor of FIG. 30 showing how it engages a 1½" diameter rotator rail.
Figure 33:
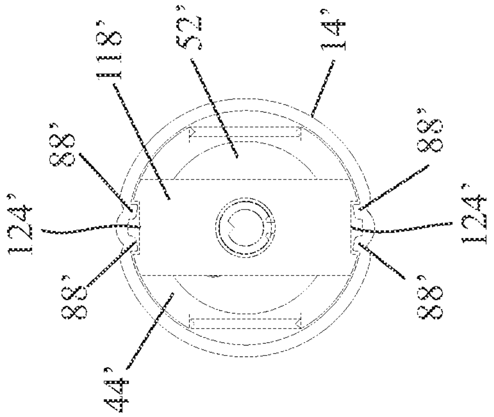
FIG. 33 is an end view of the rotator rail adaptor of FIG. 30 showing how it engages a 1" diameter rotator rail.

FIGS. 33-34 show how the rotator rail adaptor 118' engages two different sizes of rotator rails 14', and FIG. 35 shows how a larger rotator rail adaptor 119 engages a still larger rotator rail 14'.

As may be appreciated in FIG. 33, the rotator rail adaptor 118' engages the ribs 88' of the rotator rail 14'. This represents the smallest diameter rotator rail 14', which, in this particular embodiment, is a 1 inch diameter rotator rail.

FIG. 34 shows the same rotator rail adaptor 118' installed in a slightly larger diameter rotator rail 14', in this case a 1½ inch diameter rotator rail. Again, the flats 124' of the rotator rail adaptor 118' engage the ribs 88' of this larger diameter rotator rail 14' which extend inwardly to the same position as the ribs 88' on the smaller diameter rotator rail 14'. The rotator rail adaptor 118' provides a bridge by which the rotator rail 14' supports the spring plug 52', which in turn supports the rod 24' (See FIG. 23), which supports the power assist module 12'.

Figure 22:
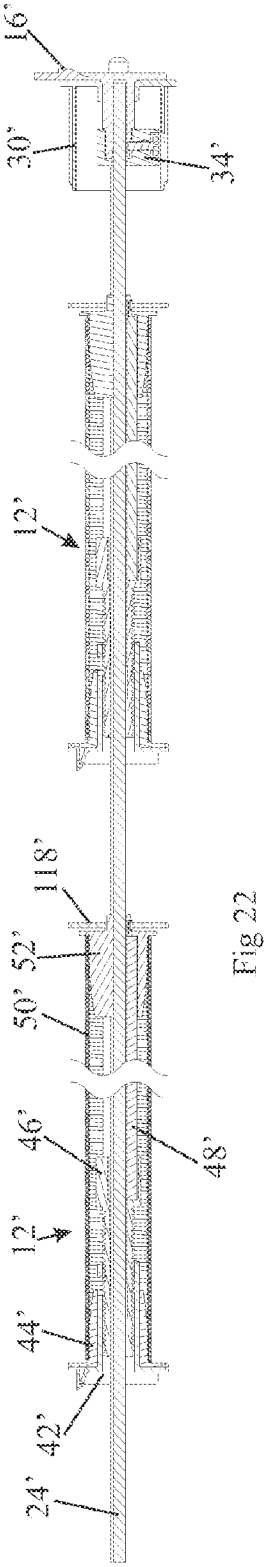
FIG. 22 is a view along line 22-22 of FIG. 21.

Each power assist module 12' is supported at a first end by the drive plug 44' and the drive plug shaft 42' and at a second end by the spring plug 52'. Since the flats 98' of the drive plug 44' (See FIG. 27) and the flats 124' of the rotator rail adaptor 118' (See FIG. 33) engage the ribs 88' of the rotator rail 14', the rotator rail 14' supports the drive plug 44' and rotates with the drive plug 44' and with the rotator rail adaptor 118'. If two power assist modules 12' are located close together, as shown, for example, in FIG. 22, it may not be necessary to have a rotator rail adaptor 118' on the second end of one power assist module 12' (for example on the second end of the module on the left in FIG. 22), because the rod 24' is adequately supported by the drive plug 44' at the first end of the adjacent power assist module 12' (for example, the drive plug 44' of the module 12' on the right in FIG. 22). FIG. 22 does show the use of a rotator rail adaptor 118' at the second end of the power assist module 12' on the left, but it would not be necessary in this instance. Note that the rotator rail adaptor 118' shown in FIG. 23 also may not be necessary, since the rod 24' of the power assist module 12' is adequately supported by the shaft 132' of the nearby bracket clip 16'.

Figure 31:
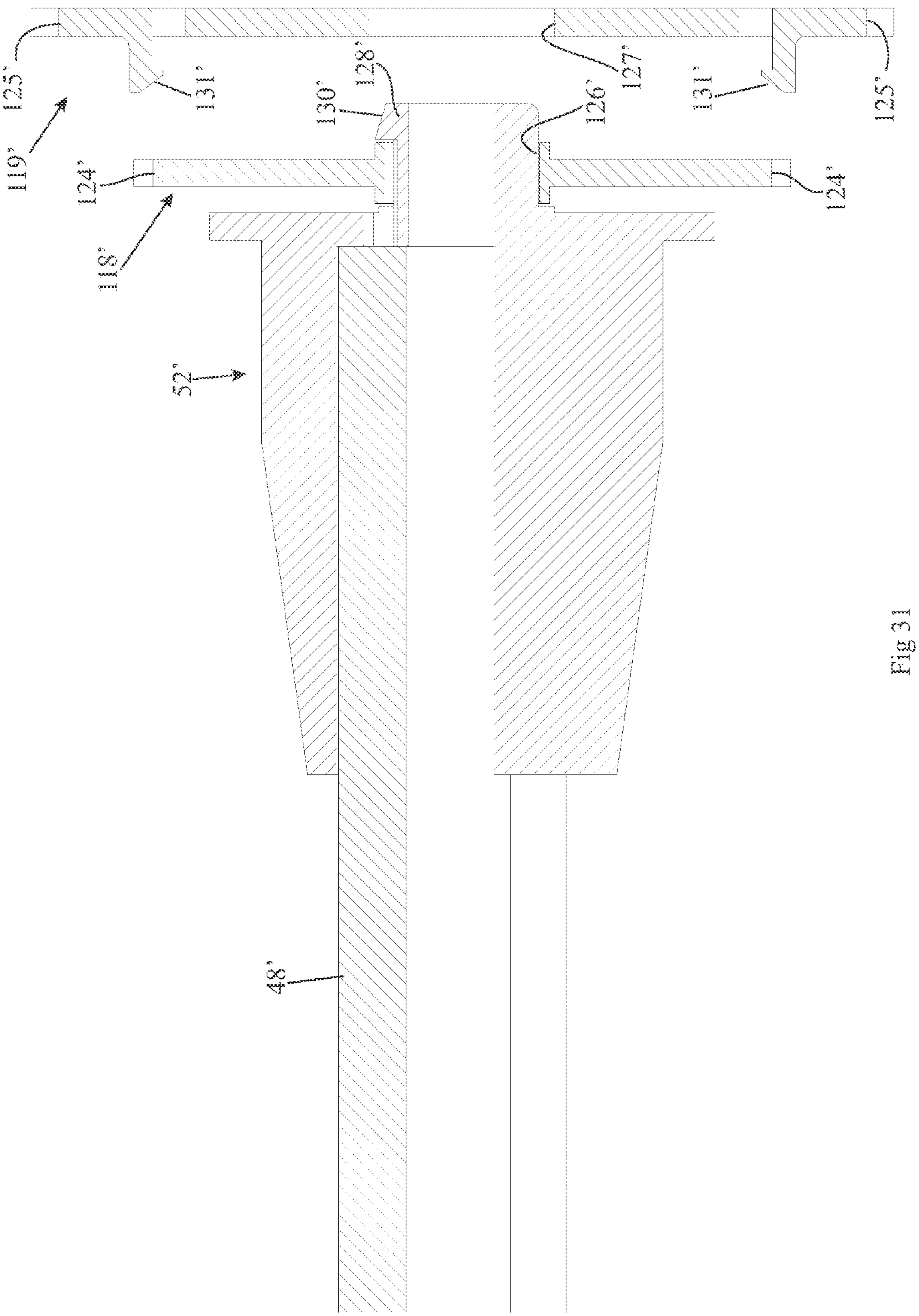
FIG. 31 is a section view, similar to FIG. 30, but with an additional rotator rail adaptor ready to snap onto the existing rotator rail adaptor.
Figure 32:
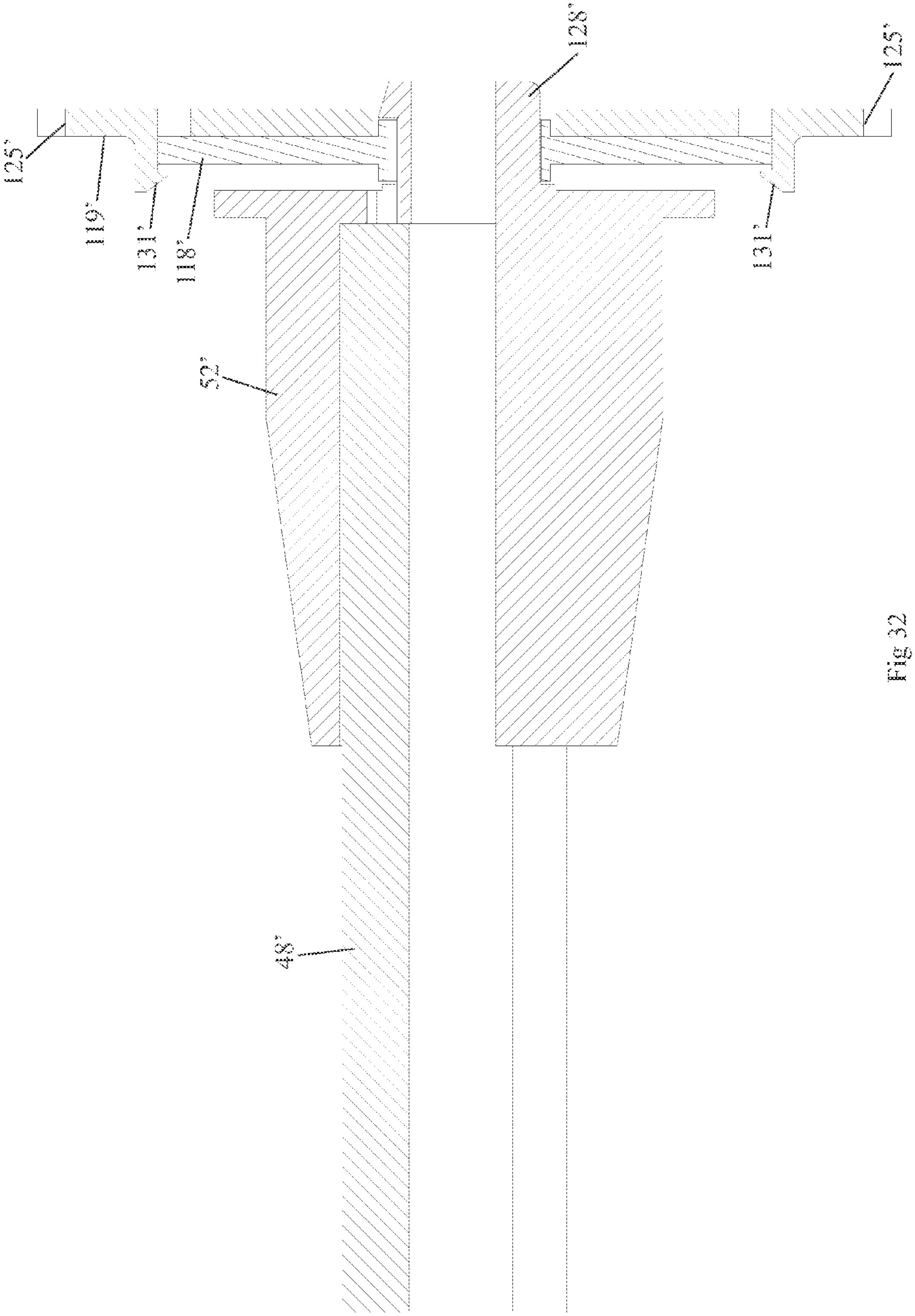
FIG. 32 is a section view, similar to FIG. 31 but showing the additional rotator rail adaptor snapped onto the existing rotator rail adaptor.

FIGS. 31, 32, and 35 show a second, larger rotator rail adaptor 119' which is used for an even larger rotator rail 14', which, in this embodiment, is two inches in diameter. This second rotator rail adaptor 119' snaps over and locks onto the first rotator rail adaptor 118' with the aid of the hooks 131'. The second rotator rail adaptor 119' is a planar, elongated member defining flats 125' and a central through opening 127' which slides over the stub shaft 128' of the spring plug 52', which allows the second rotator rail adaptor 119' to rotate together with the first rotator rail adaptor 118'. As best illustrated in FIG. 35, the flats 125' of the second rotator rail adaptor 119' engage the ribs 88' of this larger diameter rotator rail 14'.

Figure 23:
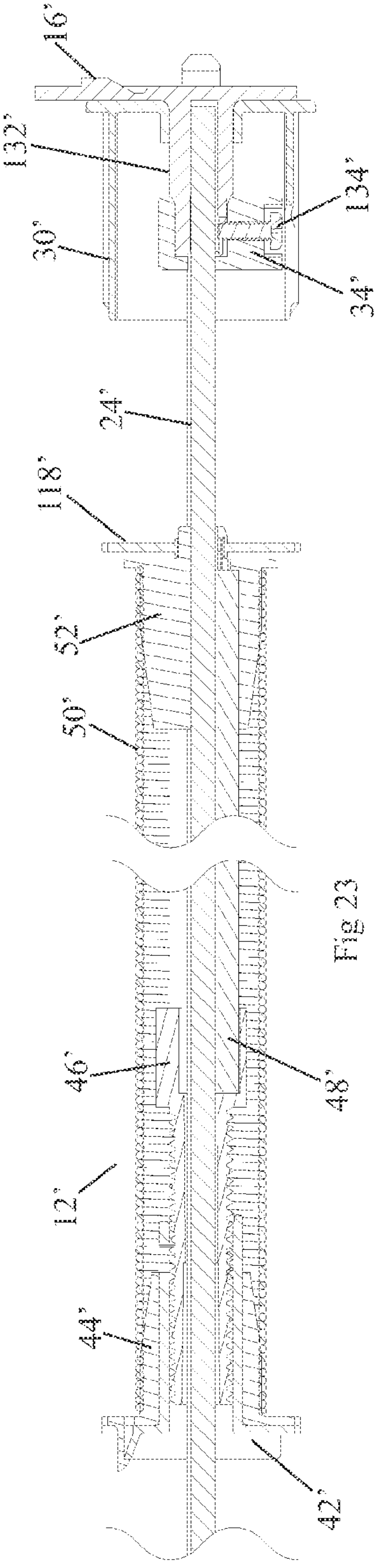
FIG. 23 an enlarged view of the right end portion of FIG. 22.
Figure 39:
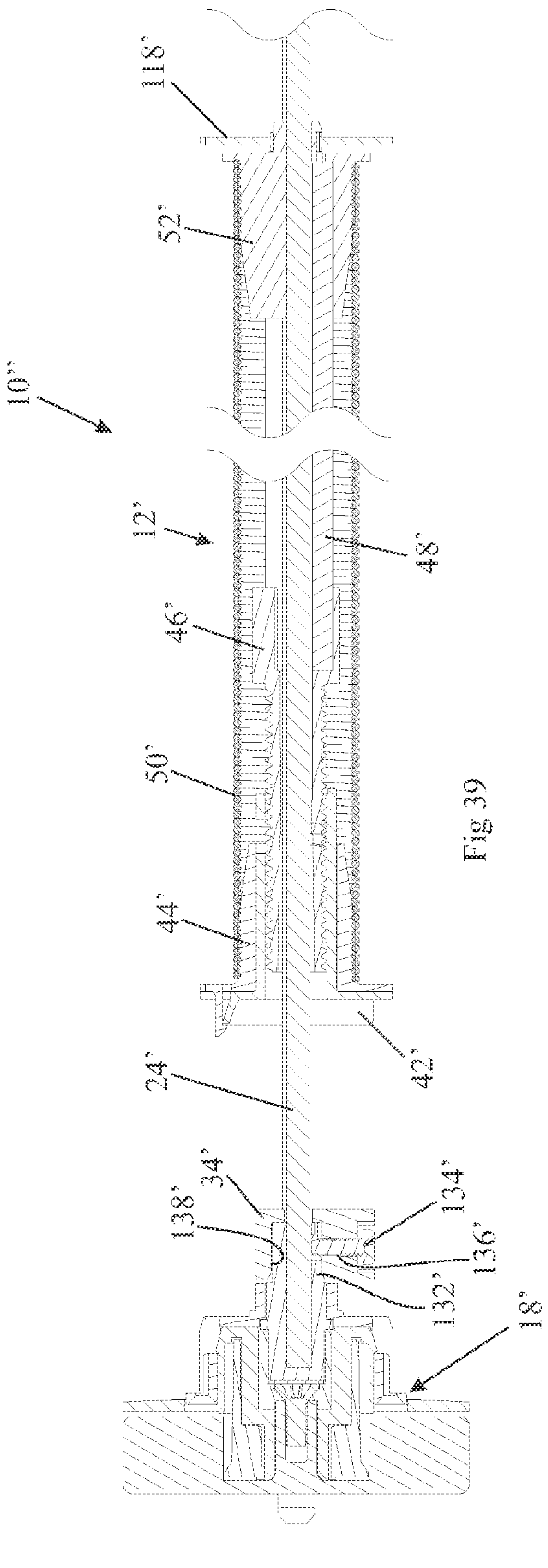
FIG. 39 is a section view, similar to that of FIG. 23, but for another embodiment of a window roller shade wherein the rod is secured for non-rotation to the control mechanism for extending and retracting the shade, instead of being secured to the non-drive end mounting clip.
Figure 41:
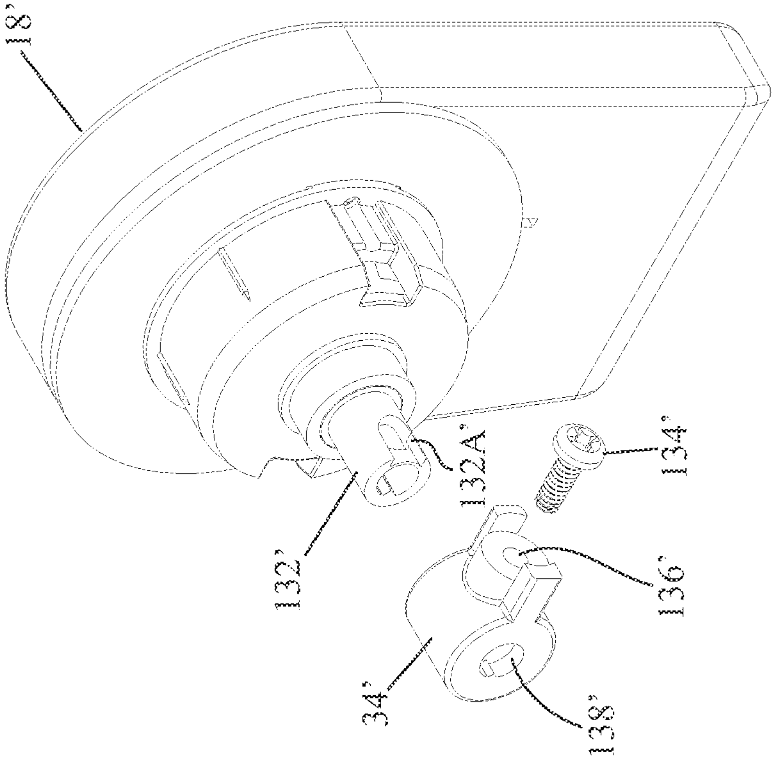
FIG. 41 is a partially exploded, perspective view of the control mechanism and the coupler with screw of FIG. 40.
Figure 40:
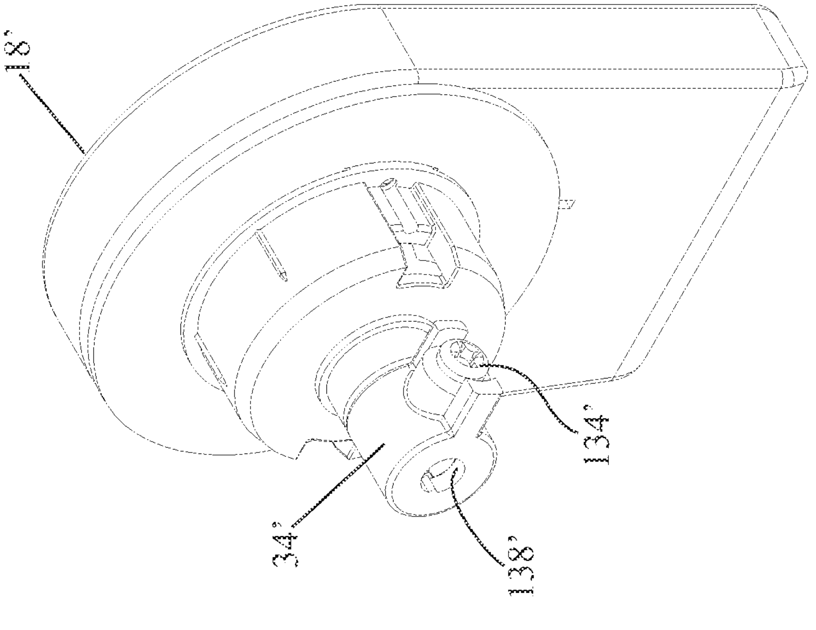
FIG. 40 is an assembled, perspective view of the control mechanism and the coupler with screw of FIG. 39.

FIGS. 18 and 23 show the coupler 34' which, in this embodiment, secures the rod 24' for non-rotation relative to the non-drive end bracket clip 16'. FIGS. 39-41 show a third embodiment of a roller shade 10" in which the same coupler 34' is used to secure the rod 24' to the mechanism 18' at the drive end of the roller shade. The use of the coupler 34' to secure the rod 24' to the mechanism 18' at the drive end of the roller shade will be described first.

Referring to FIGS. 39-41, the coupler 34' is a sleeve defining an axial through-opening 138' which receives both the rod 24' and at least a portion of a shaft 132' projecting from the mechanism 18'. The shaft 132' has an internal cross-sectional profile which matches up with and receives the non-circular, V-notch profile of the rod 24' for positive engagement between these two parts. The coupler 34' also defines a radially-directed threaded opening 136' which is aligned with an opening 132A' in the shaft 132'. (See FIG. 41) A securing screw 134' is threaded into the threaded opening 136' of the coupler 34' and through the opening 132A' in the shaft 132' and presses against the rod 24', pressing the V-notch of the rod 24' against the corresponding V-projection in the inner surface of the shaft 132'. This securely locks the rod 24' to the mechanism 18', preventing both rotational and axial motion (sliding motion) of the rod 24'.

As may be seen in FIGS. 18 and 23, the same coupler 34' is used to securely lock the rod 24' to the non-drive end bracket clip 16', preventing both rotational and axial motion of the rod 24'.

From the above description, it should be clear that the embodiments of the shades 10' and 10" operate in substantially the same manner as the shade 10 described initially. The most substantial functional differences are the use of the coupler 34' to make it possible to secure the rod to either end of the shade and the design of the power assist modules so that only the spring plug 52' needs to line up with the V-notch of the rod 24' during assembly, with all the other components of the power assist module 12' being secured to the spring plug 52', thereby facilitating the assembly of the power assist modules 12' onto the rod 24'.

Top and Bottom Limiter

Figures 42, 43:
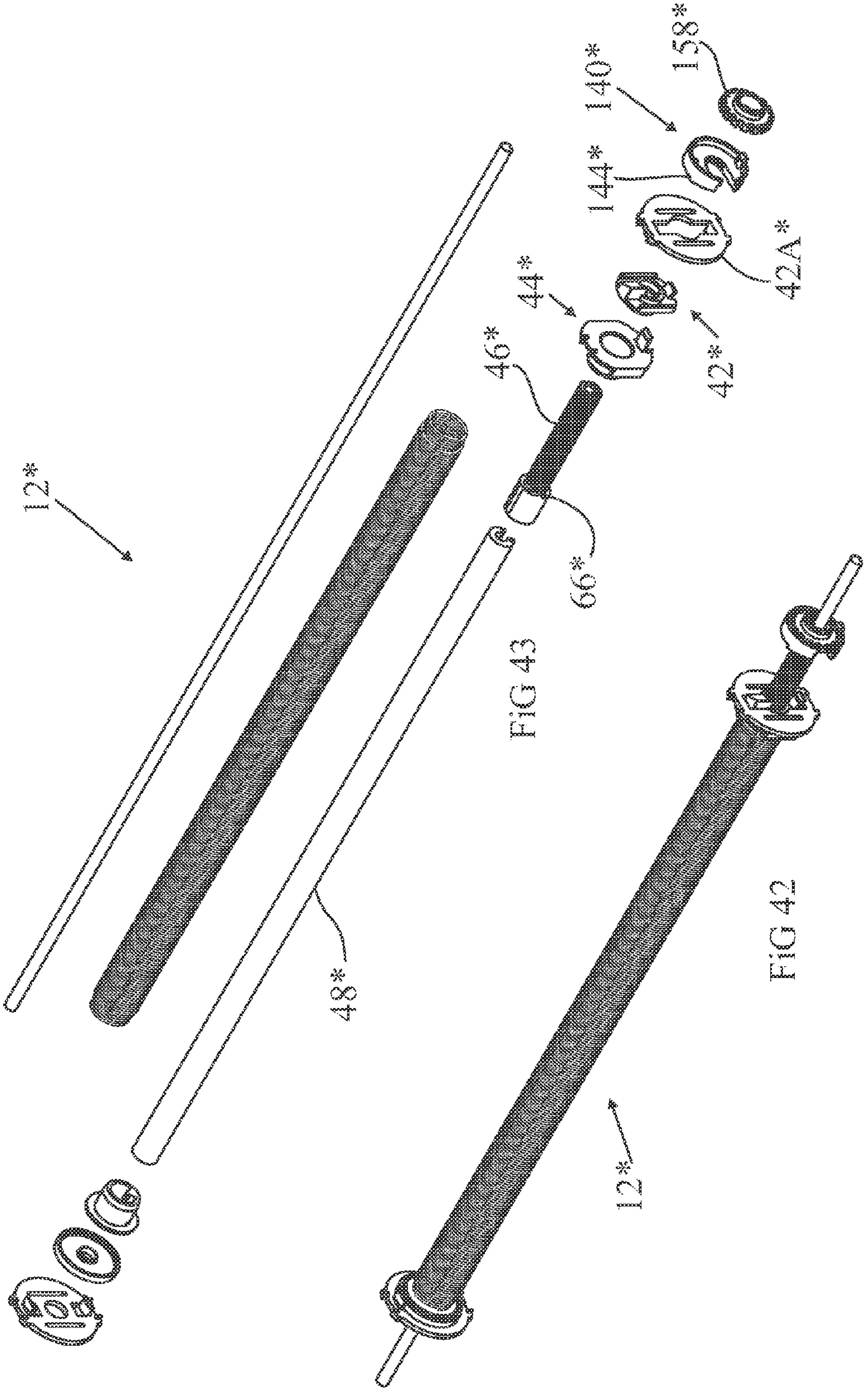
FIG. 42 is a perspective view, similar to that of FIG. 19, but for another embodiment of a power assist module which incorporates both a top limiter and a bottom limiter.
FIG. 43 is an exploded, perspective view of the power assist module of FIG. 42.

Referring now to FIGS. 42 and 43, the power assist module 12* is similar to the power assist module 12' of FIGS. 19 and 20, but it incorporates a second limiter 140*, as described in more detail below.

Figure 45:
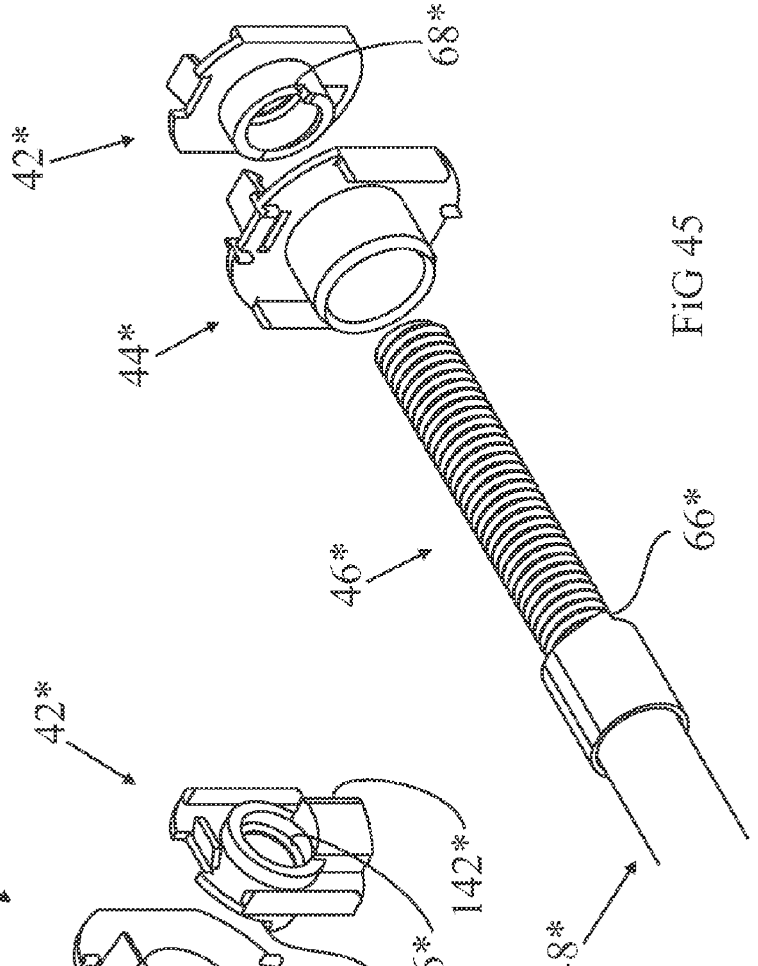
FIG. 45 is an opposite-end perspective view of the top limiter portion of the power assist module of FIG. 43.
Figure 44:
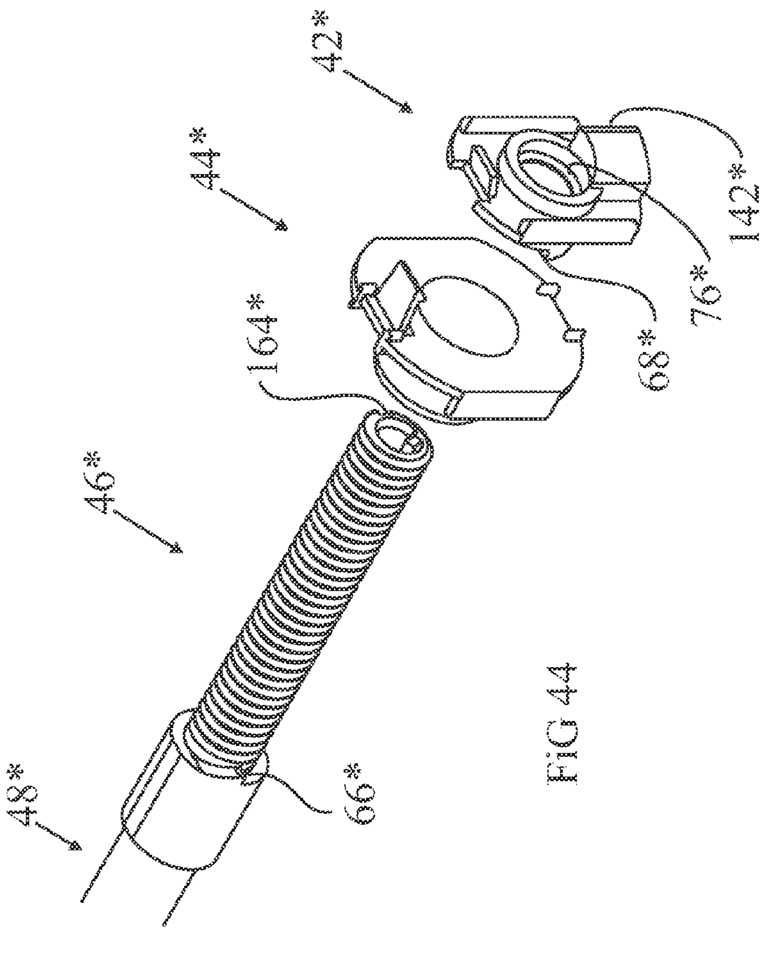
FIG. 44 is a perspective view of the top limiter portion of the power assist module of FIG. 43.

Referring to FIGS. 43-45, it may be appreciated that the drive plug shaft 42* and the drive plug 44* are slightly different from the drive plug shaft 42' and the drive plug 44' of FIGS. 19 and 27. The drive plug shaft 42* and the drive plug 44* are shorter, but serve the same function as their earlier embodiments. Namely, in this embodiment 12*, the drive plug shaft 42* (See FIGS. 44 and 45) has a first axially-extending stop projection 68* which impacts against the shoulder 66* of the limiter 46* to limit the extent to which the drive plug shaft 42* can be threaded into the limiter 46* (and thus how far the drive plug shaft 42* can be rotated relative to the rod 24' to which the limiter 46* is keyed, as explained above with respect to the power assist module 12' of FIG. 20). The drive plug shaft 42* has ears that extend through and snap into slots in a connector plate 42A*, which has recesses that receive the projections from the rotator rail 14 so that the drive plug shaft 42* and plate 42A* rotate with the rotator rail 14.

In this embodiment 12* the shoulder 68* of the drive plug shaft 42* works in conjunction with the shoulder 66* of the limiter 46* to act as a top stop, limiting how far the roller shade 10 can be raised. As explained with respect to the previous embodiment 12', as the shade 10 is raised, the drive plug shaft 42* threads onto the limiter 46* until the shoulder 68* on the drive plug shaft 42* impacts against the shoulder 66* of the limiter 46* to bring the shade 10 to a stop. The drive plug 44* may be briefly separated from the drive plug shaft 42* and rotated about the longitudinal axis of the limiter 46 to adjust the amount of "pre-wind" on the shade 10** and then snapped back together.

There is a significant difference between the drive plug shaft 42* of this embodiment and the drive plug shaft 42' of the previous embodiment, in that the drive plug shaft 42* of this embodiment includes a second axially-extending stop projection 142* (See FIG. 44) which impacts against the shoulder 144* of the second limiter 140* (also referred to as a locking ring 140*) to limit the extent to which the drive plug shaft 42* can be threaded out of the limiter 46*, thereby providing a bottom stop as well as atop stop, as explained in more detail below.

Figures 46A, 46B:
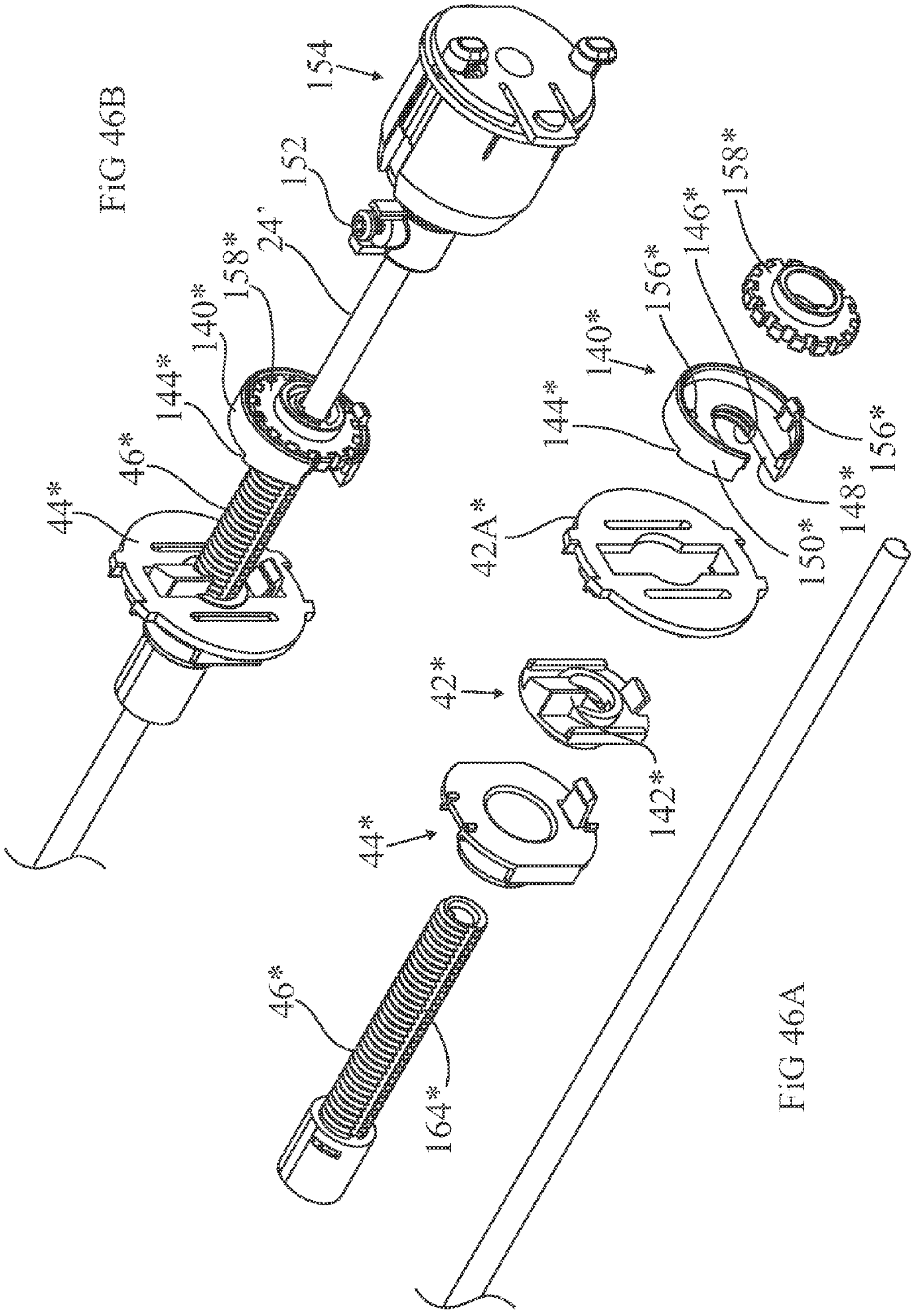
FIG. 46A is an exploded, perspective view of the limiters portion of the power assist module of FIG. 43.
FIG. 46B is a perspective view of the assembled components of FIG. 46A, also including a view of an idle end mounting adapter assembly for securing the rod to an end bracket.
Figures 47, 48, 49:
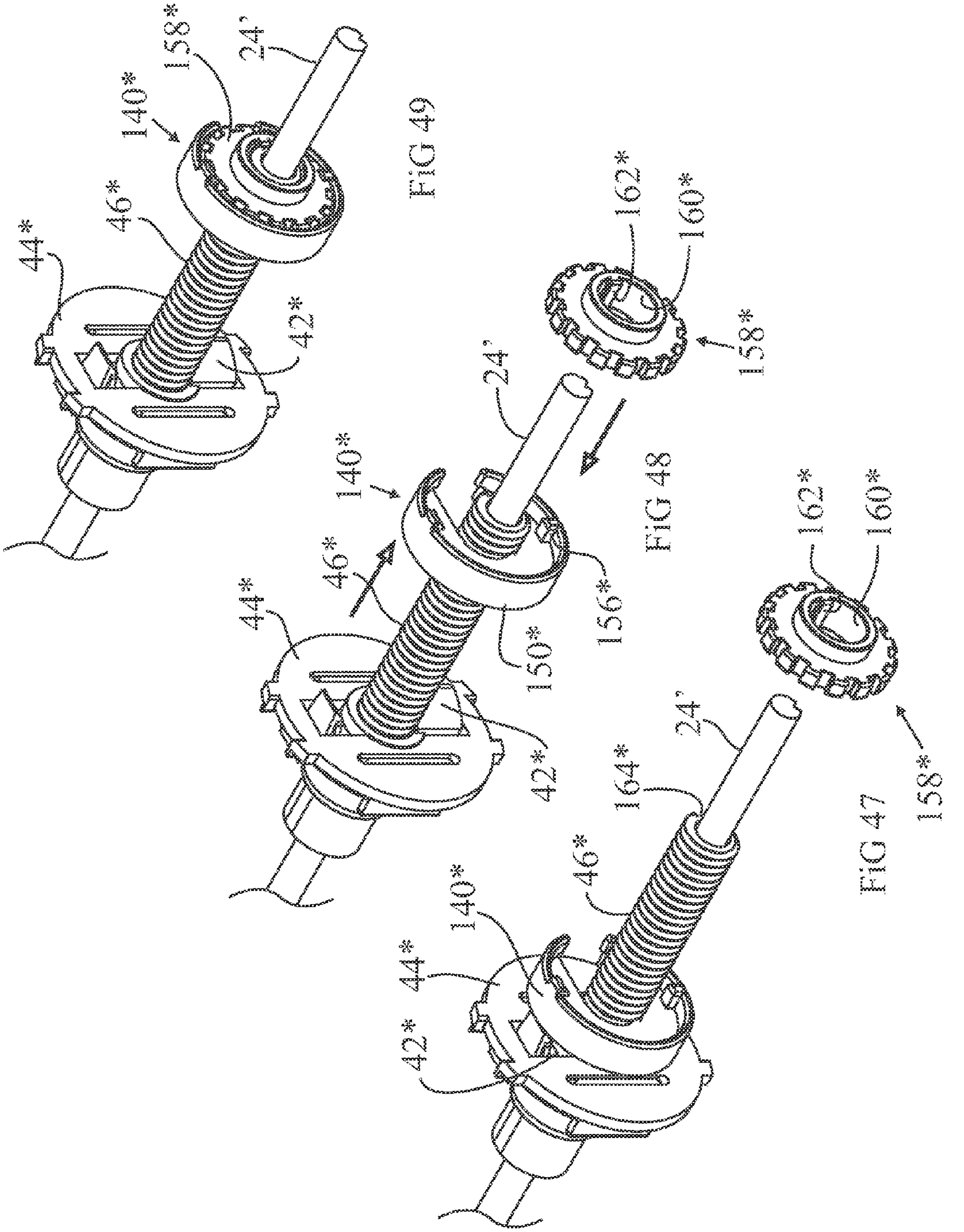
FIG. 47 is a perspective view of the locking ring and locking nut portion of the bottom limiter portion of FIG. 46, during a first step of adjusting the bottom stop.
FIG. 48 is a perspective view of the locking ring and locking nut portion of the bottom limiter portion of FIG. 46, during a second step of adjusting the bottom stop.
FIG. 49 is a perspective view of the locking ring and locking nut portion of the bottom limiter portion of FIG. 46, during a final step of adjusting the bottom stop.

Referring to FIGS. 46A and 48, the locking ring 140* is a substantially circular disk defining a threaded central opening 146* and a slotted opening 148* extending from the threaded central opening 146* to the outer, circumferential flange 150* of the locking ring 140*. It should be noted that the slotted opening 148* is a convenience feature to allow the locking ring 140* to be slide-mounted onto the limiter 46* instead of having to disengage the power assist module 12* from the shade 10 (which could be done by loosening the screw 152 in the idle end mounting adapter assembly 154 and sliding the rod 24' out of the idle end mounting adapter assembly 154, as explained in more detail later).

The circumferential flange 150* defines the axially-projecting shoulder 144* as well as a radially-directed, axially-extending prong 156* which projects inwardly from the circumferential flange 150* and serves to lock the locking ring 140* to the locking nut 158*, as explained below.

Referring to FIG. 47-49, the locking nut 158* resembles a geared wheel with an inner bore 160* defining a non-circular cross-sectional profile, including a key 162* designed to lock onto a slotted keyway 164* (See FIG. 47, this slotted keyway is better appreciated in FIG. 50) which extends axially along the length of the limiter 46*.

FIG. 47 shows the locking ring 140* abutting the drive plug shaft 42* such that the shoulder 142* on the drive plug shaft 42* is impacting against the shoulder 144* on the locking ring 140*. To adjust the bottom limiter/locking ring 140*, the locking nut 158* is first pulled out from the circumferential flange 150* of the locking ring 140* as shown in FIG. 47, sliding out the locking nut 158* axially along the length of the limiter 46*. This frees the locking ring 140* to be partially unscrewed along the limiter 46*, away from the drive plug shaft 42*, as shown in FIG. 48. Every complete turn of the locking ring 140* equals one complete rotation of the shade 10. Once the locking ring 140* has been unscrewed the correct number of turns to equal the desired lower limit of the shade 10, the locking nut 158* is reinserted into locking ring 140* as shown in FIG. 49, such that one of the geared teeth of the locking nut 158* engages the prong 156* of the locking ring 140*, and the key 162* of the locking nut 158* engages the slotted keyway 164* of the limiter 46*. This locks the locking ring 140* against rotation relative to the limiter 46*, which in turn is locked against rotation relative to the rod 24' and therefore also relative to the bracket 16 to which the rod 24' is secured. Now, as the shade 10 is lowered, the drive plug shaft 42* and the drive plug 44* rotate together. The inner threads 76* (See FIG. 44, but shown more clearly in FIG. 9, item 76) of the drive plug shaft 42* engage the limiter 46*, causing the drive plug 42* and drive plug 44* to travel toward the right (as seen from the vantage point of FIG. 49), until the shoulder 144* (See FIG. 46A) on the locking ring 140* impacts against the shoulder 142* on the drive plug shaft 42*, bringing any further lowering of the shade 10 to a stop. Note that the limiter 46* does not rotate as it is keyed against rotation relative to the rod 24'.

The idle end mounting adapter assembly 154 of FIG. 46B is substantially similar to the assembled components 16', 30' and 34' of FIGS. 17 and 18 described in an earlier embodiment and function in substantially the same manner for securing the rod 24' to the idle end bracket (opposite the drive end) of the shade 10.

Infinitely-Adjustable-Stop Top and Bottom Limiter

The power assist module 12* described above can be adjusted by removing the locking nut 158*, unscrewing the locking ring 140*, and then reinstalling the locking nut 158*. If the bottom hem 194 (See FIGS. 56-58) of the shade 10 still is not in the desired location, the procedure may be repeated until the hem is as close to the desired location as possible. It may not be possible to get the hem to the exact location desired because the locking ring 140* may only be moved in discreet increments dictated by the position of the key 162* in the locking nut 158* relative to the tooth on the locking nut 158* that engages the prong 156* on the locking ring 140*.

Figure 50:
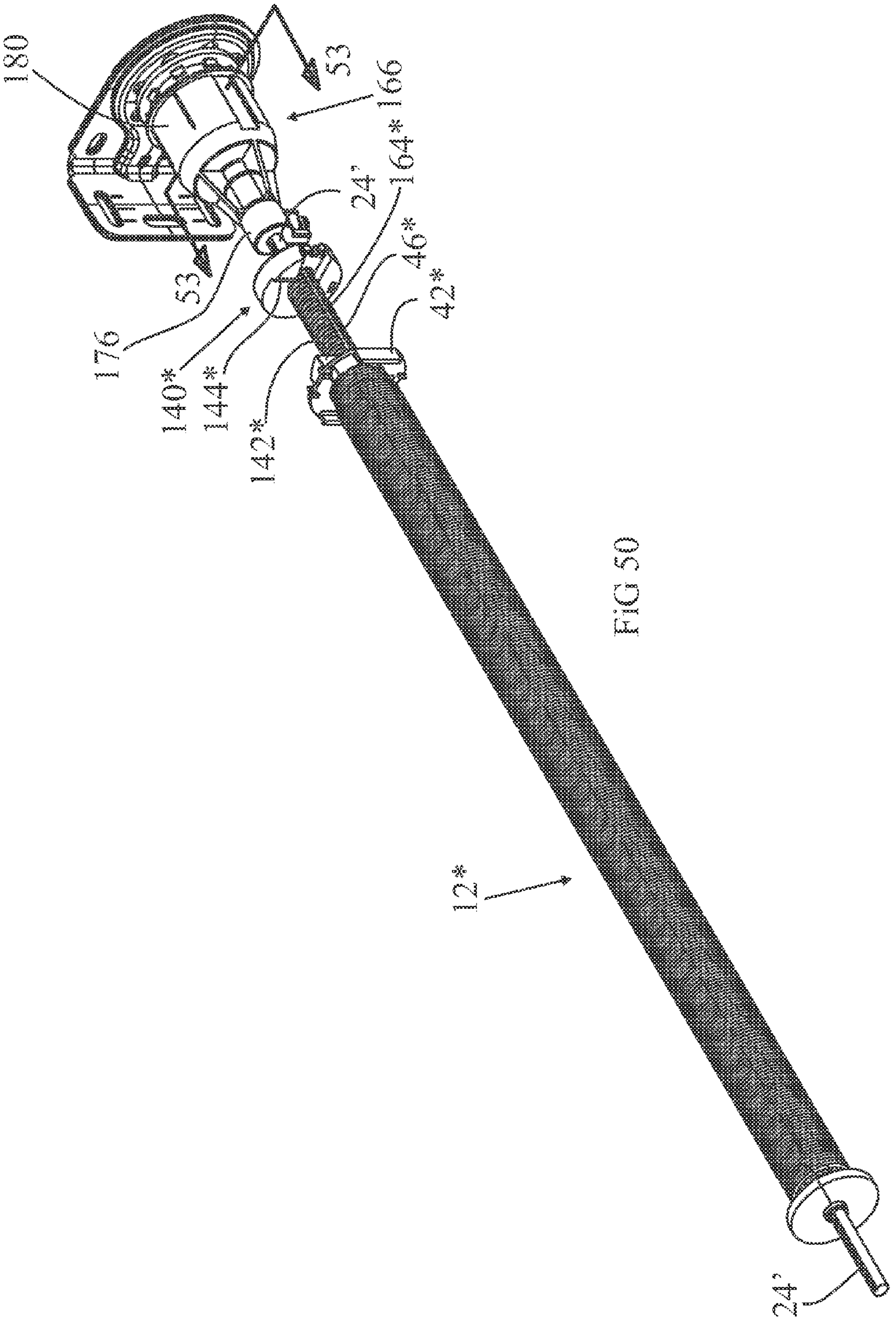
FIG. 50 is a perspective view similar to that of FIG. 42, but for another embodiment of a power assist module which incorporates both a top limiter and an infinitely adjustable bottom limiter.

FIG. 50 depicts the power assist module 12* of FIG. 42, but with a vernier coupling and adjusting mechanism 166 for securing the end of the power assist module 12* to the mounting bracket of the shade 10* (See FIGS. 56-58) which allows very fine and infinitely adjustable control of the bottom hem of the shade 10*, without having to remove the shade from the brackets, as described below. Note that the shade 10* is a "reverse" shade, with the covering material 232 hanging down the room side of the shade instead of the more conventional instance where the covering material hangs down the wall side of the shade. However, it should be noted that the mechanism described herein may be used in either type of installation by simply flipping the shade and all of its components end for end.

As explained in more detail below, this vernier coupling mechanism 166 allows for the rotational repositioning, relative to the end brackets, of the entire non-rotational portion of the shade 10* by selectively adjusting the angular position of the rod 24' relative to the mounting bracket 172. This rotationally repositions both the top and bottom stops to either raise or lower the shade 10*, but only when the input is by the user pushing on the adjustment tabs 228 (See FIG. 56), not when the input is from the shade 10* impacting against either of the top or bottom stops.

Figure 51:
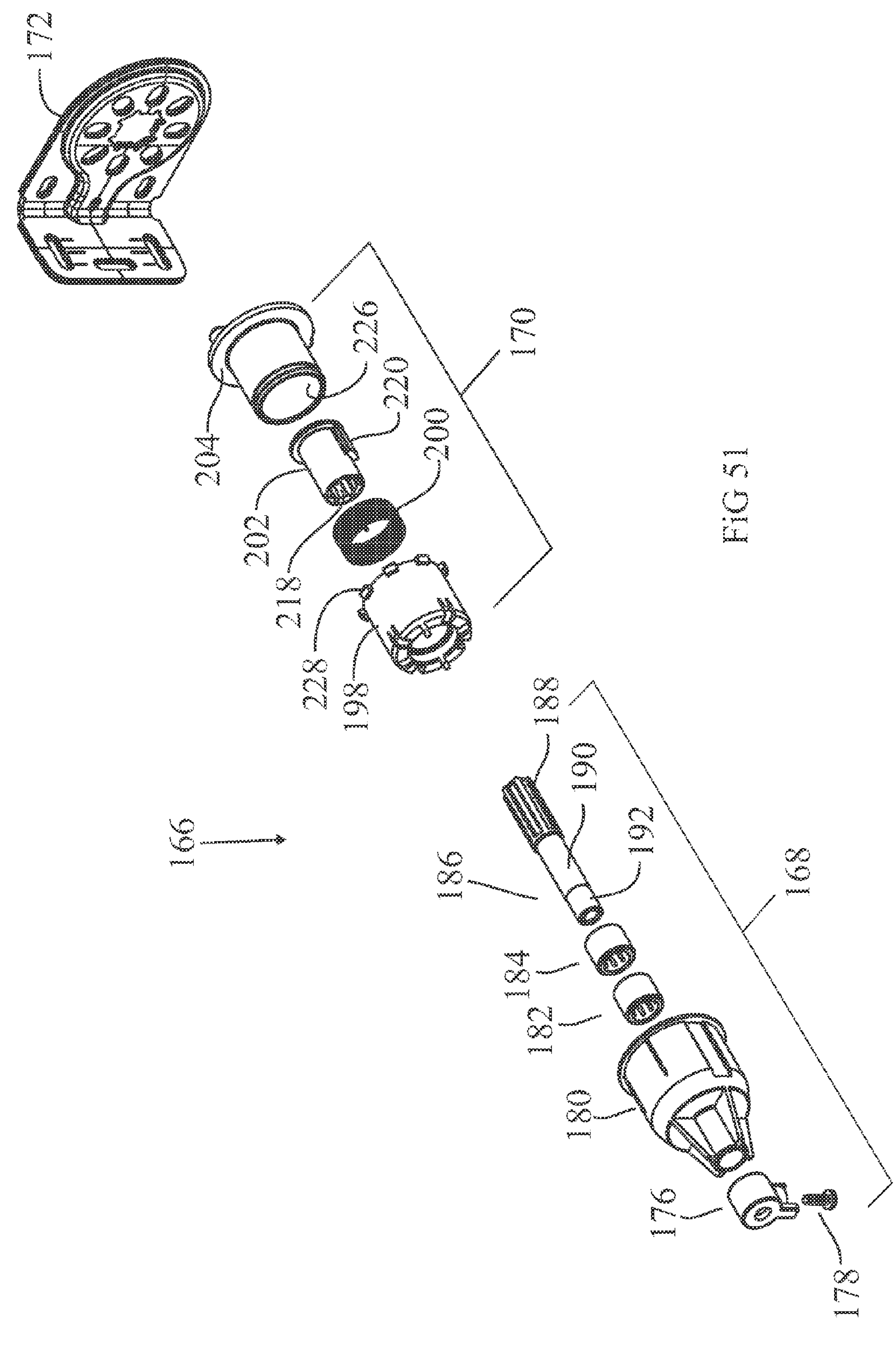
FIG. 51 is an exploded, perspective view of the infinitely adjustable portion of the bottom stop limiter of FIG. 50.
Figure 57:
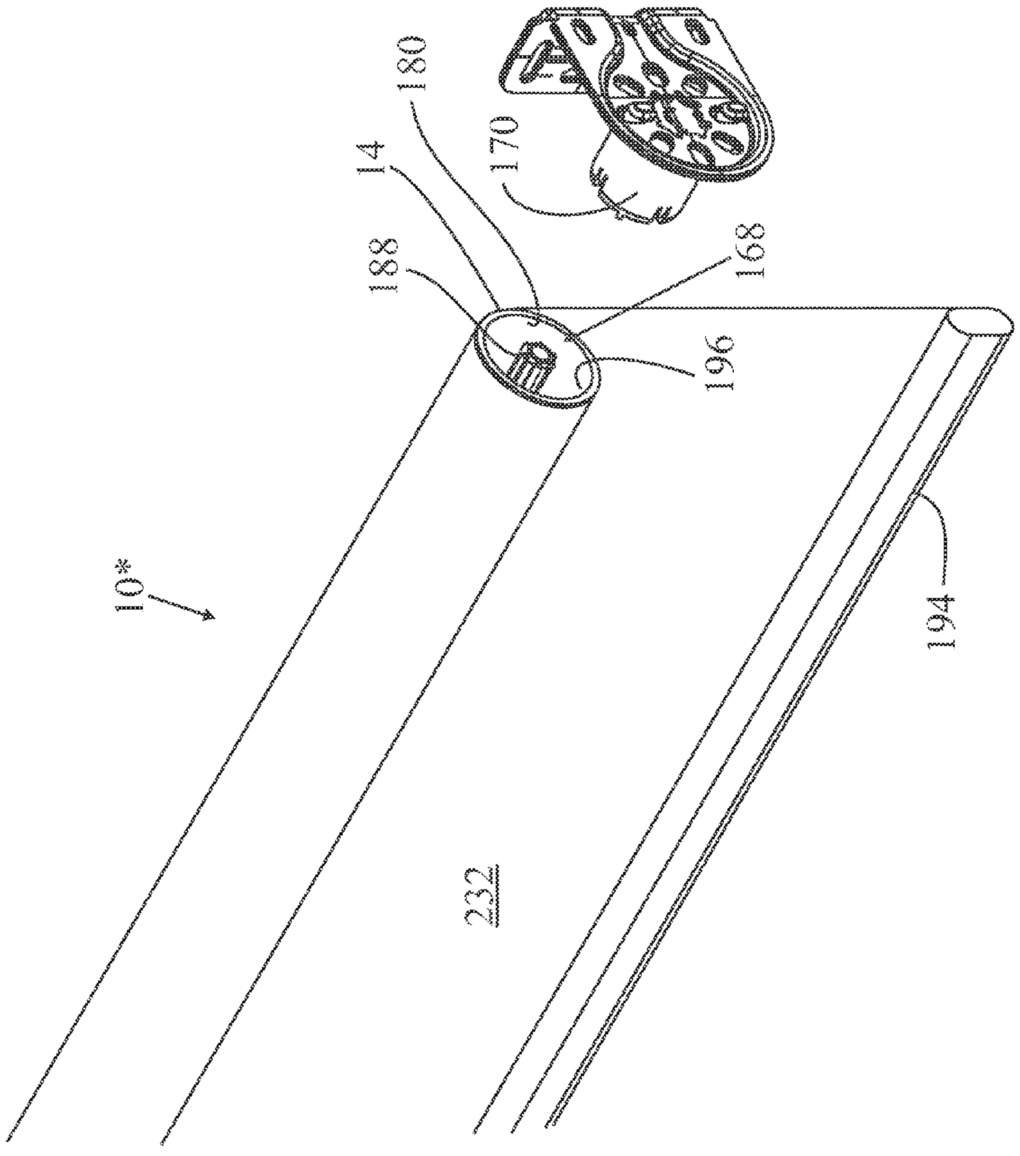
FIG. 57 is a broken away, partially exploded, perspective view of the shade of FIG. 56.

FIG. 51 is an exploded, perspective view of the coupling mechanism 166 of FIG. 50. The coupling mechanism 166 has two distinct assemblies; a first portion 168 which mounts to the power assist module 12* and the tube 14' (See FIG. 17) of the shade 10*, and a second portion 170 which mounts to the idle end bracket 172 of the shade 10* as seen in FIG. 57.

The first portion 168 includes a coupler 176 and screw 178, a tube plug 180, two needle bearings 182, 184, and an idle end shaft 186. The idle end shaft 186 includes a distal, a male spline portion 188, a smooth tubular section 190 for supporting the tube plug 180 for rotation via the two needle bearings 182, 184, and a proximal end portion 192 which is used to secure the idle end shaft 186 to the connecting rod 24' via the coupler 176 and screw 178 in the same manner that the coupler 34' (See FIG. 23) and the screw 134' secure the rod 24' to the shaft 132' of the bracket clip 16'. Referring to FIG. 57, the tube 14 of the shade 10* mounts over and engages the tube plug 180, with the male spline portion 188 of the idle end shaft 186 in the "bell housing" 196 of the tube plug 180. The tube plug 180 spins freely with the tube 14 on the idle end shaft 186.

Referring back to FIG. 51, the second portion 170 (also referred to as the bracket clip assembly 170) of the coupling mechanism 166 includes a clutch output housing 198, a spring 200, a clutch input 202, and a bracket clip housing 204. As explained in more detail below, this bracket clip assembly 170 acts as a clutch assembly which allows the rotation of the clutch output housing 198 in both clockwise and counter-clockwise directions, and with it the likewise rotation of the clutch input 202, which then rotates the rod 24'. Since the rod 24' is keyed to the limiter 46*, the limiter rotates likewise, as well as the locking ring 140* which is also locked to the limiter 46* via the locking nut 158*.

If, when the limiter 46* has threaded into the drive plug shaft 42' until the shoulder 144* on the locking ring 140* is impacting against the shoulder 142* of the drive plug shaft 42*, the clutch output housing 198 is turned in the counter-clockwise direction (as seen from the vantage point of FIG. 56), all the components connected to it and described above (namely the clutch input 202, the idle end shaft 186, the limiter 46*, and the locking ring 140*) will turn with it in the same direction. The shoulder 140* on the locking ring 140* pushes against the shoulder 142* of the drive plug shaft 42* which causes the tube 14 of the shade 10* to rotate so as to raise the hem 194. If instead the clutch output housing 198 is turned in the clockwise direction, all the components rotate likewise and the shoulder 140* on the locking ring 140* moves away from the shoulder 142* of the drive plug shaft 42* which causes the weight of the cover material 232 of the shade 10* to rotate the tube 14 of the shade 10* so as to lower the hem 194. However, if the clutch input 202 is pushed in either direction (because one of the shoulders 142*, 68* (See FIG. 44) of the drive plug shaft 42* is impacting against the corresponding shoulders 144* or 66* of the bottom stop and top stop respectively) the bracket clip assembly 170 locks up and does not allow rotation which brings the shade 10* to a stop, either at the top or at the bottom as explained in more detail below.

Figure 52:
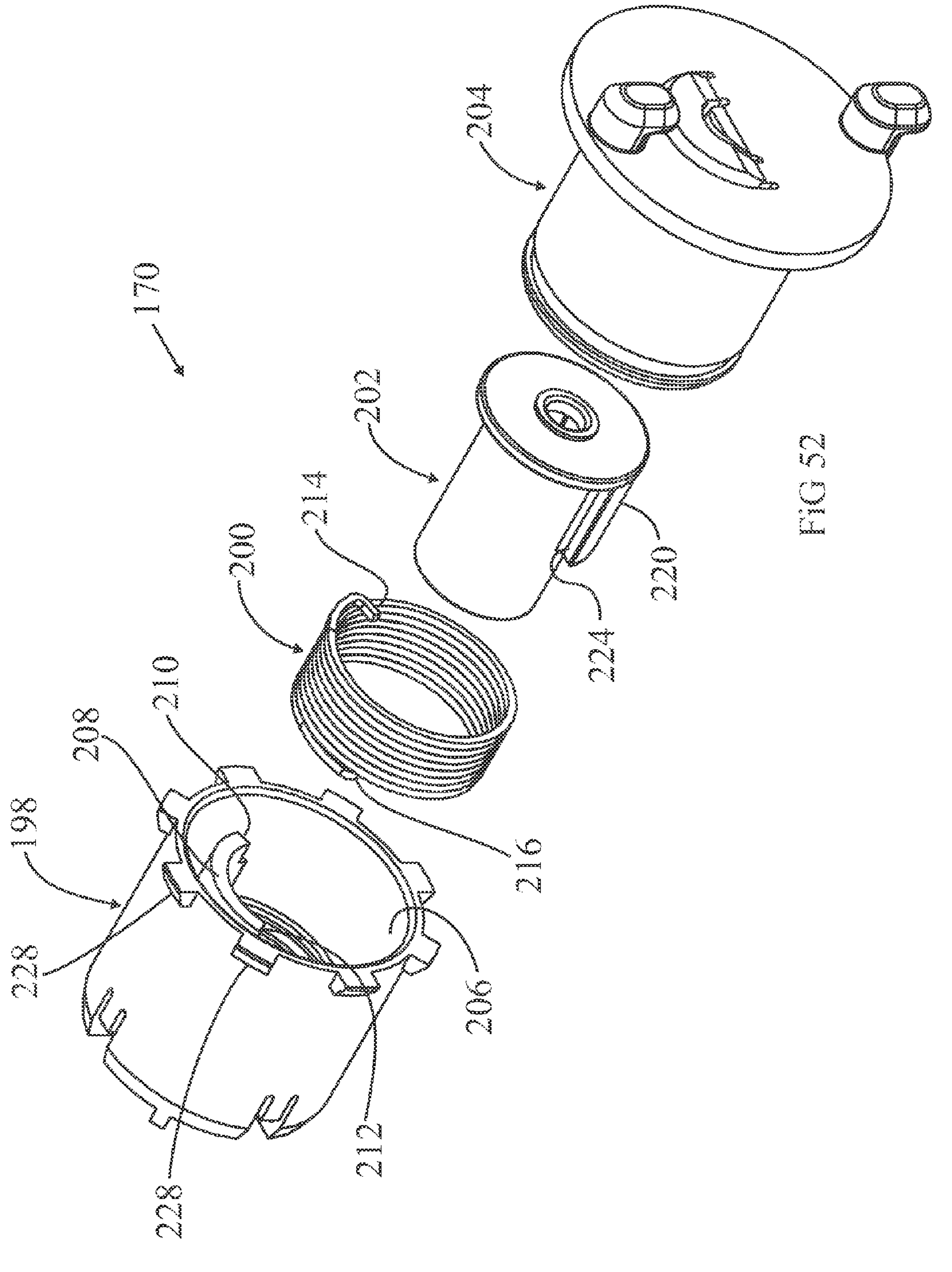
FIG. 52 is an exploded, perspective view of the bracket clip assembly of FIG. 51.

FIG. 52 offers a more detailed, opposite-end perspective view of the bracket clip assembly 170 of FIG. 51. The clutch output housing 198 is a substantially cylindrical element which defines an internal cavity 206 which is open at both ends. An arcuate rib 208 protrudes into the cavity 206, as best appreciated in FIGS. 53-55. This rib 208 defines first and second shoulders 210, 212 which may press against tangs 214, 126 respectively of the spring 200.

The clutch input 202 is also a substantially cylindrical element which has a bore with a female spline 218 (See FIGS. 51 and 53-55) which receives the male spline 188 of the idle end shaft 186. The clutch input 202 also has an axially-extending locking rib 220 which defines first and second shoulders 222, 224 which may press against tangs 214, 126 respectively of the spring 200.

Figure 58:
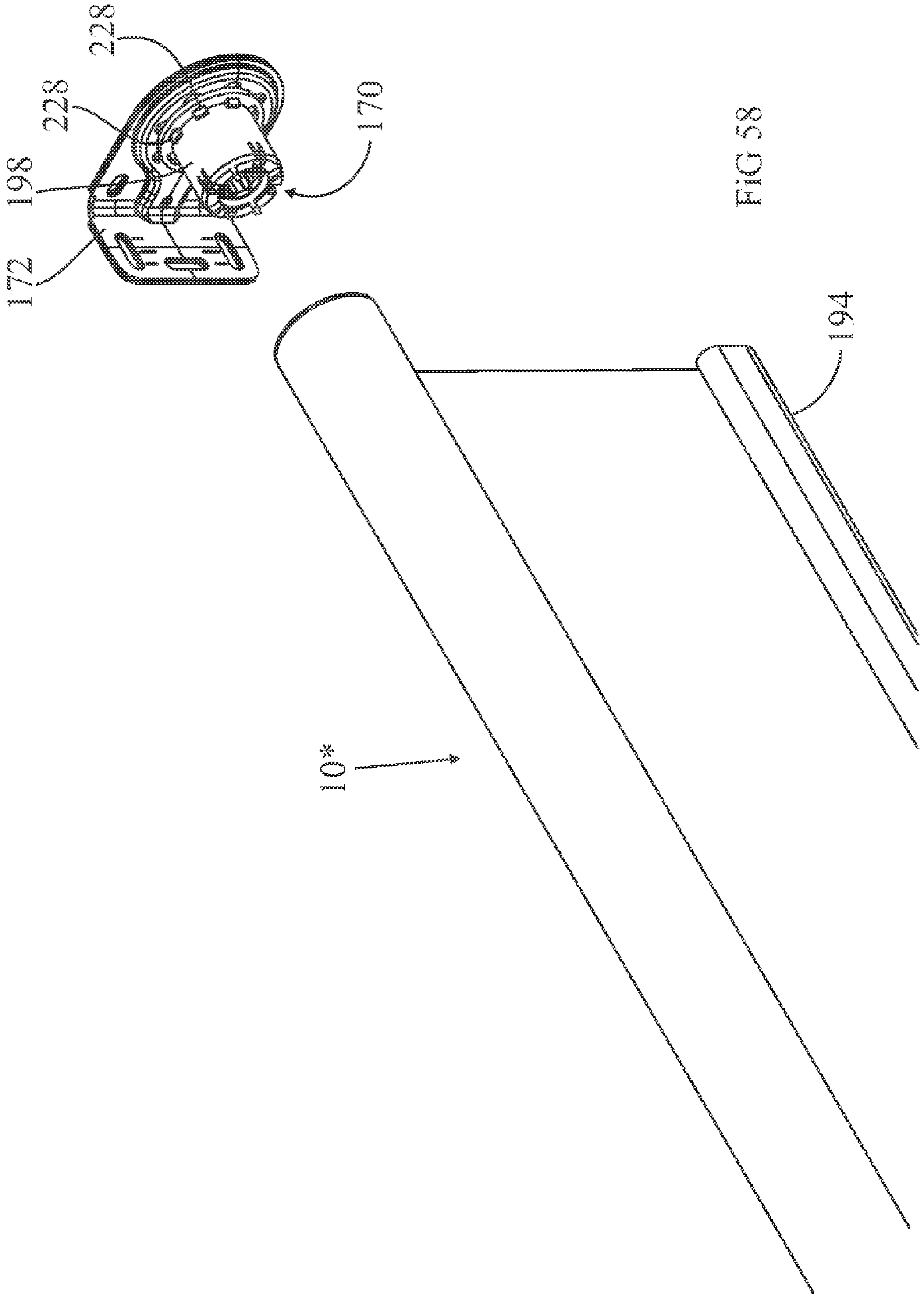
FIG. 58 is a broken away, partially exploded perspective view of the shade of FIG. 56.

Finally, the bracket clip housing 204 is also a substantially cylindrical element which defines a cavity 226 (See also FIG. 51) sized to snuggly receive the spring 200, as well as the clutch input 202 and the rib 208 of the clutch output housing 198. However, the rest of the clutch output housing 198 slides over and snaps onto the bracket clip housing 204, as best seen in FIG. 58.

Figures 53, 54, 55:
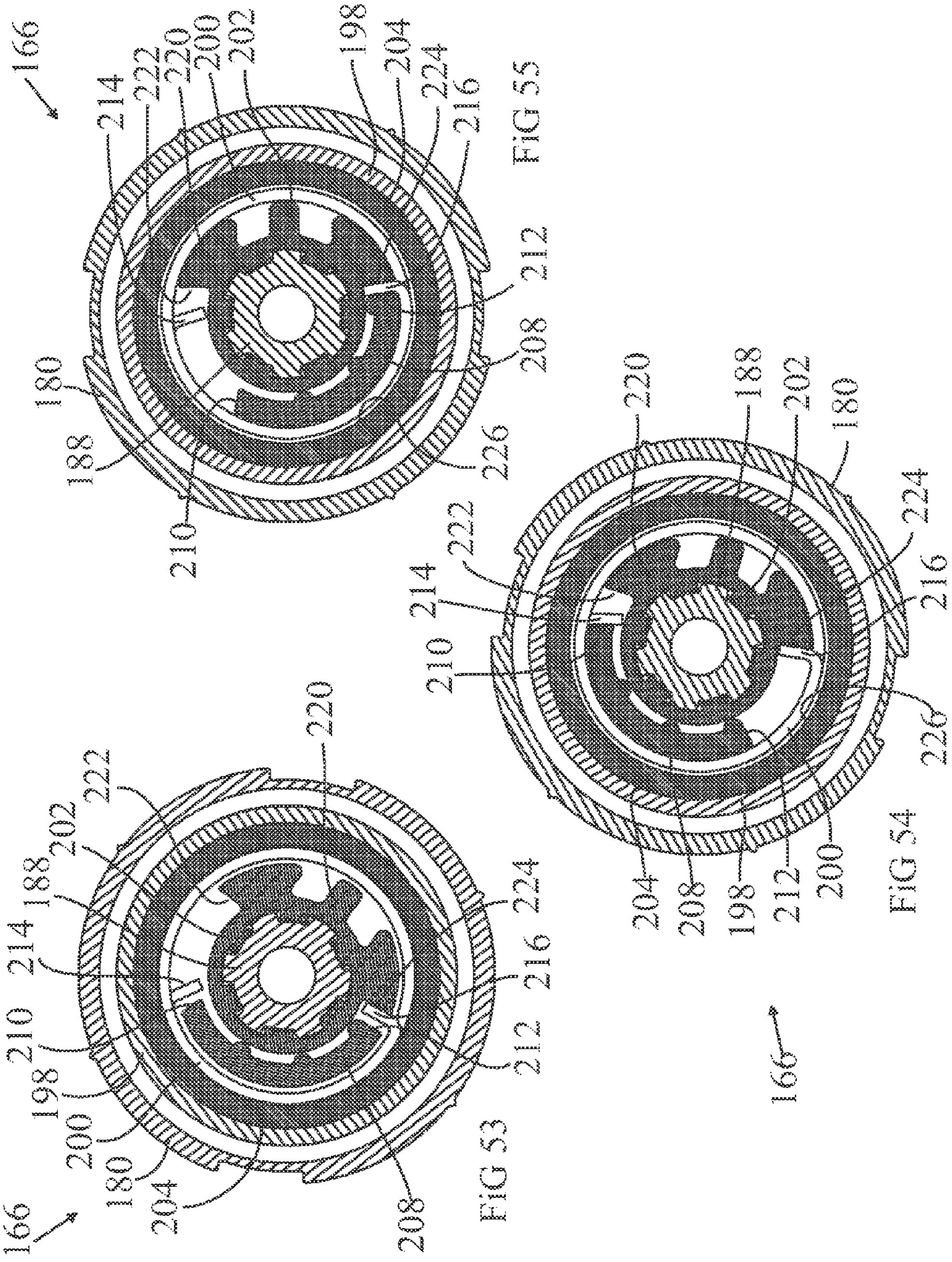
FIG. 53 is a section view along line 53-53 of FIG. 50, with the clutch mechanism in the locked position
FIG. 54 is a section view, similar to that of FIG. 53, but with the clutch mechanism allowing slippage of the clutch input so as to raise the hem of the shade.
FIG. 55 is a section view, similar to that of FIG. 53, but with the clutch mechanism allowing slippage of the clutch input so as to lower the hem of the shade.

As shown in FIGS. 53-55 and as indicated above, the spring 200 fits snugly in the cavity 226 of the bracket clip housing 204. If one of the shoulders 222, 224 of the clutch input 202 hits against its corresponding tang 214, 216 of the spring 200, the spring 200 expands slightly and locks onto the inner surface of the cavity 226, preventing rotation of the clutch input 202 when such a rotation is initiated by the "input end" which corresponds to rotation initiated by shade 10* as it is fully raised or fully lowered.

As best illustrated in FIGS. 53-55, the rib 208 of the clutch output housing 198 also lies between the tangs 214, 216 of the spring 200. If one of the shoulders 210, 212 of the clutch output housing 198 hits against its corresponding tang 214, 216 of the spring 200, the spring 200 collapses slightly and pulls away from the inner surface of the cavity 226 (as may be appreciated in FIGS. 54 and 55), allowing rotation, not only of the clutch output housing 198, but also of the spring 200, the clutch input 202, and the assembly 168 (but not the bracket clip housing 204). For instance, in FIG. 55 the shoulder 212 of the clutch output housing 198 impacts against the tang 216 of the spring 200, which collapses slightly away from the inner surface of the cavity 226 of the bracket clip housing 204. The tang 216 pushes on the shoulder 224 of the clutch input 202 which therefore also rotates, and with it all the components locked in to the clutch input 202. The clutch output housing 198 may be rotated by the user by pushing on the tabs 228 (See FIGS. 52 and 56). Pushing on the tabs 228 in the direction depicted by the screwdriver 230 in FIG. 56 rotates the entire coupler mechanism 166 (but not the housing 204) in the counterclockwise direction (corresponding to rotation in the clockwise direction in FIG. 54). This rotates the locking ring 140*, changing the location of the stop 144*, such that, when the shade is fully extended, the stop 144* on the locking ring 140* impacts against the stop 142* on the drive plug shaft 42* at an earlier position, thereby further limiting the extension of the shade 10*.

Figure 56:
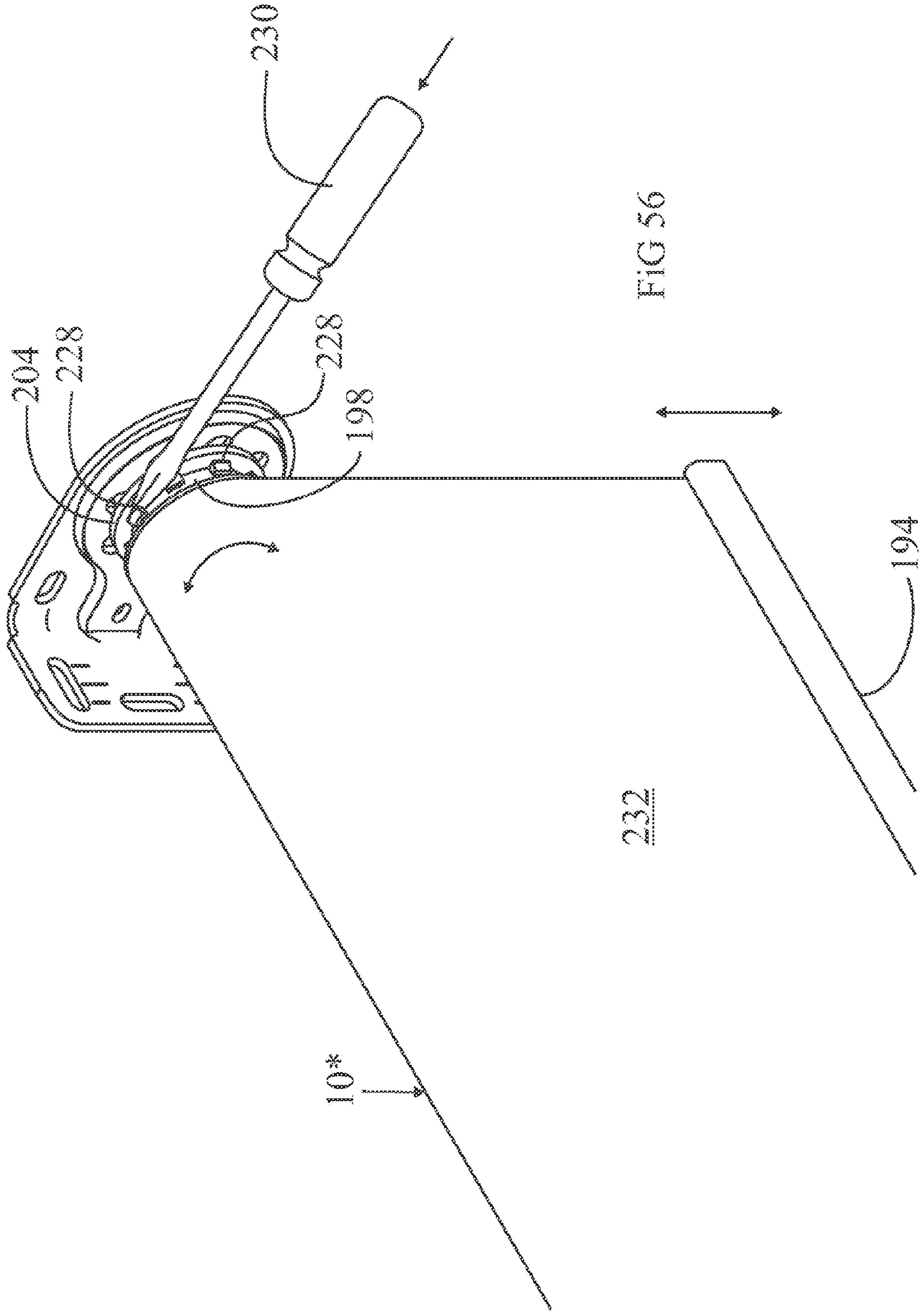
FIG. 56 is a broken away, perspective view of a reverse shade with the stop of FIG. 50 being adjusted to raise or lower the bottom hem of the shade.

Pushing on the tabs 228 in the opposite direction from what is shown in FIG. 56 rotates the entire coupler mechanism 166 in the clockwise direction (corresponding to rotation in the counterclockwise direction in FIG. 55). This rotates the locking ring 140* such that the stop 144* on the locking ring 140* backs away from the stop 142* on the drive plug shaft 42*. The weight of the covering material 232 of the shade 10* causes it to rotate which lowers the hem 194 (such that the stop 142* on the drive plug shaft 42* is always abutting the stop 144* on the locking ring 140*).

To summarize, as long as the input is initiated by the user by pushing on the tabs 228 of the clutch output housing 198, the coupler mechanism 166 releases the shade 10* for rotation to adjust the position of the hem 194. However, if the input is initiated by the shade itself (either because the shoulder 68* on the drive plug shaft 42* is impacting the shoulder 66* on the limiter 46* (top stop) or because the shoulder 142* on the drive plug shaft 42* is impacting against the shoulder 144* on the locking ring 140* (bottom stop), then the coupler mechanism 166 locks up, stopping the shade 10* from further rotation.

Alternative Embodiment of a Power Assist Module

FIGS. 59-65 show another embodiment of a power assist module 12 (including broken away view of the rotator tube 14). The power assist module 12** includes a limiter-end roller tube adapter 42A**, a combined drive plug/drive plug shaft 44** (also referred to as a threaded follower member 44**), a limiter 46** (also referred to as a threaded shaft member 46**), a spring shaft 48**, a spring 50**, a spring plug 52**, and an opposite-limiter-end roller tube adapter 240**. Also included are a locking ring 140* and a locking nut 158*, both of which were described earlier with respect to a bottom limiter in the power assist module 12* of FIG. 43. Comparing the power assist module 12* of FIG. 43 with the power assist module 12** of FIG. 59, it may be appreciated that this embodiment 12** has a few differences from the module 12***, which result in reduced manufacturing costs and greater ease of assembly, as discussed below.

Figure 59:
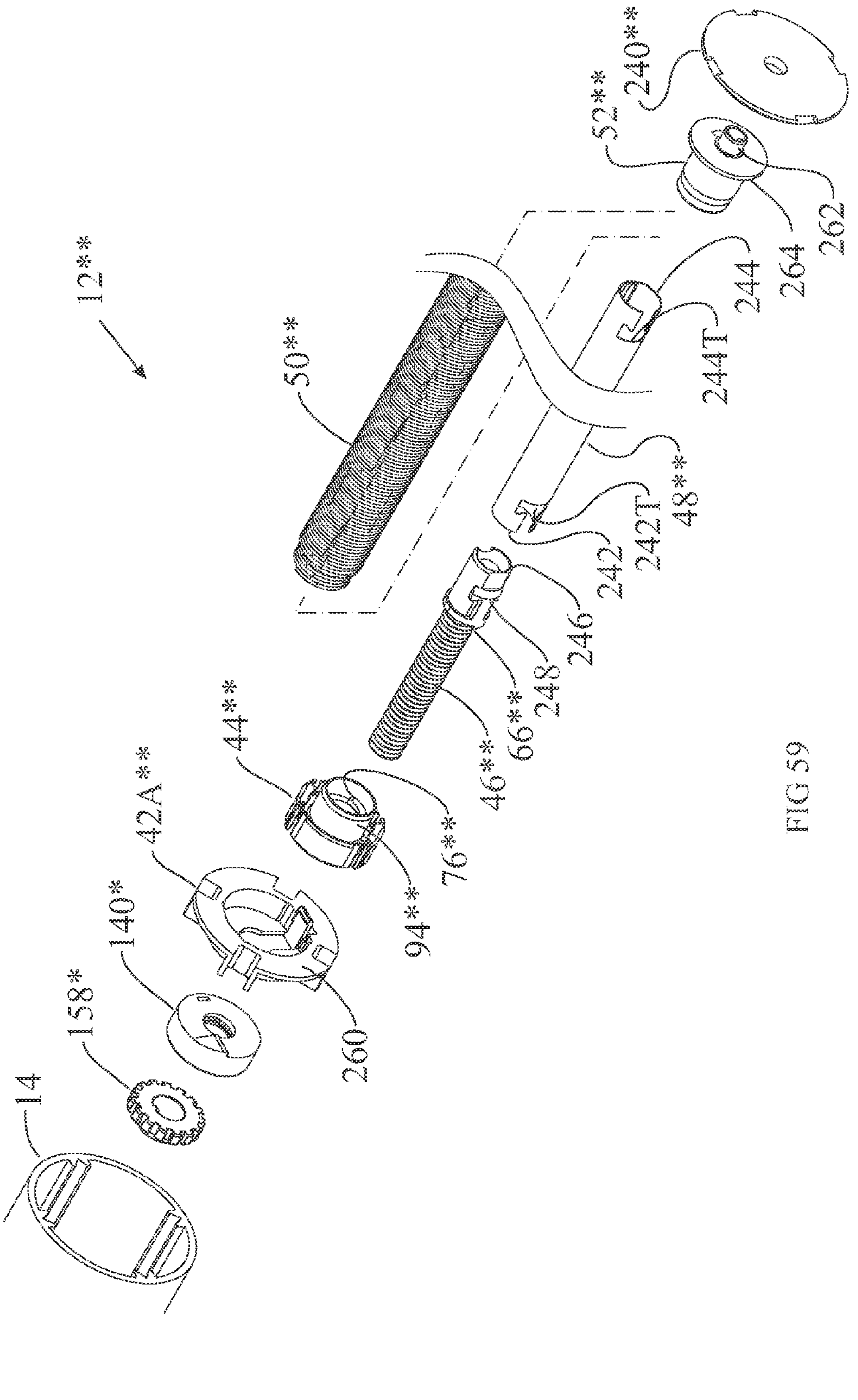
FIG. 59 is an exploded perspective view of another embodiment of a power assist module.
Figures 60, 61:
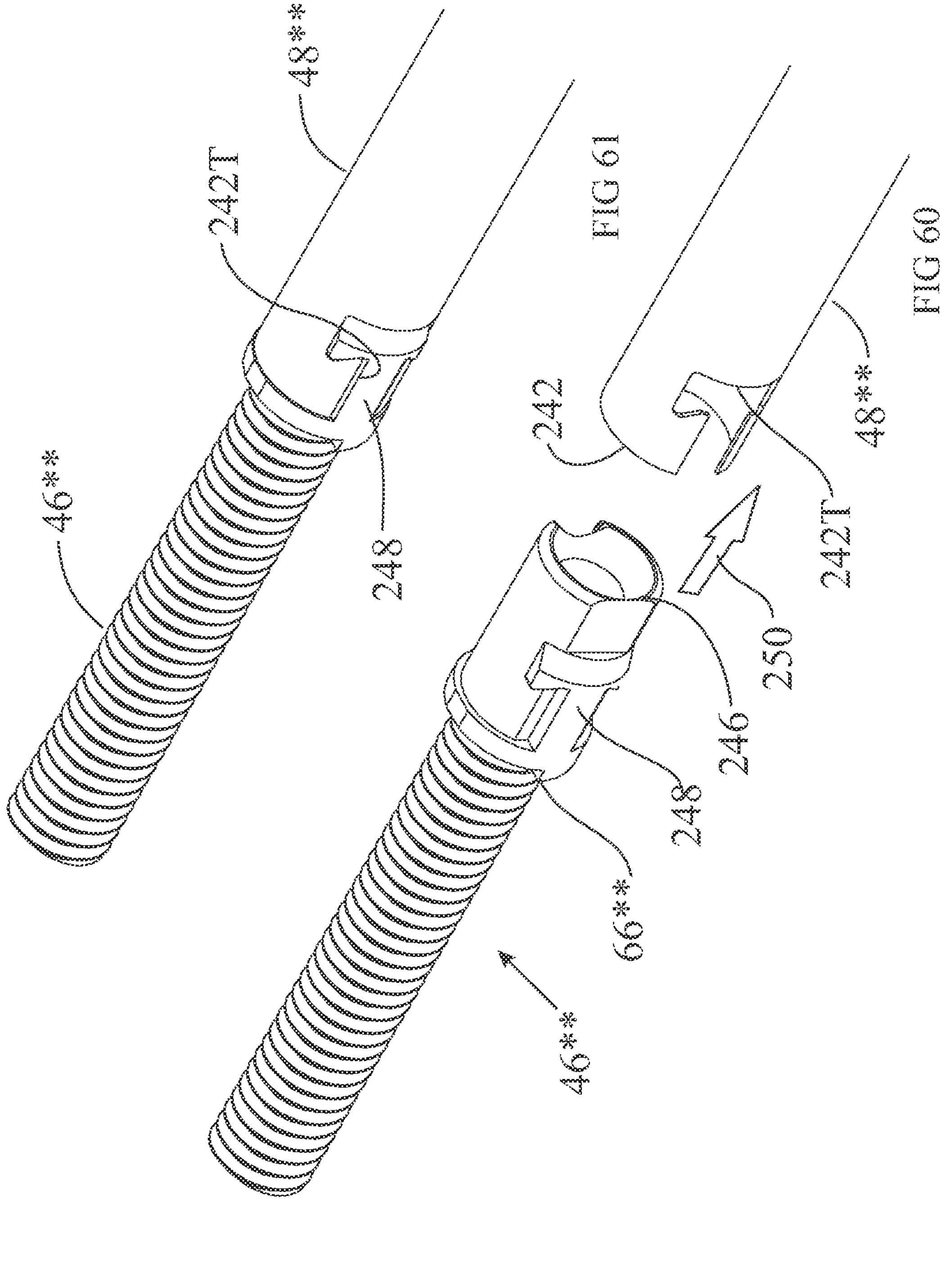
FIG. 60 is a broken away, exploded perspective view of the limiter and the spring shaft of FIG. 59.
FIG. 61 is broken away, assembled view of the limiter and the spring shaft of FIG. 60.
Figure 63:
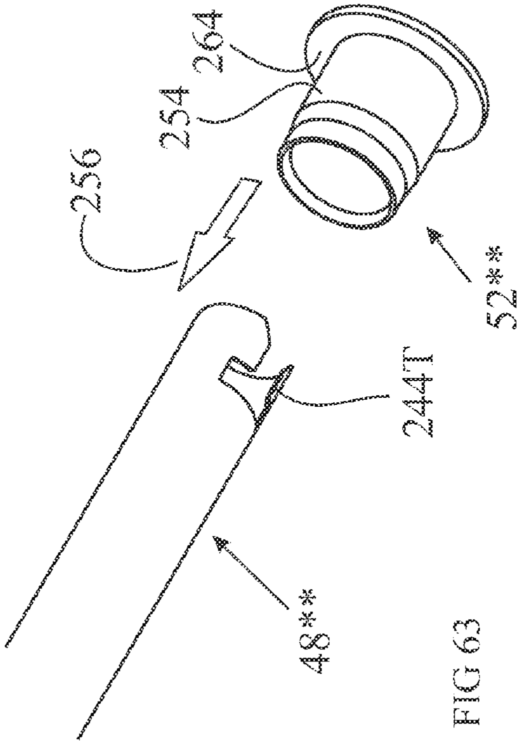
FIG. 63 is the same view as FIG. 62 but from a different angle.
Figure 62:
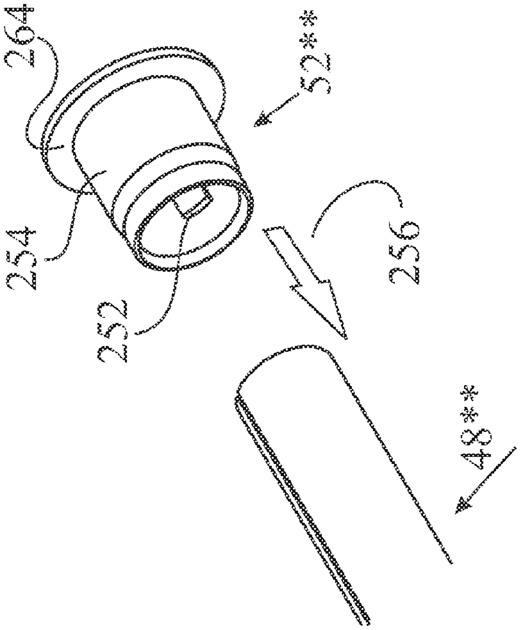
FIG. 62 is a broken away, exploded perspective view of the spring shaft and the spring plug of FIG. 59.
Figure 65:
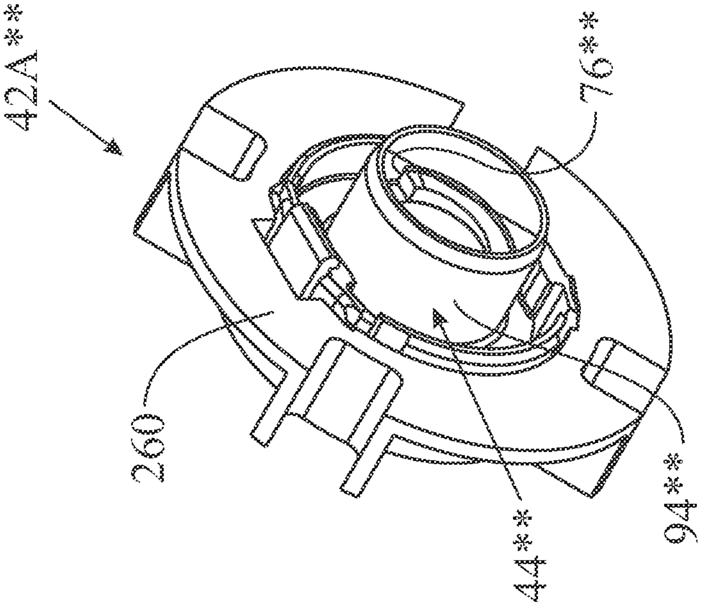
FIG. 65 is a perspective view of the assembled roller tube adapter and the combination drive plug/drive plug shaft of FIG. 64.

In the module 12 of FIG. 59, the spring shaft 48** is a hollow, rolled lock seam tube providing a substantial savings in procurement cost over the previously described spring shafts 48, 48*. Referring to FIGS. 59 and 60, the spring shaft 48** is a hollow cylinder with identical ends 242, 244. Identical "T" slot openings 242T, 244T are defined adjacent to the ends 242, 244 of the spring shaft tube 48****.

The limiter 46 is very similar to the limiter 46* of FIG. 43, except that it defines a "T"-shaped projection 248 on the circumferential surface of the limiter 46** adjacent its non-threaded end 246. As best shown in FIG. 61, the end 246 of the limiter 46** slides into the end 242 of the spring shaft 48** (in the direction of the arrow 250 of FIG. 60), causing the hollow tubular spring shaft 48** to expand at the end 242 until the "T"-shaped projection 248 on the limiter 46** snaps into the "T" slot 242T, at which point the end 242 of the spring shaft 48** springs back to its original, unexpanded shape. The T-shaped projection 248 is then retained within the T-shaped slot 242T, so the spring shaft 48** and the limiter 46**** are positively engaged, both against rotation and against axial movement, relative to each other.

It may be noted that the T-shaped projection 248 has a ramped leading edge, for causing the spring shaft 48 to expand in order to receive the T-shaped projection 248, and it has an abrupt shoulder on its trailing edge, to help retain the T-shaped projection 248 within the slot 242**T once the projection has been received in the slot.

The spring plug 52 is similar to the spring plug 52 of FIG. 5 except that it does not have the striations 108. Instead, the spring plug 52** defines a hollow shaft 254 and an internal rectangular key 252 (See FIG. 62). The spring shaft 48** slides into the hollow shaft 254 of the spring plug 52** in the direction of the arrow 256 of FIGS. 62 and 63, allowing the internal rectangular key 252 of the spring plug 52** to slide into the "T" slot 244T (See FIG. 63) of the spring shaft 48**. Note that the key 252 has a rectangular shape; it is not T-shaped like the projection 248 on the limiter 46**. Therefore, the spring plug 52** is positively engaged for non-rotation relative to the spring shaft 48**, but the spring plug 52** may readily slide out axially along the "T" slot 244T of the spring shaft 48**, as discussed later when describing the procedure for pre-winding the power assist module 12****.

Figure 64:
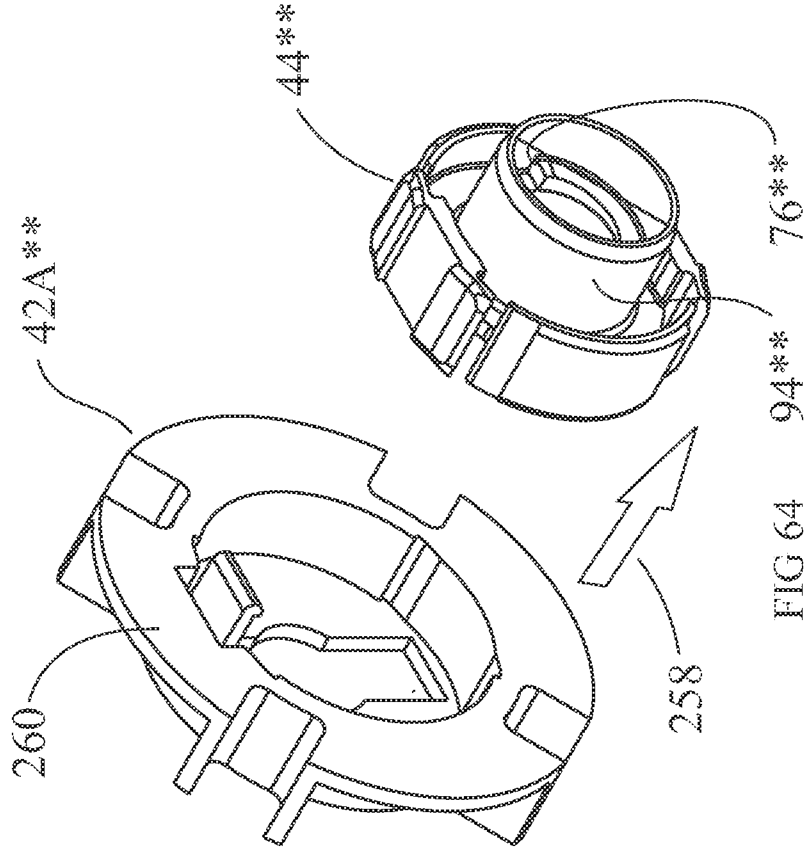
FIG. 64 is an exploded perspective view of the roller tube adapter and the combination drive plug/drive plug shaft of FIG. 59.

Referring now to FIGS. 59 and 64, the threaded follower member 44 essentially combines the drive plug shaft 42* and the drive plug 44* of the embodiment of FIG. 45 into a single component with all of the same operational features except the ability to rotate the drive plug 44* relative to the drive plug shaft 42* in order to pre-wind the spring 50*. As explained below, the pre-wind feature is still available in this power assist module 12** but is done a bit differently. The threaded follower member 44** is received in the limiter end roller tube adapter 42A** and they snap together by sliding the limiter end roller tube adapter 42A** towards the threaded follower member 44** in the direction of the arrow 258 (See FIG. 64**).

Several different sizes of the limiter end roller tube adapter 42A may be available, each having a different outer diameter of its flange 260 so as to accommodate different size roller tubes 14 (See FIG. 59**).

The opposite end roller tube adapter 240 is supported for rotation on the short shaft 262 of the spring plug 52** (See FIG. 59). This opposite end roller tube adapter 240** also is available in several diameter sizes to accommodate different size roller tubes 14**.

Assembly and prewind:

The user assembles the power assist module 12 by sliding the end 246 of the threaded limiter 46** into the end 242 of the spring shaft 48** until the "T"-shaped projection 248 snaps into the T-slot 242T, locking the limiter 46** and spring shaft 48** together. The user then threads the limiter 46** into the follower member 44** until the radially-directed face of its axially-extending stop 66** abuts the corresponding internal, radially-directed face of the axially-extending stop 76** in the threaded follower member 44****.

The threaded follower member 44 is snapped into the limiter-end roller tube adapter 42A**, and a first end of the spring 50** is extended over the spring shaft 48** and limiter 46** and is "screwed" onto the shaft 94** of the threaded follower member 44**, by rotating the spring to drive it onto the threaded follower member 44**. Then, the user "screws" the second end of the spring 50** onto the spring plug 52** in a similar manner as the first end of the spring 50** was screwed onto the threaded follower member 44**. Note that, at this point the spring plug 52** is not yet engaged with the spring shaft 48****.

The user uses one hand to hold tightly to the flange 260 of the limiter-end roller tube adapter 42A, and the user uses his other hand to rotate the spring plug 52** at the opposite end of the spring shaft 48** in the clockwise direction (as seen from the vantage point of FIG. 59). Since the second end of the spring 50** is secured to the spring plug 52**, this second end of the spring 50** rotates with the spring plug 52**. The user continues to rotate the spring plug 52** until the desired amount of pre-wind on the spring 50** is reached. Then, the user simply slides the spring plug 52** in the direction of the arrow 256 (See FIG. 63) until the key 252 engages the T-slot 244T in the spring shaft 48**. This prevents the spring 50** from unwinding relative to the spring shaft 48**, thereby retaining the prewind of the spring 50****.

In a preferred embodiment, the length of the spring 50 is substantially equal to the length of the power assist module 12** between the face of the flange 260 of the limiter-end roller tube adapter 42A and the face of the flange 264 on the spring plug 52 when the limiter 46** is fully threaded into the threaded follower member 44**. This ensures that, once the spring 50** has been pre-wound and the key 252 is in the T-slot 244T, the spring tension helps keep the spring plug 52** in the spring shaft 48**** so as to preserve the pre-wind condition.

The rest of the assembly, including the installation of the locking ring 140* and the locking nut 158* and the installation of the power assist module 12 in the roller shade, is identical to what has already been described in the earlier embodiments. For example, a rod 24 as shown in FIG. 3 is inserted through the limiter 46** and spring shaft 48** and through the adapters 42A and 240 and is mounted on the bracket clip 16. This power assist module 12** operates in the same manner as the earlier embodiments, with the changes described essentially affecting only the cost of the components and the ease of assembly and of adjustment for the desired degree of pre-wind on the spring 50****.

It will be obvious to those skilled in the art that modifications may be made to the embodiments described above without departing from the scope of the present invention as defined by the claims.

What is claimed is:

1. A power assist arrangement for a covering for an architectural opening, comprising:

at least one independent power assist module for mounting inside a rotator tube to assist with the rotation of the rotator tube, said independent power assist module including the following prior to being mounted inside the rotator tube:

an elongated spring shaft having first and second ends;

a drive plug mounted adjacent to one of said first and second ends of said spring shaft for rotation relative to said spring shaft such that said drive plug will rotate with the rotator tube when the power assist module is mounted inside the rotator tube;

an elongated spring mounted over said spring shaft, said elongated spring having a first end fixed relative to said spring shaft and a second end fixed relative to said drive plug; and a prewinding mechanism for prewinding said spring relative to said spring shaft, including a threaded follower member mounted for rotation about an axis of rotation relative to said spring shaft; a threaded shaft member non-rotatably mounted relative to said spring shaft and threaded to said follower member; a first abutment surface on said threaded shaft member and a second abutment surface on said threaded follower member, said first and second abutment surfaces being located so as to abut each other and prevent relative rotation between said threaded shaft member and said threaded follower member when said threaded follower member has threaded a desired axial distance in a first direction relative to said threaded shaft member; wherein the at least one independent power assist module has a pre-wound condition and is configured to maintain said pre-wound condition when removed from the rotator tube.

2. A power assist arrangement for a covering for an architectural opening as recited in claim 1, wherein said threaded shaft member is fixed to said spring shaft.

3. A power assist arrangement for a covering for an architectural opening as recited in claim 2, wherein said threaded follower member is part of said drive plug.

4. A power assist arrangement for a covering for an architectural opening as recited in claim 2, wherein said threaded follower member is a separate piece from said drive plug, and further comprising means for joining said threaded follower member to said drive plug for rotation with said drive plug.

5. A power assist arrangement for a covering for an architectural opening as recited in claim 4, wherein said means for joining said threaded follower member to said drive plug is releasable, allowing a user to join the threaded follower member to the drive plug so they rotate together and then to separate the threaded follower member from the drive plug so they can be rotated independently of each other.

6. A power assist arrangement for a covering for an architectural opening as recited in claim 2, and further comprising said rotator tube being mounted over the spring and drive plug of the power assist module, wherein said drive plug is mounted for rotation with said rotator tube.

7. A power assist arrangement for a covering for an architectural opening as recited in claim 5, and further comprising said rotator tube being mounted over the spring and drive plug of the power assist module and mounted for rotation with said drive plug.

8. A power assist arrangement for a covering for an architectural opening as recited in claim 7, and further comprising a rod extending axially through and non-rotatably mounted to the spring shaft of said power assist module.

9. A power assist arrangement for a covering for an architectural opening as recited in claim 8, and further comprising a second of said power assist modules, wherein said second power assist module is also mounted inside said rotator tube, with the rotator tube also mounted for rotation with the drive plug of the second power assist module, and with the rod also extending axially through and non-rotatably mounted to the spring shaft of the second power assist module.

10. A power assist arrangement for a covering for an architectural opening as recited in claim 2, and further comprising said rotator tube being mounted over said power assist module for rotation with said drive plug, and a rod extending axially through and non-rotatably mounted to the spring shaft of said power assist module.

11. A power assist arrangement for a covering for an architectural opening as recited in claim 10, and further comprising a second of said independent power assist modules, wherein said second independent power assist module is also mounted inside the rotator tube, with the rotator tube also mounted for rotation with the drive plug of the second independent power assist module, and with the rod also extending axially through and non-rotatably mounted to the spring shaft of the second independent power assist module.

12. A power assist arrangement for a covering for an architectural opening as recited in claim 2, and further comprising a third abutment surface, located on said threaded shaft member a desired axial distance away from the first abutment surface and a fourth abutment surface mounted for rotation with said drive plug, wherein the third and fourth abutment surfaces are located so as to abut each other and prevent relative rotation between said threaded shaft member and said threaded follower member when said threaded follower member has threaded a desired axial distance in a second direction relative to said threaded shaft member.

13. A power assist arrangement for a covering for an architectural opening as recited in claim 12, including means for selectively positioning said third abutment surface at various axial positions on said threaded shaft member.

14. A power assist arrangement for a covering for an architectural opening as recited in claim 12, and further including a threaded stop member which is threaded onto the threaded shaft member and a keyed stop member which is keyed to the threaded shaft member, wherein said third abutment surface is located on one of said threaded stop member and said keyed stop member, wherein the threaded stop member is selectively connected to the keyed stop member to fix the third abutment surface at the desired axial position on the threaded shaft member.

15. A power assist arrangement for a covering for an architectural opening as recited in claim 14, and further comprising said rotator tube being mounted over the power assist module and mounted for rotation with said drive plug, and a rod extending axially through and non-rotatably mounted to the spring shaft of the power assist module.

16. A power assist arrangement for a covering for an architectural opening as recited in claim 15, and further comprising a mounting bracket for mounting said rotator tube and said rod on an architectural surface; and a vernier adjustment mechanism between said rod and said bracket including means for selectively adjusting the angular position of the rod relative to the mounting bracket.

17. A power assist arrangement for a covering for an architectural opening as recited in claim 16, wherein said vernier adjustment includes a clutch assembly with a clutch output housing, and a clutch input, wherein said clutch assembly allows the rotation of said clutch output housing in clockwise and counterclockwise directions and with it the likewise rotation of said clutch input when the catalyst force for said rotation is applied through said clutch output housing, but prevents the rotation of said clutch input when the catalyst force for said rotation is applied through said clutch input.

18. A power assist arrangement for a covering for an architectural opening as recited in claim 6, wherein said spring defines a spring length and wherein, when said second end of said spring rotates in a first direction with said rotator tube, said spring length increases at a spring length growth rate; and wherein said threaded shaft member defines a thread pitch such that said threaded follower member moves away from said first end of said spring at substantially the same rate as the rate at which the spring grows in length.

19. A power assist arrangement for a covering for an architectural opening as recited in claim 2, wherein said threaded follower member is a separate piece from said drive plug, and is joined to said drive plug for rotation with said drive plug.

20. A power assist arrangement for a covering for an architectural opening as recited in claim 19, wherein said threaded follower member is releasably joined to said drive plug.

21. A method of providing the power assist arrangement of claim 1 to a roller shade having the rotator tube, including the steps of: providing the least one independent power assist module having the drive plug and the spring with a preselected spring force; pre-winding said spring of the power assist module with the power assist module independently retaining its spring pre-wind; and then inserting the prewound power assist module into the rotator tube with the drive plug mounted for rotation with the rotator tube.

22. The method as recited in claim 21, and including the additional step of providing a plurality of said independent power assist modules, each of said power assist modules having been independently pre-wound to its own desired pre-wind level prior to insertion into the rotator tube.

23. The method as recited in claim 22, wherein each of said plurality of power assist modules has a spring with a spring constant which is independent from the spring constants of the other power assist modules.

24. The method as recited in claim 23, and further including the step of removing the pre-wound power assist module from the rotator tube with the power assist module independently retaining its spring pre-wind.

* * * * *

UNITED STATES PATENT AND TRADEMARK OFFICE

CERTIFICATE OF CORRECTION

PATENT NO. : 9,080,381 B2
APPLICATION NO. : 13/531078
DATED : July 14, 2015
INVENTOR(S) : Steve R. Haarer and Richard N. Anderson It is certified that error appears in the above-identified patent and that said Letters Patent is hereby corrected as shown below:

Specification

Column 2, line 58, delete “ail” and insert therefor -- rail --

Column 8, line 6, delete “earner” and insert therefor -- earlier --

Column 13, line 30, delete “earner” and insert therefor -- earlier --

Column 17, line 55, delete “46**” and insert therefor -- 46* --

Claims

Column 26, line 24, claim 21, delete “the least” and insert therefor -- at least --

Signed and Sealed this
Ninth Day of February, 2016

Michelle K. Lee
*Director of the United States Patent and Trademark Office*